United States Patent [19]
Gemma et al.

[11] Patent Number: 5,754,511
[45] Date of Patent: May 19, 1998

[54] OPTICAL INFORMATION REPRODUCTION BY IRRADIATING TWO LASER BEAMS INTO A RECORDING MEDIUM OF AT LEAST THREE ENERGY LEVELS AND DETECTING ABSORPTION OR PHOTOLUMINESCENCE

[75] Inventors: Nobuhiro Gemma; Kouichi Ichimura; Kazushige Yamamoto, all of Yokohama, Japan

[73] Assignee: Kabushiki Kaisha Toshiba, Kawasaki, Japan

[21] Appl. No.: 713,357

[22] Filed: Sep. 13, 1996

[30] Foreign Application Priority Data

Sep. 14, 1995 [JP] Japan .................................. 7-237472
Jan. 12, 1996 [JP] Japan .................................. 8-004211

[51] Int. Cl.$^6$ .............................. G11B 7/00; G01N 1/00
[52] U.S. Cl. ........................ 369/100; 369/272; 369/288
[58] Field of Search .......................... 369/100, 109, 369/110, 112, 288, 284, 272, 274; 365/151, 114, 112, 215

[56] References Cited

U.S. PATENT DOCUMENTS

| | | | |
|---|---|---|---|
| 5,256,849 | 10/1993 | Scully | 219/121.68 |
| 5,268,862 | 12/1993 | Rentzepis | 365/151 |
| 5,499,206 | 3/1996 | Muto | 365/114 |

OTHER PUBLICATIONS

M. Orrit et al., Single Pentacene Molecules Detected by Fluorescence Excitation in a p–Terphenyl Crystal, Physical Review Letters, pp. 2716–2719, Nov. 1990.

Physical Review A, vol. 51, No. 2, pp. 1438–1445, Feb. 1995, C. Wei, et al., "Experimental Investigations of Absorption and Dispersion Profiles of a Strongly Driven Transition: V–Shaped Three–Level System with a Strong Probe".

Physical Review A, vol. 49, No. 5, pp. 4016–4023, May 1994, Y. Zhu, et al., "Intensity Characteristics of Inversionless Lasers from Induced Atomic Coherence".

Optics Letters, vol. 19, No. 21, pp. 1744–1746, Nov. 1, 1994, A. Imamoglu, et al., "Semiconductor Lasers without Population Inversion".

Primary Examiner—Tod R. Swann
Assistant Examiner—Kim-Kwok Chu
Attorney, Agent, or Firm—Oblon, Spivak, McClelland, Maier & Neustadt, P.C.

[57] ABSTRACT

There is provided an optical detection method comprising the steps of preparing a solid body having an energy level structure constituted by at least three energy levels, and irradiating first and second coherent light on the solid body to optically detect the physical structure of the solid body, wherein the detection step satisfies the following conditions:

$\min(\epsilon_{i31}) < \hbar\omega_p/2\pi < \max(\epsilon_{i31})$, $\min(\epsilon_{i32}) < \hbar\omega_c/2\pi < \max(\epsilon_{i32})$, and $\hbar\Omega_c/2\pi < \max(\epsilon_{i31}) - \min(\epsilon_{i31})$ where the number of physical structures included in the solid body is N, the predetermined three levels of ith physical structure are called first, second, and third levels, and energies of the first, second, and third levels are $\epsilon_{i1}$, $\epsilon_{i2}$, and $\epsilon_{i3}$, respectively, of the N physical structures, the maximum value of $|\epsilon_{i3} - \epsilon_{i1}|$ is $\max(\epsilon_{i31})$, and the minimum value is $\min(\epsilon_{i31})$, of the N physical structures, the maximum value of $|\epsilon_{i3} - \epsilon_{i2}|$ is $\max(\epsilon_{i32})$, and the minimum value is $\min(\epsilon_{i32})$, the angular frequency of the first coherent light is $\omega_p$, and a Rabi frequency is $\Omega_p$, and the angular frequency of the second coherent light is $\omega_c$, and a Rabi frequency is $\Omega_c$, and includes the step of measuring at least one of absorption of the first coherent light in the solid body and photoluminescence of the solid body generated through the absorption of the first coherent light with respect to a plurality of pairs $(\omega_p, \omega_c)$.

29 Claims, 26 Drawing Sheets

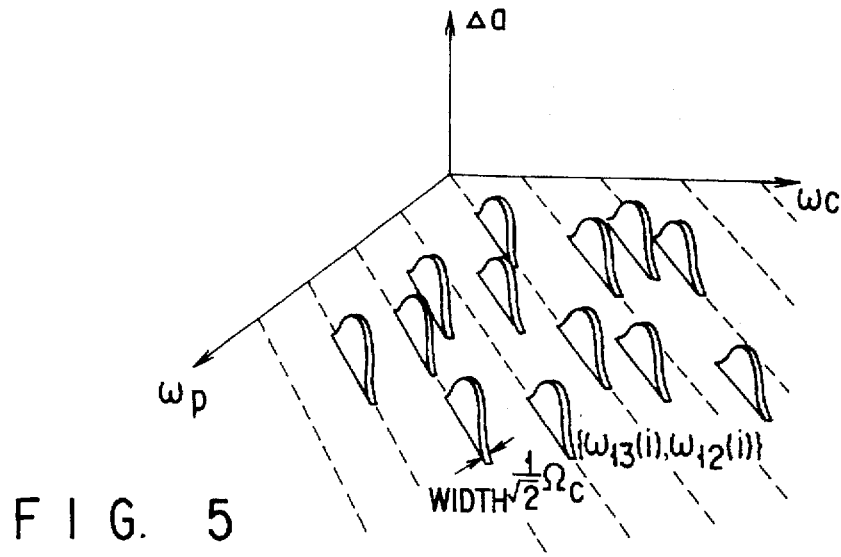
F I G. 5
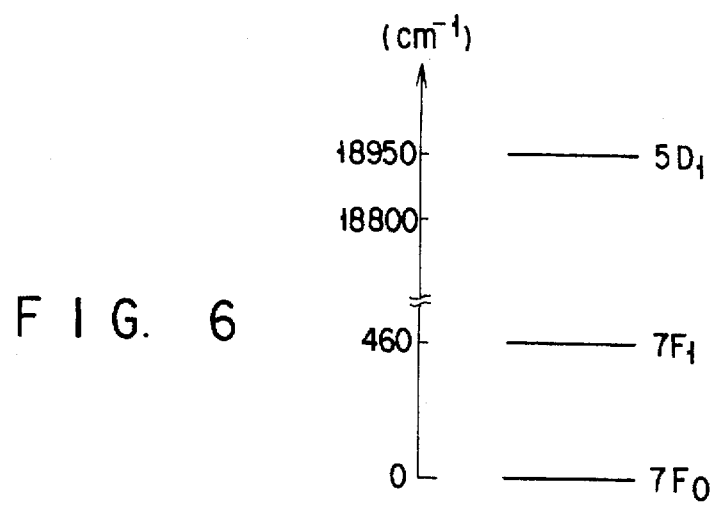
F I G. 6
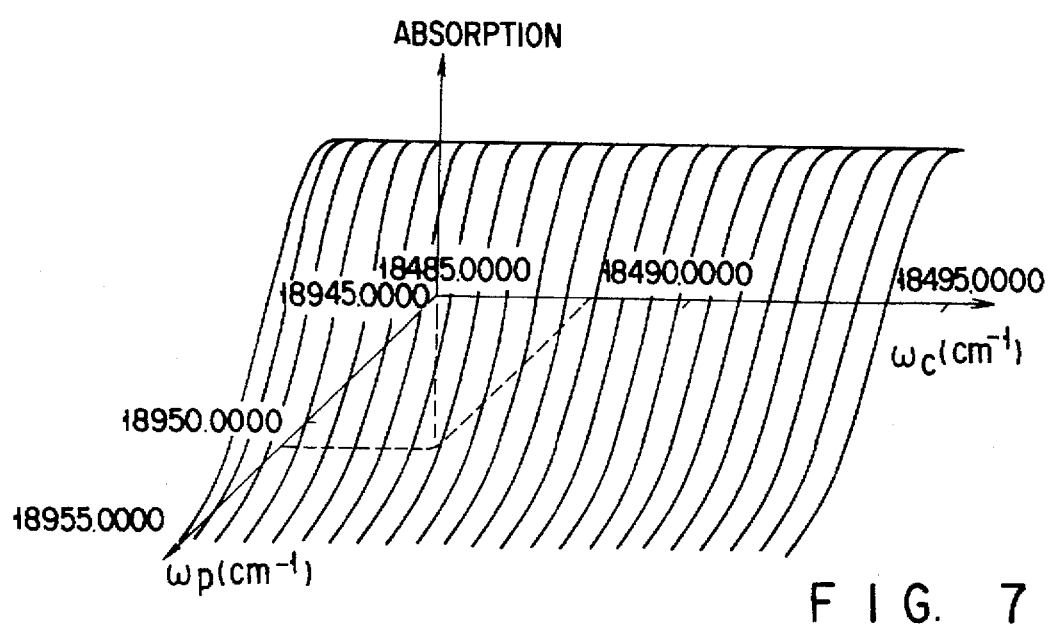
F I G. 7

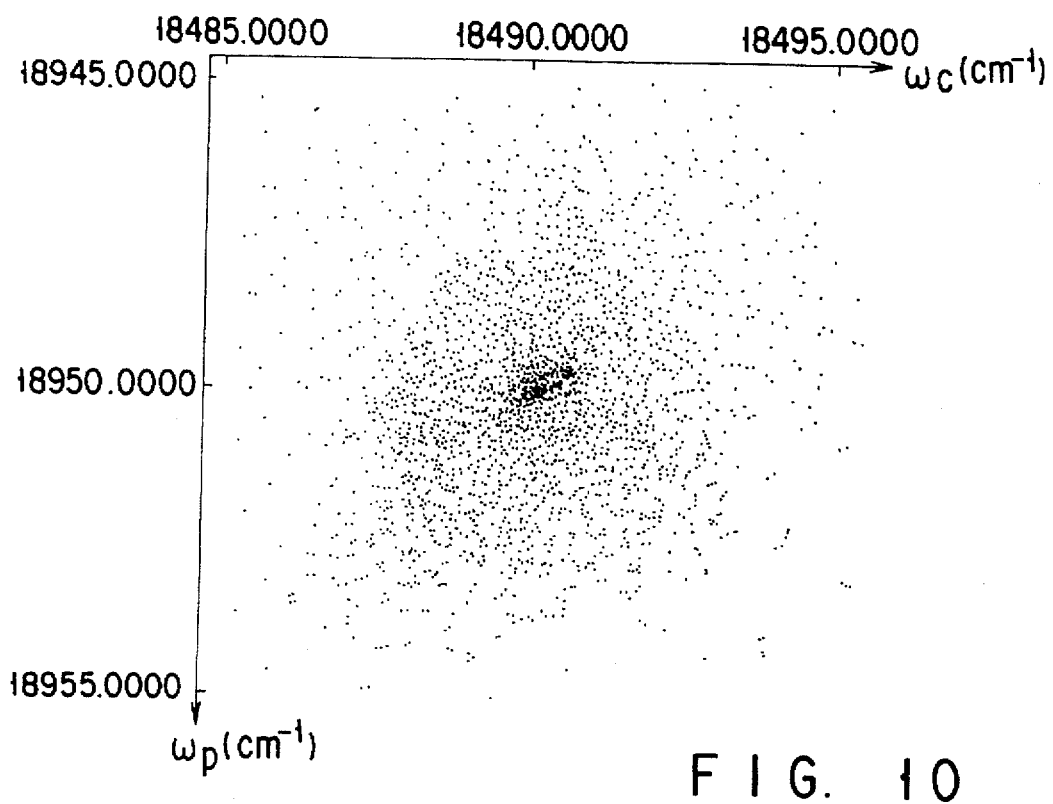
F I G. 10
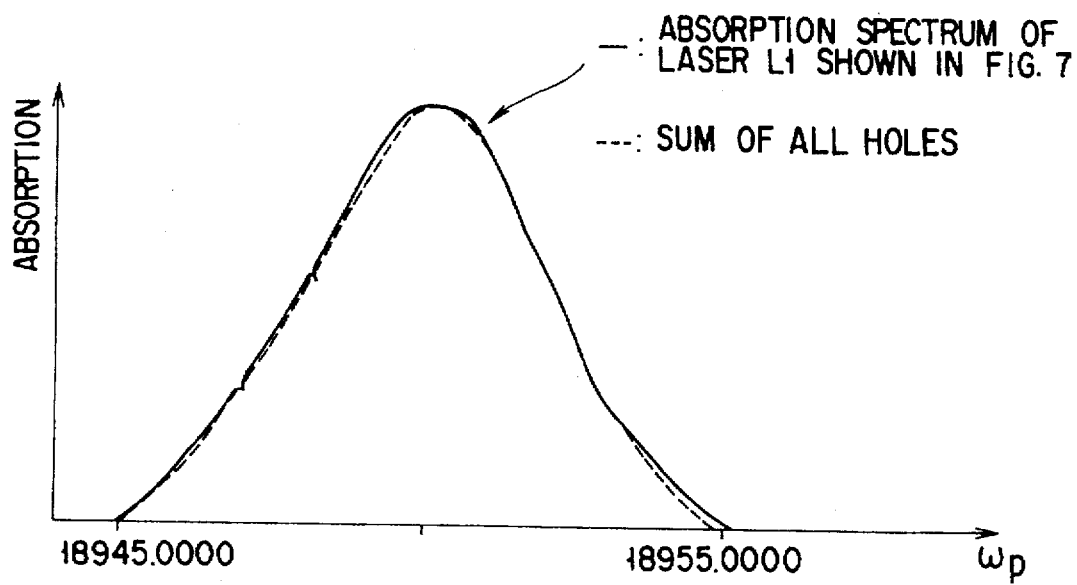
F I G. 11

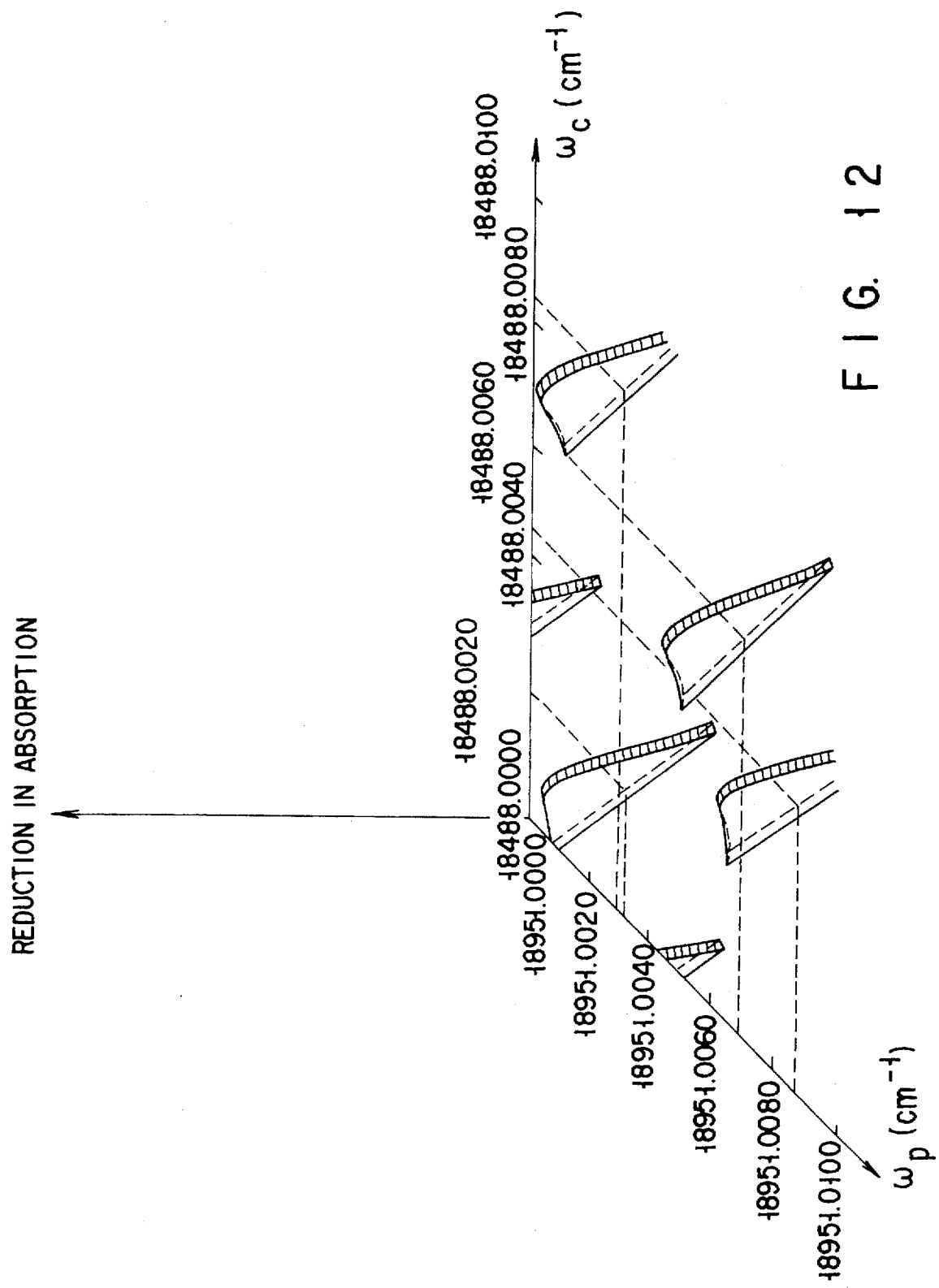
F I G. 12

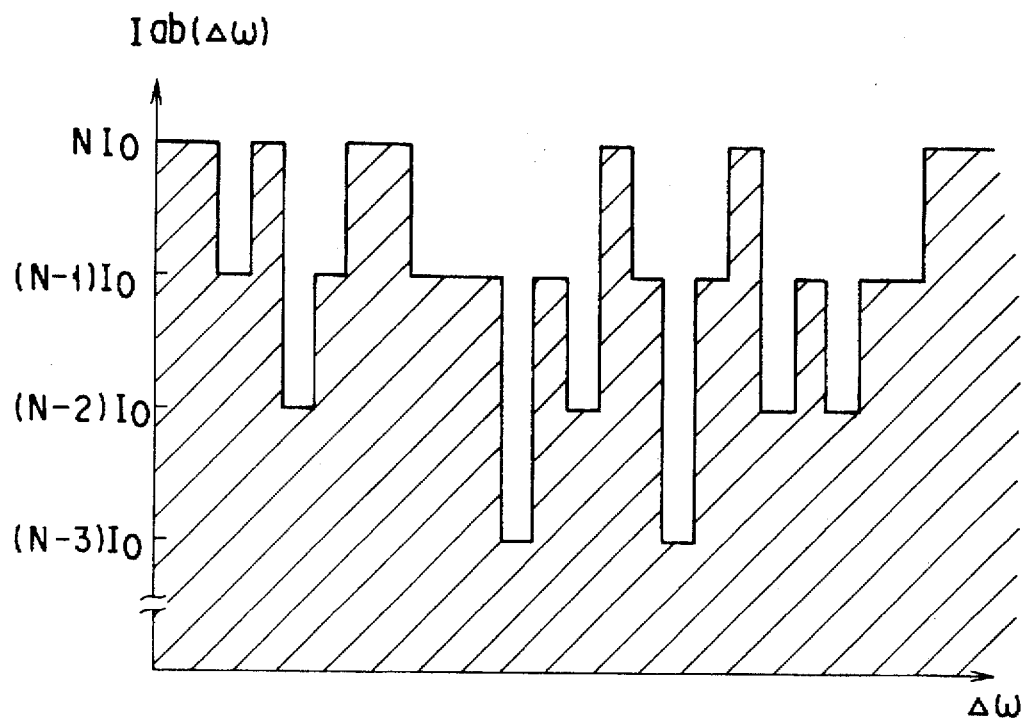
F I G. 22A
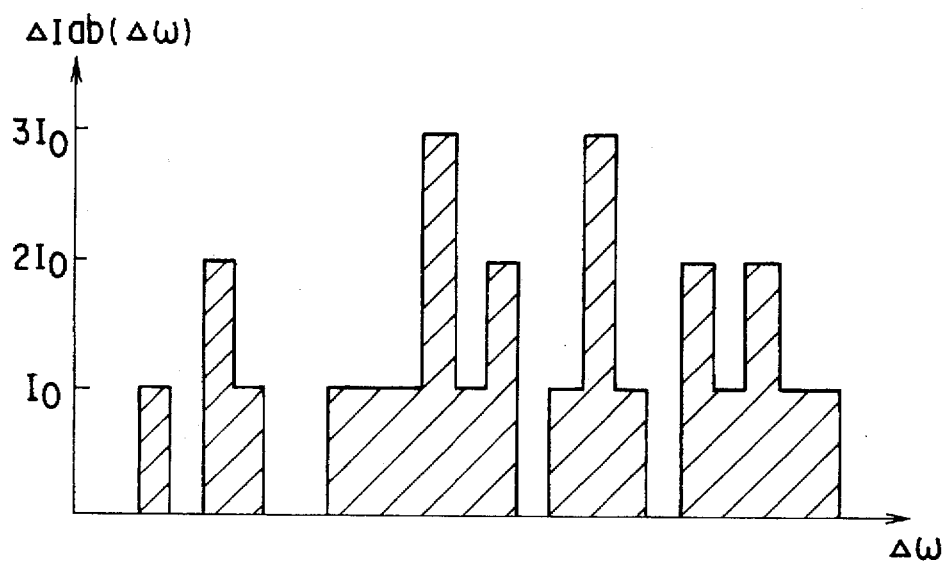
F I G. 22B

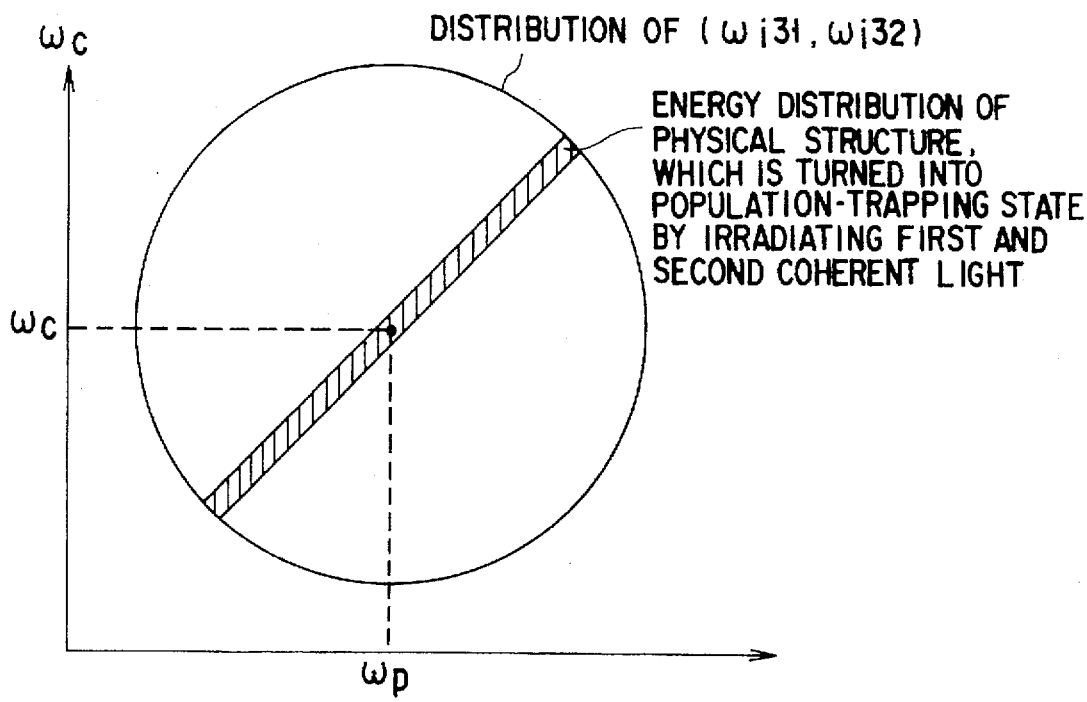
F I G. 23
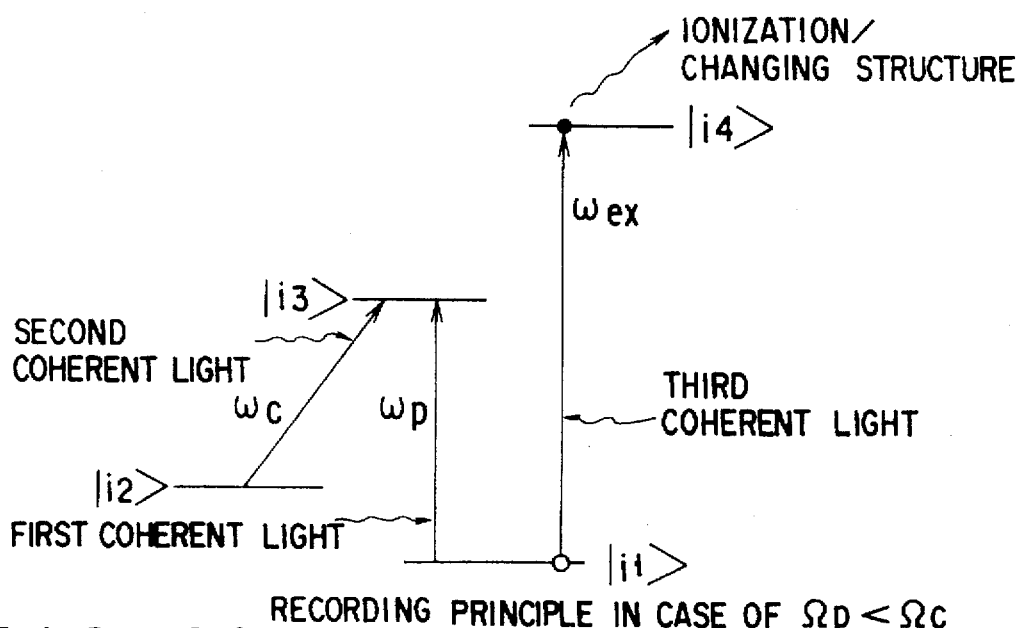
F I G. 24 RECORDING PRINCIPLE IN CASE OF $\Omega p < \Omega c$

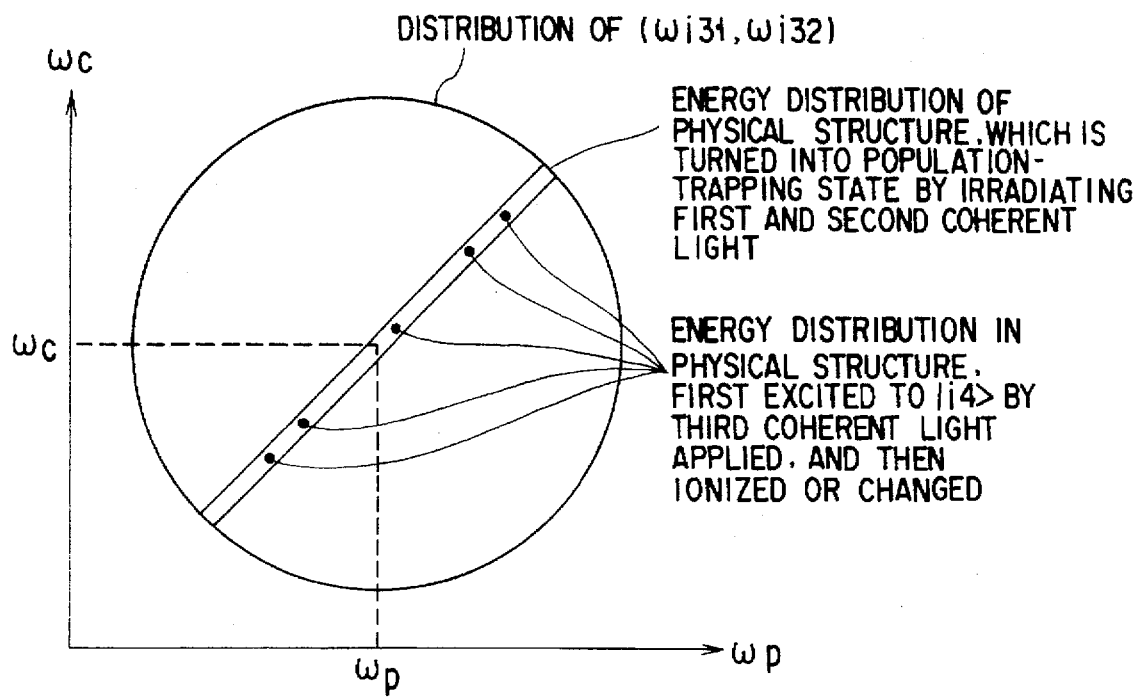
FIG. 25
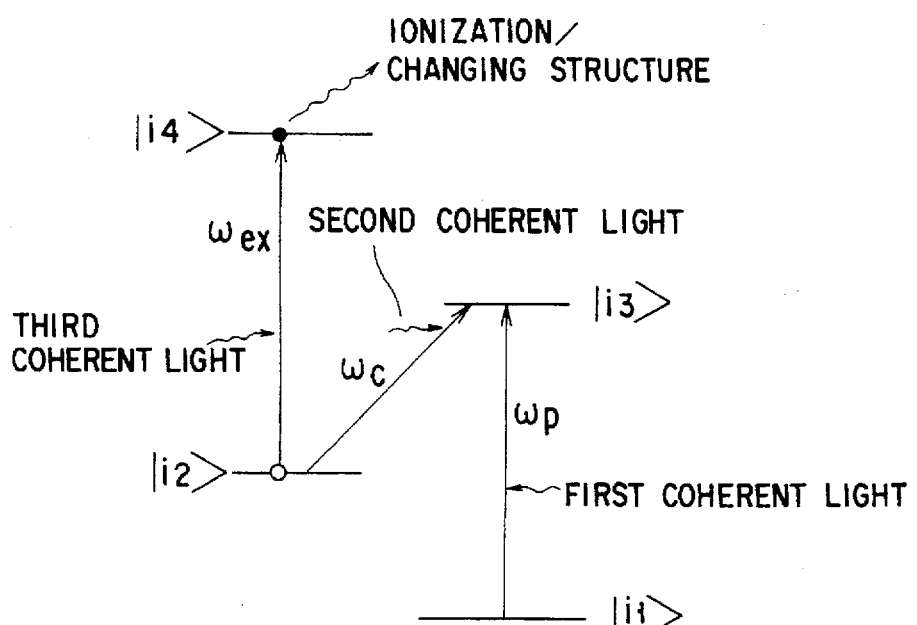
FIG. 26 RECORDING PRINCIPLE IN CASE OF $\Omega p > \Omega c$ RECORDING PRINCIPLE FOR PHYSICAL STRUCTURE WHICH IS NOT TURNED INTO POPULATION-TRAPPING STATE

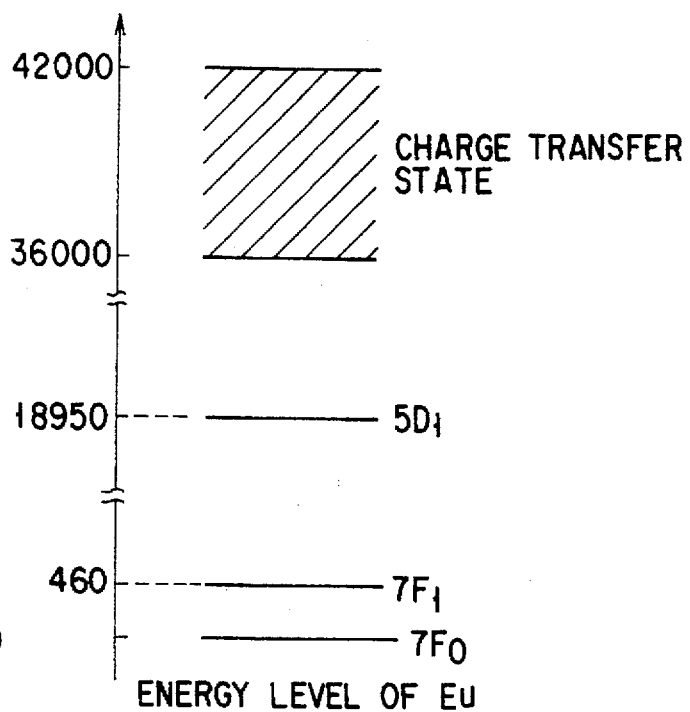
F I G. 29
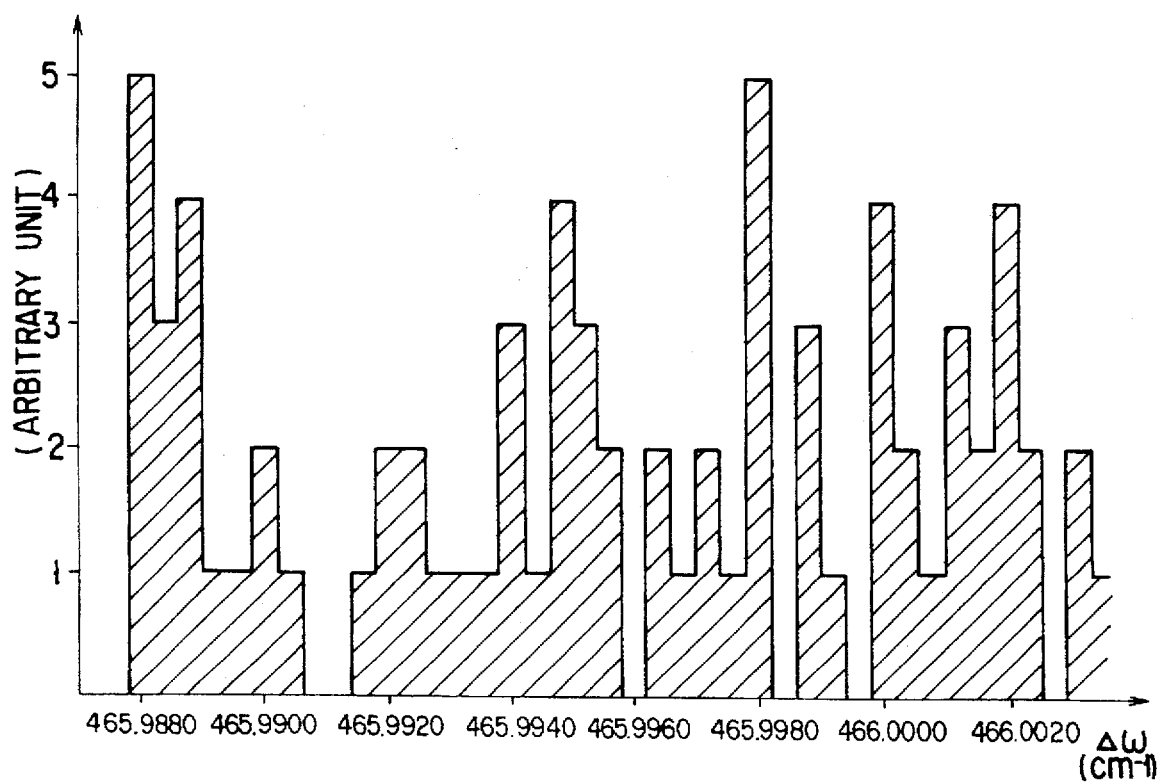
F I G. 31

$\Delta Iab(\omega_p, \omega_c)$ AFTER RECORDING OPERATION (1)

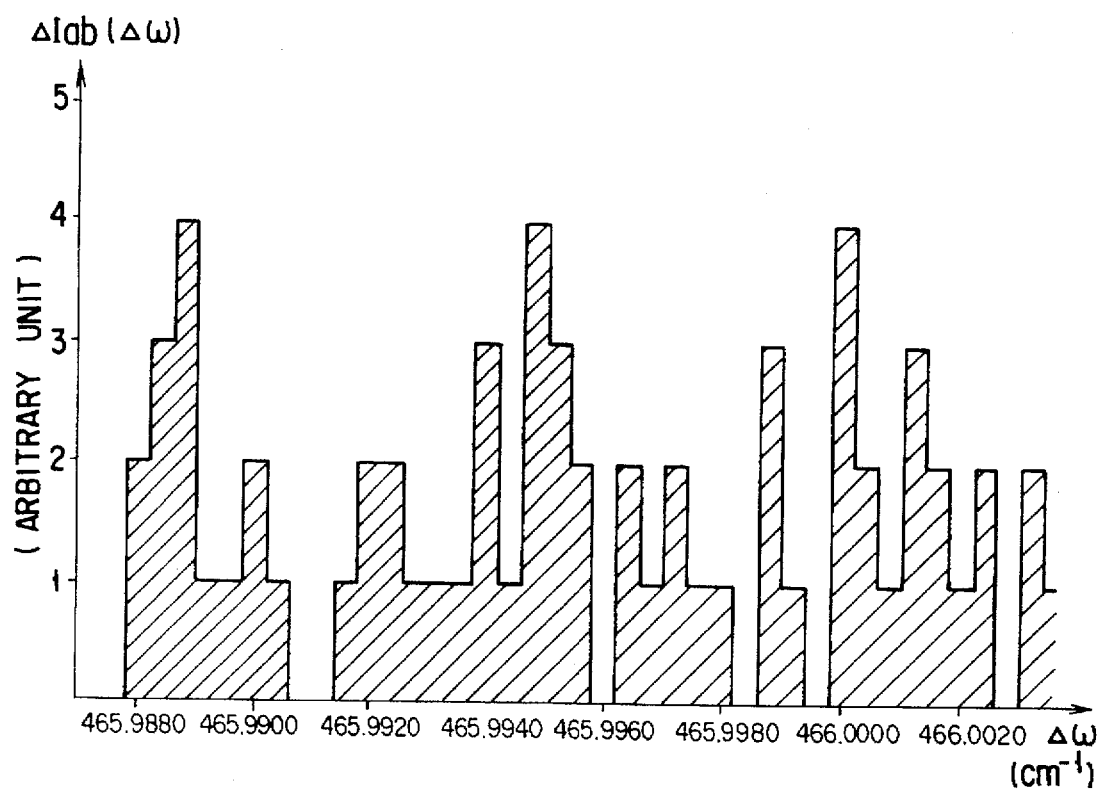
F I G. 35  ΔIab(Δω) AFTER RECORDING OPERATION (1)~(3)
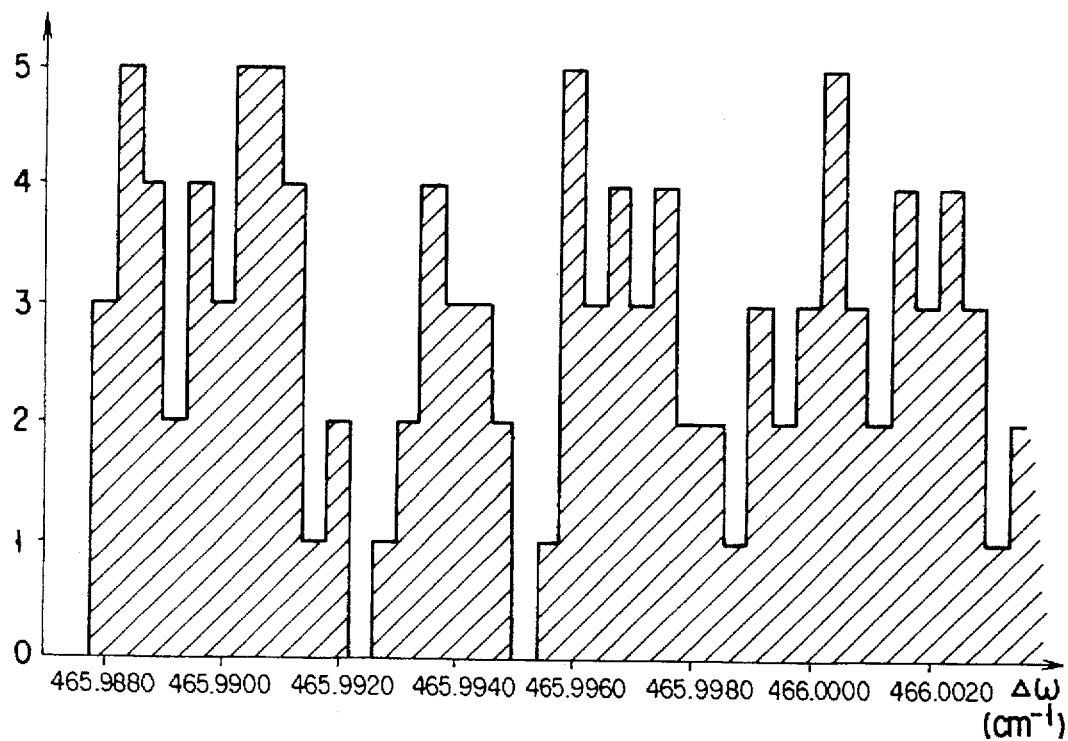
F I G. 36  ΔIab(Δω)

OPTICAL INFORMATION REPRODUCTION BY IRRADIATING TWO LASER BEAMS INTO A RECORDING MEDIUM OF AT LEAST THREE ENERGY LEVELS AND DETECTING ABSORPTION OR PHOTOLUMINESCENCE

BACKGROUND OF THE INVENTION

1. Field of the Invention

The present invention relates to an optical detecting method of optically detecting a physical structure included in a solid body, a display device for displaying the detection result, and a recording/reproducing method and a recording/reproducing device which use the states of respective atoms and molecules as recording units.

2. Description of the Related Art

With conspicuous progress of an optical technique in recent years, an evaluation technique having a resolving power at which detection can be performed at atomic or molecular level has been developed. The represent of such an evaluation technique having high sensitivity is a photoluminescence excitation spectrum evaluation method for impurity molecules.

According to this method, by using excited light having a narrow line-width, the excitation spectrum of photoluminescence of luminescent dye impurity molecules doped at a low density in a molecular crystal or a polymer matrix is observed at an extremely low temperature.

In order to reduce the volume of a crystal subjected to optical excitation, an optical fiber having an inner diameter of 4 μm is brought into contact with a crystal, and excited light is irradiated on the contact portion, or a thin-film crystal is used as a sample, thereby reducing the number of molecules which are optically excited. In this manner, a photoluminescence excitation spectrum of a single impurity molecule can be detected (M. Orrit et al., Phys. Rev. Lett. 65, 2716(1990)). According to this method, the spectrum of a single molecule can be obtained with respect to Stark effect or magnetic resonance.

The evaluation method cannot be applied to only when the number of molecules is large because the spectra of respective molecules must be separated from each other. More specifically, an impurity molecular density at which this evaluation method can be applied is limited.

In addition, an excitation wavelength is strictly limited. Molecules located at the center of an excitation spectrum cannot be separated into molecular spectra, and the spectrum of a single molecule can be obtained in only a wavelength region corresponding to the tail of the excitation spectrum.

Another method of realizing spectroscopy at atomic and molecular level is an NSOM (Near-field Scanning Optical Microscope) method.

In this method, an optical fiber whose end is sharpened to have an aperture of 100 nm or less is brought to a sample surface, and optical characteristics are detected in a Near-field located at only the surface.

According to this method, when the photoluminescence spectrum of dye molecules dispersed at a low density of several 10 $\mu m^{-2}$ on a solid substrate is observed in a Near-field, the two-dimensional photoluminescence image of a single molecule can be detected (E. Betzig and R. J. Chichester, Science 262, 1422 (1993)). According to this method, a photoluminescence spectrum or a change in time of a space distribution of photoluminescence is also observed at single-molecule level.

The problems of the NSOM method are as follows. That is, only the optical characteristics of a solid surface can be detected, and the characteristics of the inside of the solid substrate cannot be evaluated. Even if molecules are dispersed on the surface, unless the density of the molecules is low, the images or spectra of respective molecules cannot be separated from each other.

In this manner, the spectrum information of a single molecule can be obtained by using the photoluminescence excitation spectrum method or NSOM method at an extremely low temperature. However, the constitution of a sample to which the above methods can be applied has various limited factors, and the methods have poor general-purpose properties at present. For this reason, development of a general-purpose optical detection method has been demanded.

Studies of new physical phenomena in the field for studying quantum electronics for an atomic gas have been developed with progress of a laser technique. The represents of the physical phenomena are EIT (Electromagnetically Induced Transparency) and LWI (Lasing Without Inversion) based on the coherent interaction between atoms and a laser.

The EIT and LWI are phenomena excited such that two laser beams are irradiated on an atomic system having three electronic levels to hold atoms in a coherent state.

More specifically, the EIT is a phenomenon in which a wavelength region in which strong absorption must be performed becomes transparent (J. E. Field et al., Phys. Rev. Lett. 67, 3062 (1991), K. J. Moller et al., Phys. Rev. Lett. 66, 2593 (1991). The LWI is a phenomenon in which, by using the EIT, coherent light is not absorbed, and lasing occurs without a population inversion (S. E. Harris, Phys. Rev. Lett. 62, 1033 (1989)).

The EIT has been tested in several types of atomic gas systems, and a large change in transmission coefficient by several orders of magnitude has been reported. On the other hand, several experiments are performed in an atomic gas system with respect to the LWI. Although lasing does not occur, amplification of probe laser is realized (W. E. Veer et al., Phys. Rev. Lett. 70, 3243 (1993)).

As another application using the EIT or LWI, an optical filter through which only light having very narrow band passes or a laser having a short-wavelength region in which an population inversion is not easily realized.

In addition, various new applications may be realized. However, when the probability of realizing such a new application is considered, a phenomenon such as the EIT or LWI is preferably realized in a solid system but an atomic gas system.

As an examination for the solid system, a theoretical analysis has been performed to a quantum well of a semiconductor or an impurity in a ruby or diamond crystal (Y. Zhu et al., Phys. Rev. A49, 4016 (1994), D. Huang et al., J. Opt. Soc. Am. B11, 2258 (1994), C. Wei et al., Phys. Rev. A51, 1438 (1995)). However, an experiment for the EIT or LWI in a solid system has not been reported.

In order to realize the EIT or LWI in a solid system, unlike in an atomic gas system, several points must be considered.

The EIT or LWI uses a closed three- or four-level system as a basic structure, electrons must be prevented from being escaped to another level under light irradiation. For this reason, as the electron state of the solid state, a level at which a wave function is localized, and relaxation another level does not easily occur must be selected.

As a level which satisfies the above conditions, a level serving as a pseudo atomic system having atomic characteristics, e.g., an impurity such as a transition metal or a rare earth element, a point defect such as a vacancy or the like, and a quantum structure such as a quantum dot or a quantum wire, is available.

As the second point, the spectrum width of optical transition is generally large in a solid system. As factors for determining a spectrum width are a level related to transition, the two following factors are known. A homogeneous line-width is generated such that the energy value of the level related to transition varies with time due to the interaction effect between the electron and a surrounding environment, and an inhomogeneous line-width is generated such that the time average values of the interaction effect in respective levels are different from each other, and the levels themselves have a distribution.

Of solid systems, the pseudo atomic system described above has these line-width which are relatively narrow. However, the homogeneous and inhomogeneous line-widths of the pseudo atomic system are larger than those of the atomic gas system. The characteristics of the EIT or LWI are determined depending resonance conditions related to a frequency, and considerably influenced by the homogeneous and inhomogeneous line-widths.

In order to realize the EIT or LWI in a solid system, the points described above must be considered. Therefore, in order to realize the EIT or LWI in a solid system, an approach different from the approach in an atomic gas system must be performed. However, at present, an approach inherent in a solid system which is required to realize the EIT or LWI in the solid system has not been apparent.

In addition, in the solid system, a new application of the EIT or LWI based on functions or characteristics inherent in the solid system is expected. However, such an application has not been proposed.

According to this, the appearance of a recording/reproducing method corresponding to increasing of information amount and having an extremely high recording density and a recording/reproducing device based on the method is eagerly expected.

One limit of a recording density is an atomic/molecular memory using the states of respective atoms or molecules as recording units. In order to realize the atomic/molecular memory, a technique for detecting or controlling a phenomenon at an atomic/molecular level is necessary.

As an example of such a technique, a large number of scanning probe techniques such as an STM, an AFM, and the NSOM described above have been studied. The scanning probe techniques begin to be actually applied to a memory. However, a technical problem that a scanning speed on a surface is excessively low has not been solved, and these techniques cannot be practically used.

As described above, an optical detection method, such as a photoluminescence excitation spectrum method at an extremely low temperature or the NSOM method, having a detection resolving power at an atomic/molecular level is proposed. A sample which can be used is limited, and the method has poor general-purpose properties.

In addition, a recording/reproducing method and device which can record/reproduce information at an atomic/molecular level are expected, and an attempt to apply the recording/reproducing method and device to extremely high density recording using a scanning probe technique such as the STM, AFM, and NSOM is made. However, at present, a recording/reproducing method and device which can be actually used is not realized.

SUMMARY OF THE INVENTION

It is an object of the present invention to provide an optical detection method which is better than a conventional optical detection method and at an atomic/molecular level, and a detection device for detecting the detection result.

It is another object of the present invention to provide a recording/reproducing method and device which can record or reproduce information using the states of respective atoms or molecules as recording units.

A first optical detection method according to the present invention comprises the steps of: preparing a solid body having an energy level structure constituted by at least three energy levels; and irradiating first and second coherent light on said solid body to optically detect the physical structure of said solid body, wherein the detection step satisfies the following conditions:

$\min(\epsilon_{i31}) < \hbar\omega_p/2\pi < \max(\epsilon_{i31})$, $\min(\epsilon_{i32}) < \hbar\omega_c/2\pi < \max(\epsilon_{i32})$, and $\hbar\Omega_c/2\pi < \max(\epsilon_{i31}) - \min(\epsilon_{i31})$ where the number of physical structures included in said solid body is N; the predetermined three levels of ith physical structure are called first, second, and third levels, and energies of the first, second, and third levels are $\epsilon_{i1}$, $\epsilon_{i2}$, and $\epsilon_{i3}$, respectively; of the N physical structures, the maximum value of $|\epsilon_{i3}-\epsilon_{i1}|$ is $\max(\epsilon_{i31})$, and the minimum value is $\min(\epsilon_{i31})$; of the N physical structures, the maximum value of $|\epsilon_{i3}-\epsilon_{i2}|$ is $\max(\epsilon_{i32})$, and the minimum value is $\min(\epsilon_{i32})$; the angular frequency of the first coherent light is $\omega_p$, and a Rabi frequency is $\Omega_p$; and the angular frequency of the second coherent light is $\omega_c$, and a Rabi frequency is $\Omega_c$, and includes the step of measuring at least one of absorption of the first coherent light in said solid body and photoluminescence of said solid body generated through the absorption of the first coherent light with respect to a plurality of pairs ($\omega_p$, $\omega_c$)

A second optical detection method according to the present invention comprises the steps of: preparing a solid body having an energy level structure constituted by at least three energy levels; and irradiating first and second coherent light on said solid body to optically detect the physical structure of said solid body, wherein the detection step satisfies the following conditions:

$\min(\epsilon_{i31}) < \hbar\omega_p/2\pi < \max(\epsilon_{i31})$, $\min(\epsilon_{i32}) < \hbar\omega_c/2\pi < \max(\epsilon_{i32})$, and $\hbar\Omega_c/2\pi < \max(\epsilon_{i31}) - \min(\epsilon_{i31})$ where the number of physical structures included in said solid body is N; the predetermined three levels of ith physical structure are called first, second, and third levels, and energies of the first, second, and third levels are $\epsilon_{i1}$, $\epsilon_{i2}$, and $\epsilon_{i3}$, respectively; of the N physical structures, the maximum value of $|\epsilon_{i3}-\epsilon_{i1}|$ is $\max(\epsilon_{i31})$, and the minimum value is $\min(\epsilon_{i31})$; of the N physical structures, the maximum value of $|\epsilon_{i3}-\epsilon_{i2}|$ is $\max(\epsilon_{i32})$, and the minimum value is $\min(\epsilon_{i32})$; the angular frequency of the first coherent light is $\omega_p$, and a Rabi frequency is $\Omega_p$; and the angular frequency of the second coherent light is $\omega_c$, and a Rabi frequency is $\Omega_c$, and includes the step of measuring at least one of an absorption difference between absorption of the first coherent light obtained when only the first coherent light is irradiated on said solid body and absorption of the first coherent light obtained when the first and second coherent light are irradiated on said solid body, and a photoluminescence difference between photoluminescence of said solid body generated through absorption of the first coherent light when only the first coherent light is irradiated on said solid body and photoluminescence of said solid body generated through absorption of the first coherent light when the first and second coherent light are irradiated on said solid body, with respect to a plurality of pairs ($\omega_p$, $\omega_c$)

The preferred manners of the first and second optical detection method are as follows.

(1) According to the first manner, in the measuring step, when the line-width of the first coherent light is represented by $\delta\omega_p$, and a homogeneous line-width related to transition between the first level and the third level is represented by $\omega_{homo31}$, a condition $\delta\omega_p \leq \omega_{homo31}$ is satisfied.

(2) According to the second manner, in the measuring step, when the line-width of the second coherent light is represented by $\delta\omega_c$, and a homogeneous line-width related to transition between the first level and the third level is represented by $\omega_{homo31}$, a condition $\delta\omega_c \leq \omega_{homo31}$ is satisfied.

(3) According to the third manner, the plurality of pairs ($\omega_p$, $\omega_c$) include two pairs ($\omega_p$, $\omega_c$) in which the absolute value of the difference of $\omega_c$ is not larger than a homogeneous line-width related to transition between the first level and the third level.

(4) According to the fourth manner, the detecting step includes the step of irradiating the first and second coherent light on said solid body under the condition under which the value of $\omega_p - \omega_c$ or the value of $\omega_p + \omega_c$ are constant while sweeping the frequencies of the first and second coherent light.

A first display device according to the present invention comprises: data collecting means for collecting data related to at least one of the absorption and photoluminescence according to first optical detection method; and display means for displaying the data and a set of minimum values of a data distribution curved surface formed by the data collected by said data collecting means in a space having an angular frequency of the first coherent light and an angular frequency of the second coherent light as coordinate axes, on a plane having the two angular frequencies as coordinate axes.

A second display device according to the present invention comprises: data collecting means for collecting data related to at least one of the absorption difference and photoluminescence difference according to second optical detection method; and display means for displaying the data and a set of peaks of a data distribution curved surface formed by the data collected by said data collecting means in a space having an angular frequency of the first coherent light and an angular frequency of the second coherent light as coordinate axes, on a plane having the two angular frequencies as coordinate axes.

A third display device according to the present invention comprises: data collecting means for collecting data related to at least one of the absorption difference and photoluminescence difference according to second optical detection method; and display means for displaying absolute values of the data collected by said data collecting means on a plane having an angular frequency of the first coherent light and an angular frequency of the second coherent light as coordinate axes.

A fourth display device according to the present invention comprises: display means for displaying, when a solid body including a physical structure having an energy level structure constituted by at least three energy levels, the number of physical structures included in said solid body is N, the predetermined three levels of ith physical structure are called first, second, and third levels, and energies of the first, second, and third levels are $\epsilon_{i1}$, $\epsilon_{i2}$, and $\epsilon_{i3}$, respectively, the distribution of ($|\epsilon_{i3}-\epsilon_{i1}|$, $|\epsilon_{i3}-\epsilon_{i2}|$) in the N physical structures on a plane having a first angular frequency corresponding to transition between the first level and the third level and a second angular frequency corresponding to transition between the second level and the third level as coordinate axes.

In this case, the physical structure means a quantum structure such as a quantum dot, a quantum wire, or a quantum well, a crystal defect such as a point defect, an impurity atom, or the like.

The number N of physical structures is the number of physical structures included in a portion on which coherent light is irradiated. The number N may be the number of physical structures included in an entire solid body serving as an object to be detected, or may be the number of physical structures included in a specific portion of the solid body.

In addition, in the first display device of the present invention, in particular, the line-width of the first coherent light is represented by $\delta\omega_p$, the line-width of the second coherent light is represented by $\delta\omega_c$, and a homogeneous line-width related to transition between the first level and the third level is represented by $\omega_{homo31}$. At this time, data according to the first and second manners obtained by adding the condition under which $\delta\omega_p \leq \omega_{homo31}$ and/or $\delta\omega_c \leq \omega_{homo31}$ are satisfied may be used.

As the absolute value of the difference between a plurality of pairs ($\omega_p$, $\omega_c$), data according to the third manner obtained by adding the condition under which two pairs ($\omega_p$, $\omega_c$) related to transition between the first level and the third level and smaller than the homogeneous line-width are present may be used.

In particular, under the condition under which the value of $\omega_p - \omega_c$ or the value of $\omega_p + \omega_c$ is constant, data according to the fourth manner obtained by adding the condition under which the first and second coherent light are irradiated on a solid body while sweeping the frequencies of the first and second coherent light may be used.

Similarly, in the second and third display devices of the present invention, in particular, the line-width of the first coherent light is represented by $\delta\omega_p$, in place of data obtained by the second optical detection method, in the second optical detection method, the line-width of the second coherent light is represented by $\delta\omega_c$, and a homogeneous line-width related to transition between the first level and the third level is represented by $\omega_{homo31}$. At this time, data according to the first and second manners obtained by adding the condition under which $\delta\omega_p \leq \omega_{homo31}$ and/or $\delta\omega_c \leq \omega_{homo31}$ are satisfied may be used.

As the absolute value of the difference between $\omega_c$ in a plurality of pairs ($\omega_p$, $\omega_c$), data according to the third manner obtained by adding the condition under which two pairs ($\omega_p$, $\omega_c$) related to transition between the first level and the third level and smaller than the homogeneous line-width are present may be used.

In particular, under the condition under which the value of $\omega_p - \omega_c$ or the value of $\omega_p + \omega_c$ is constant, data according to the fourth manner obtained by adding the condition under which the first and second coherent light are irradiated on a solid body while sweeping the frequencies of the first and second coherent light may be used.

A recording/reproducing method according to the present invention, in recording, comprises the steps of: preparing, as a recording medium, a solid body having an energy level structure constituted by at least three energy levels; and changing the distribution of ($\omega_{i31}$, $\omega_{i32}$) in the N physical structures to record information on said recording medium, here the number of physical structures included in said solid body is N; the predetermined three levels of ith physical structure are called first, second, and third levels; h is a Plank's constant, the energy of the first level is $h\omega_{i1}/2\pi$, the energy of the second level is $h\omega_{i2}/2\pi$, and the energy of the third level is $h\omega_{i3}/2\pi$; and $|\omega_{i3}-\omega_{i1}|$ is $\omega_{i31}$, $|\omega_{i3}-\omega_{i2}|$ is $\omega_{i32}$, and $|\omega_{i2}-\omega_{i1}|$ is $\omega_{i21}$, and in reproducing, comprises the steps of: preparing, as a recording medium, a solid body having an energy level structure constituted by at least three energy levels; and detecting a distribution of the ($\omega_{i31}$, $\omega_{i32}$) or a distribution of the $\omega_{i21}$ in N physical structures to reproduce information recorded on said recording medium, where the number of physical structures included in said solid body is N; the predetermined three levels of ith physical structure are called first, second, and third levels; h is a Plank's constant, the energy of the first level is $h\omega_{i1}/2\pi$, the energy of the second level is $h\omega_{i2}/2\pi$, and the energy of the third level is $h\omega_{i3}/2\pi$; and $|\omega_{i3}-\omega_{i1}|$ is $\omega_{i31}$, $|\omega_{i3}-\omega_{i2}|$ is $\omega_{i32}$, and $|\omega_{i2}-\omega_{i1}|$ is $\omega_{i21}$.

In this case, the physical structure means a quantum structure such as a quantum dot, a quantum wire, or a quantum well, a crystal defect such as a point defect, an impurity atom, or the like. The number N of physical structures is the number of physical structures included in a portion on which coherent light is irradiated. The number N may be the number of physical structures included in an entire solid body serving as an object to be detected, or may be the number of physical structures included in a specific portion of the solid body.

In order to change the distribution, for example, light or an electron beam is irradiated on a recording medium, an electric field or a magnetic field is applied to the recording medium, or a pressure is applied to the recording medium.

A preferred manner of another recording/reproducing method according to the present invention is as follows.

(1) In recording, the solid body has a fourth level at which the structure changes when electrons are excited at the level, if $|\omega_{i4}-\omega_{i1}|$ is $\omega_{i41}$, $|\omega_{i4}-\omega_{i2}|$ is $\omega_{i42}$, and $|\omega_{i4}-\omega_{i3}|$ is $\omega_{i43}$; of the N physical structures, the maximum value of $\omega_{i41}$ is max($\omega_{i41}$1), and the minimum value is min($\omega_{i41}$); of the N physical structures, the maximum value of $\omega_{i42}$ is max($\omega_{i42}$), and the minimum value is min($\omega_{i42}$); of the N physical structures, the maximum value of $\omega_{i43}$ is max($\omega_{i43}$), and the minimum value is min($\omega_{i43}$); and a Rabi frequency of the first coherent light is $\Omega_p$, and a Rabi frequency of the second coherent light is $\Omega_c$, when $\Omega_p<\Omega_c$, the first and second coherent light and third coherent light having an angular frequency larger than min($\omega_{i41}$) and smaller than max($\omega_{i41}$) or an angular frequency larger than min($\omega_{i43}$) and smaller than max ($\omega_{i43}$) are irradiated on said recording medium, and when $\Omega_p>\Omega_c$, the first and second coherent light and third coherent light having an angular frequency larger than min($\omega_{i42}$) and smaller than max($\omega_{i42}$) or an angular frequency larger than min($\omega_{i43}$) and smaller than max ($\omega_{i43}$) are irradiated on said recording medium, thereby recording information on said recording medium.

(2) In recording, the step of detecting a distribution of the ($\omega_{i31}$, $\omega_{i32}$) or a distribution of the $\omega_{i21}$ to reproduce the information recorded on said recording medium is further provided.

(3) In reproducing, when, of the N physical structures, the maximum value of $\omega_{i31}$ is max($\omega_{i31}$), and the minimum value is min($\omega_{i31}$); of the N physical structures, the maximum value of $\omega_{i32}$ is max($\omega_{i32}$), and the minimum value is min($\omega_{i32}$); and an angular frequency of the first coherent light is $\omega_p$, and an angular frequency of the second coherent light is $\omega_c$, the first and second coherent light which satisfy conditions min($\omega_{i31}$)<$\omega_p$<max($\omega_{i31}$) and min($\omega_{i32}$)<$\omega_c$<max($\omega_{i32}$) are irradiated on said recording medium, at least one of absorption of the first coherent light in said recording medium and photoluminescence of said recording medium generated through the absorption of the first coherent light with respect to a plurality of pairs ($\omega_p$, $\omega_c$), thereby reproducing information recorded on said recording medium.

(4) In reproducing, when, of the N physical structures, the maximum value of $\omega_{i31}$ is max($\omega_{i31}$), and the minimum value is min($\omega_{i31}$); of the N physical structures, the maximum value of $\omega_{i32}$ is max($\omega_{i32}$), and the minimum value is min($\omega_{i32}$); an angular frequency of the first coherent light is $\omega_p$, an angular frequency of the second coherent light is $\omega_c$, and $\omega_p-\omega_c$ is $\Delta\omega$; and absorption of the first coherent light in said recording medium when the first and second coherent light which satisfy conditions $\Delta\omega$ is constant, min($\omega_{i31}$)<$\omega_p$<max($\omega_{i31}$), and min($\omega_{i32}$) <$\omega_c$<max($\omega_{i32}$) are irradiated on said recording medium is $I_{ab}(\omega_p; \omega_c)$, and photoluminescence of said recording medium generated through the absorption of the first coherent light is $I_{lu}(\omega_p; \omega_c)$, at least one of $I_{ab}(\Delta\omega)=\int I_{ab}(\omega_p; \omega_p-\Delta\omega)d\omega_p$, and $I_{lu}(\Delta\omega)=\int I_{lu}(\omega_p; \omega_p-\Delta\omega)d\omega_p$ is calculated with respect to a plurality of different $\Delta\omega$, thereby reproducing information recorded on said recording medium.

In this case, in order to efficiently change the distribution of ($\omega_{i31}$, $\omega_{i32}$), i.e., the distribution of $\omega_{i21}$, an electric field or a magnetic field is preferably applied to moment the first, second, and third coherent light are irradiated.

Information may be reproduced in the following manner.

Under the condition min($\epsilon_{i31}$)<$h\omega_p/2\pi$<max ($\epsilon_{i31}$) at least one of an absorption difference between absorption of the first coherent light when only the first coherent light is irradiated on a recording medium and absorption of the first coherent light when the first and second coherent light are irradiated on the recording medium and a photoluminescence difference between photoluminescence of the recording medium generated through the absorption of the first coherent light when only the first coherent light is irradiated on the recording medium and photoluminescence of the recording medium generated through the absorption of the first coherent light when the first and second coherent light are irradiated on the recording medium is measured with respect to a plurality of pairs ($\omega_p$, $\omega_c$).

In this case, in the plurality of pairs ($\omega_p$, $\omega_c$), two pairs ($\omega_p$, $\omega_c$) in which the absolute value of the difference between $\omega_c$ is equal or smaller than a homogeneous linewidth related to transition between the first level and the third level is preferably present.

A recording/reproducing device according to the present invention comprises: a solid body serving as a recording medium and having an energy level structure constituted by at least three energy levels; and an optical system for irradiating the first and second coherent light on said recording medium, wherein said optical system includes means for changing angular frequencies of the first and second coherent light within a range which satisfies conditions min($\omega_{i31}$) <$\omega_p$<max($\omega_{i31}$) and min($\omega_{i32}$)<$\omega_c$<max($\omega_{i32}$), where the number of physical structures included in said solid body is N; the predetermined three levels of ith physical structure are called first, second, and third levels; h is a Plank's constant, the energy of the first level is $h\omega_{i1}/2\pi$, the energy of the second level is $h\omega_{i2}/2\pi$, and the energy of the third level is $h\omega_{i3}/2\pi$; $|\omega_{i3}-\omega_{i1}|$ is $\omega_{i31}$, and $|\omega_{i3}-\omega_{i2}|$ is $\omega_{i32}$; of the N physical structures, the maximum value of $\omega_{i31}$ is max$(\omega_{i31})$; of the N physical structures, the minimum value of $\omega_{i32}$ is min$(\omega_{i32})$; an angular frequency of the first coherent light is $\omega_p$, an angular frequency of the first coherent light is $\omega_c$, and $\omega_p-\omega_c$ is $\Delta\omega$.

In this case, the physical structure means a quantum structure such as a quantum dot, a quantum wire, or a quantum well, a crystal defect such as a point defect, an impurity atom, or the like.

A preferred manner of the recording/reproducing device according to the present invention is as follows.

(1) The optical system has means for changing the angular frequencies of the first and second coherent light under the condition under which $\Delta\omega$ is constant when $\omega_p-\omega_c=\Delta\omega$.

In this case, the number N of physical structures is the number of physical structures included in a portion on which coherent light is irradiated. The number N may be the number of physical structures included in an entire solid body serving as an object to be detected, or may be the number of physical structures included in a specific portion of the solid body.

(2) The solid body has a fourth level at which the structure changes when electrons are excited at the level, and said optical system, when the energy of the fourth level is $h\omega_{i4}/2\pi$, $|\omega_{i4}-\omega_{i1}|$ is $\omega_{i41}$, $|\omega_{i4}-\omega_{i2}|$ is $\omega_{i42}$, and $|\omega_{i4}-\omega_{i3}|$ is $\omega_{i43}$; of the N physical structures, the maximum value of $\omega_{i41}$ is max$(\omega_{i41})$, and the minimum value is min$(\omega_{i41})$; of the N physical structures, the maximum value of $\omega_{i42}$ is max$(\omega_{i42})$, and the minimum value is min$(\omega_{i42})$; of the N physical structures, the maximum value of $\omega_{i43}$ is max$(\omega_{i43})$, and the minimum value is min$(\omega_{i43})$; and a Rabi frequency of the first coherent light is $\Omega_p$, and a Rabi frequency of the second coherent light is $\Omega_c$, when $\Omega_p<\Omega_c$, the first and second coherent light and third coherent light having an angular frequency not smaller than min$(\omega_{i41})$ and not larger than max$(\omega_{i41})$ or an angular frequency not smaller than min$(\omega_{i43})$ and not larger than max$(\omega_{i43})$ are irradiated on said recording medium, and when $\Omega_p>\Omega_c$, the first and second coherent light and third coherent light having an angular frequency not smaller than min$(\omega_{i42})$ and not larger than max$(\omega_{i42})$ or an angular frequency not smaller than min$(\omega_{i43})$ and not larger than max$(\omega_{i43})$ are irradiated on said recording medium, thereby recording information on said recording medium.

(3) The optical system has means for measuring at least one of absorption of the first coherent light in said recording medium and photoluminescence of said recording medium generated through the absorption of the first coherent light.

(4) Means for changing a distribution of $(\omega_{i31}, \omega_{i32})$ in the N physical to record information on said recording medium, and for detecting a distribution of the $(\omega_{i31}, \omega_{i32})$ or a distribution of the $\omega_{i21}$ to reproduce the information, wherein $|\omega_{i2}-\omega_{i1}|$ is $\omega_{i21}$ is further provided.

In order to efficiently change the distribution of $(\omega_{i31}, \omega_{i32})$, i.e., the distribution of $\omega_{i21}$, an electric field or a magnetic field is preferably applied the moment the first, second, and third coherent light are irradiated.

In the present invention, when the line-width of the second coherent light is represented by $\delta\omega_c$, and a homogeneous line-width related to transition between the first level and the third level is represented by $\omega_{homo31}$, the condition $\delta\omega_c \leq \omega_{homo31}$ is desirably satisfied.

As described above, according to the present invention, in order to optically detect the physical structure in a solid body, a brand-new detection principle which uses a very high frequency resolving power belonging to an EIT phenomenon and a new function of a solid system EIT phenomenon is employed. In this manner, an optical detection method which is considerably better than a conventional one can be realized. In addition, according to the present invention, a brand-new recording/reproducing principle using a very high frequency resolving power belonging to the EIT phenomenon is employed, recording/reproducing using the states of respective atoms or molecules as recording units can be realized.

The optical detection method (device) and recording/reproducing method (device) will be described below in detail.

In the above description, the first, second, and third levels (state vectors) are expressed by $|i1>$, $|i2>$, and $|i3>$, respectively, which relate to i-th physical structure.

The relationship between the three levels and light has four energy schemes as shown in FIGS. 1A to 1D. However, an energy scheme called a $\Lambda$ type shown in FIG. 1A will be described below. In the $\Lambda$ type, $|i1>(|1>)$, $|i2>(|2>)$, and $|i3>(|3>)$ are arranged in a energy ascending order.

In a V type shown in FIG. 1B, in contrast to the $\Lambda$ type, the three levels $|i1>(|1>)$, $|i2>(|2>)$, and $|i3>(|3>)$ are arranged in an energy descending order. In this case, the same discussion as in the $\Lambda$ type is established.

In a $\Xi$ energy scheme, as shown in FIG. 1C, the three levels $|i1>(|1>)$, $|i3>(|3>)$, and $|i2>(|2>)$ are arranged in an energy descending order, or as shown in FIG. 1D, the three levels $|i1>(|1>)$, $|i3>(|3>)$, and $|i2>(|2>)$ are arranged in an energy ascending order. In this case, the same discussion as in the $\Lambda$ type is established.

The characteristics of the EIT having one physical structure will be described below.

The EIT is constituted by two laser beams which connect the three levels related to the single physical structure. In the $\Lambda$ type, three levels are selected such that $|i1>|i3>$ and $|i2>\to|i3>$ are allowed transitions, and $|1>\to|2>$ is a forbidden transition.

Light which connects $|1>$ and $|3>$ in a ground state to each other is called probe laser, and light which connects $|2>$ and $|3>$ serving as two levels to each other is called coupling laser.

A frequency difference between a frequency $\omega_p$ of the probe laser and a resonance frequency $2\pi\cdot\epsilon_{31}/h$ corresponding to an energy difference between the levels $|1>\to|3>$ is represented by $\Delta\omega_p$, and the frequency $\omega_c$ of the coupling laser and a resonance frequency $2\pi*1_{\omega1}/h$ corresponding to an energy difference between the levels $|2>\to|3>$ is represented by $\Delta\omega_c$.

The respective strengths are expressed by Rabi frequency $\Omega_c$ and $\Omega_p$ defined by the following equations;

$$\Omega_c = 2\pi<3|\mu\cdot E|2>/h \tag{$1_1$}$$

$$\Omega_p = 2\pi<3|\mu\cdot E|1>/h \tag{$1_2$}$$

where $\mu$ is an operator according to a dipole moment, and E is an operator according to an electric field.

The following state is considered. That is, the following two levels as expressed by the following equations are cross-multiplied by the Rabi frequencies to establish linear coupling.

$$|+> = (\Omega_c|1>+\Omega_p|2>)/(\Omega_c^2+\Omega_p^2)^{1/2} \tag{$2_1$}$$

$$|-> = (\Omega_c|1>-\Omega_p|2>)/(\Omega_c^2+\Omega_p^2)^{1/2} \tag{$2_2$}$$

In this case, the following phenomenon is easily shown. That is, when detuning of two laser beams from resonance are equal to each other, i.e., $\Delta\omega_c=\omega_p$, in consideration of a change in population related to the three-level system with time, although the population of |–> may increase, the population does not decrease.

Therefore, the probability of occupying |–> in a stationary state becomes 1. This phenomenon is called population-trapping. At this time, a value of dipole moment between |–> and |3> is exactly 0 as expressed in the following equation:

$$<3|\mu \cdot E|-> = (h/2\pi)(\Omega_c \cdot \Omega_p - \Omega_p \cdot \Omega_c)/(\Omega_c^2+\Omega_p^2)^{1/2} = 0 \quad (3)$$

and absorption does not occur. This phenomenon is EIT. A physical origin which presents absorption can be considered such that transitions of |1>→|3> and |2>→|3> in |–> are canceled by an interference effect.

As is apparent from $(2_1)$ and $(2_2)$, the level |–> in which trapping occurs is constituted by a Rabi frequency, i.e., a ratio of light intensities with respect to |1> and |2>. Therefore, the nature of |–> can be changed by changing the light intensity.

When $\Omega_c>>\Omega_p$, trapping occurs in |–>~|1>, i.e., a state near a ground state. In contrast to this, when $\Omega_c<<\Omega_p$, trapping occurs in a state near the following excited state |2>.

The shape of the absorption spectrum from |1> to |3> when the EIT occurs is shown in FIGS. 2A and 2B. That is, in the absorption spectrum, an absorption hole, i.e., a transparent region, is formed at a position of $\omega_p$ which satisfies the condition $\Delta\omega_p=\Delta\omega_c$.

When $\Delta\omega_c=0$, as shown in FIG. 2A, a hole is formed at a position at which $\Delta\omega_p=0$ is satisfied, i.e., at the center of the absorption spectrum.

When $\Delta\omega_c \neq 0$, as shown in FIG. 2B, a hole is formed in the tail region of absorption.

The width of the hole is almost equal to the Rabi frequency $\Omega_c$ of the coupling laser. Therefore, the width of the hole can be controlled by changing the intensity of the coupling laser.

A case wherein a plurality (N) of physical structures are used will be considered.

As described above, the homogeneous and inhomogeneous line-widths in a solid system are larger than those in an atomic gas system. For this reason, the spectrum of the solid system is very broad spectra obtained such that the spectra of the respective physical structures which extend with the homogeneous line-width are distributed and overlapped. Such a situation can be obtained in not only the transition |1>→|3> but also the transition |2>→|3>.

Therefore, as in an EIT experiment performed in an atomic gas system, an EIT signal observed in a state wherein $\omega_c$ is fixed is a very small signal as shown in FIG. 3 because the number of physical structures which satisfy an EIT condition in which detuning states are equal to each other due to the distributions of $\epsilon_{i31}$ and $\epsilon_{i32}$.

In addition to the above, the characteristic features of the EIT are not conspicuous such that a point to which one physical structure for the EIT characteristics of the entire system is contributed is not conspicuous. To make the characteristic features of one physical structure conspicuous is important in consideration of realization of EIT and LWI in a solid system and applications thereof. However, at present, the EIT characteristics of each physical structure appearing in the absorption characteristics of $\omega_p$ on the $\omega_p$ axis cannot be easily detected, and a method of controlling the EIT characteristics are not conspicuous. Therefore, any application of the EIT can not be easily considered.

The central concept of a spectrum detection method at a single physical structure (molecular/atomic) level according to the present invention, an device for displaying the detection result, and recording/reproducing is to consider an absorption characteristic change of $\omega_p$ on a $(\omega_p, \omega_c)$ plane. In this manner, as described below, not only detection of the EIT characteristics of a physical structure, but also a change in EIT characteristic $(\epsilon_{i31}, \epsilon_{i32})$ distribution of respective physical structures can be performed, and recording/reproducing at a single physical structure level can be performed.

According to this method, as described below, the EIT characteristics of one physical structure are strictly characterized. In addition, the relationship between the entire system and the EIT characteristics is conspicuous. Therefore, a new knowledge related to the levels of the physical structure can be obtained on the basis of an observed signal.

One physical structure is considered. A change amount when the frequency $\omega_c$ of the coupling laser is changed with respect to absorption of $\omega_p$ for the transition |1>→|3> is considered on a $(\omega_p, \omega_c)$ plane.

FIGS. 4A to 4C show characteristics under the condition $\Omega_p<\Omega_c<$ (homogeneous line-width). A phenomenon itself appearing in a spectrum is very simple. As shown in FIG. 4A, as a matter of course, an absorption spectrum of one physical structure is obtained by cutting at a plane which satisfies $\omega_c$=const.

The condition under which the EIT occurs is $\Delta\omega_p=\Delta\omega_c$. The EIT occurs on a line crossing a $\omega_p$ axis at 45-degree with $(\omega_p=\omega_{13}=2\pi\cdot\epsilon_{31}/h, \omega_c=\omega_{23}=2\pi\epsilon_{31}/h)$ in the center.

FIG. 4B is a manner of a spectrum when viewed from the direction crossing a $\omega_p$ at 45-degree. As is apparent from FIG. 4B, a narrow hole having a width corresponding to $\frac{1}{2}^{1/2}$ of the Rabi frequency of the coupling laser.

When only the portion of this hole is extracted, as shown in FIG. 4C, the portion is obtained by rotating the absorption spectrum of the single physical structure at 45-degree. It is found that the absorption spectrum is a thin-plate-like spectrum having a thickness which is almost equal to the Rabi frequency.

A case wherein a plurality of physical structures are used is considered. A thin-plate-like absorption hole caused by each physical structure in the EIT is formed on $(\omega_p, \omega_c)$ plane with a point $(\omega_{13}(i), \omega_{23}(i))$ corresponding to the interlevel energy of the physical structures in the center.

In a solid system, an inhomogeneous line-width is large, and $\omega_{13}(i)$ and $\omega_{23}(i)$ are dispersed on a $\omega_p$ axis and a $\omega_c$ axis, respectively. When the Rabi frequency is decreased to decrease the thickness of each plate, as shown in FIG. 5, the contributions of the respective physical structures can be completely separated from each other on a $(\omega_p, \omega_c)$ plane.

In this manner, in consideration of a change in absorption characteristics of $\omega_p$ on the $(\omega_p, \omega_c)$ plane, absorption holes caused by the physical structures separately appear in the physical structures, respectively. In addition, the central position of each hole is a point $(\omega_{13}(i), \omega_{23}(i))$.

Therefore, an EIT signal of the entire system on the $(\omega_p, \omega_c)$ plane is observed, and a position where a plate-like hole is formed in absorption is examined. In this case, the positions of energies $\epsilon_{i31}$ and $\epsilon_{i32}$ of the physical structures are known, and evaluation which has never exist is realized.

When the distribution of $(\epsilon_{i31}, \epsilon_{i32})$ in the N physical structures is changed by, e.g., laser irradiation, to record information on a recording medium, the information can be reproduced such that the distribution of $(\epsilon_{i31}, \epsilon_{i32})$ is detected by the above method.

In order to detect the absorption characteristics of $\omega_p$ on the $(\omega_p, \omega_c)$ plane as shown in FIGS. 4A to 5, absorption of $\omega_p$ is inevitably measured with respect to a plurality of $\omega_c$.

When absorption of $\omega_p$ is measured with respective to single $\omega_c=\omega_c^0$, a spectrum having a sectional shape obtained by cutting the absorption characteristics shown in FIGS. 4A to 5 on a plane expressed by $\omega_c=\omega_c^0$ (=const).

Therefore, in a physical structure in which energies $\epsilon_{i31}$ and $\epsilon_{i32}$ are distributed in a wide area, an absorption hole may be detected in only a physical structure which satisfies a relation $2\pi\epsilon_{i32}$~$h\omega_c^0$.

In addition, even if the relation $2\pi\epsilon_{i32}$~$h\omega_c^0$ is satisfied, when the peak of the absorption hole does not exist on the $\omega_c=\omega_c^0$ plane, a signal corresponding to the absorption hole is very weak, and the position of the hole cannot be easily identified.

With respect to the set value of $\omega_c^0$, the peak of the absorption hole rarely exist on the $\omega_c=\omega_c^0$ plane. For this reason, the following finding can be obtained. That is, absorption of $\omega_p$ must be measured with respect to a plurality of $\omega_c$ but a single $\omega_c$ to detect an absorption hole caused by each physical structure with respect to a physical structure group which is energetically distributed.

An absorption hole shown in FIGS. 4A to 5 is obtained by rotating the absorption spectrum of the single physical structure at 45-degree. The width in the longitudinal direction, i.e., a direction parallel to $\omega_c=\omega_p$+const., is almost equal to the homogeneous line-width of the spectrum of the single physical structure.

For this reason, in order to detect each absorption hole, not only the line-width of coherent light corresponding to $\omega_p$, but also the line-width of coherent light corresponding to $\omega_c$ are preferably equal to or smaller than the homogeneous line-width.

Not only the intervals between $\omega_p$ in measurement, but also the intervals between a plurality of $\omega_c$ are preferably set to be almost equal to or smaller than the homogeneous line-width.

In order to detect an absorption hole on the $(\omega_p, \omega_c)$ plane, the absorption characteristics of a plurality of pairs of $\omega_p$ and $\omega_c$ must be observed. In particular, the absorption characteristics of many pairs of $\omega_p$ and $\omega_c$ must be observed to detect the absorption holes of all the physical structures. For this reason, it is important to shorten the observing time.

In order to consider the observing time, a period of time required until the physical structure system is set in the stationary state of EIT must be considered. More specifically, when the values of $\omega_p$ and $\omega_c$ are changed, the condition of an energy level which is the resonance condition of the EIT and satisfies $\Delta\omega_p=\Delta\omega_c$ changes.

Relaxation time determined by the life time of an excited state is required until the physical structure which satisfies the resonance condition reaches the EIT stationary state. Therefore, in order to perform detection within a short period of time, $\omega_p$ and $\omega_c$ must be swept such that the EIT resonance condition minimally changes.

As is apparent from the equation of detuning of a frequency, sweeping to keep the value of $(\omega_p-\omega_c)$ constant when the three levels are of a $\Lambda$ type or a V type and sweeping to keep the value of $(\omega_p+\omega_c)$ constant when a value is changed in a $\Xi$ type do not change the EIT condition. Therefore, in order to detect the absorption holes having a high density, such frequency sweeping is desirably performed.

On the other hand, sweeping to keep the value of $(\omega_p+\omega_c)$ constant when the three levels are of the $\Lambda$ type or the V type and sweeping to keep the value of $(\omega_p-\omega_c)$ in the $\Xi$ type are advantageous to improve detection sensitivity. This is because the holes are formed in a direction parallel to $\omega_c=\omega_p$+const. in the $\Lambda$ type or the V type, and because scanning under the condition under which $(\omega_p+\omega_c)$ is constant corresponds scanning along a line perpendicular to the absorption holes. Therefore, a change in signal in scanning corresponding to the absorption hole is maximum. For this reason, detection sensitivity is maximum. In the $\Xi$ type, scanning under the condition under which $(\omega_p-\omega_c)$ is constant corresponds scanning along a line perpendicular to the absorption hole, and maximum detection sensitivity can be obtained. As described above, the following finding can be obtained. That is, independently of a level scheme, the scanning under the condition under which $(\omega_p+\omega_c)$ is constant and the scanning under the condition under which $(\omega_p-\omega_c)$ is constant are effective scanning methods in the present invention.

The present invention described above has the following unique effect which cannot be obtained in the NSOM method developed in recent years or an SMD (Single Molecule Detection) method using photoluminescence excitation at an extremely low temperature.

The NSOM method is effective only on a surface, and the SMD method is effective when a single impurity molecule is present at an excitation spot. According to the present invention, a large number of physical structures can be separately detected in a space, on a surface, or in a bulk without any limitation.

Since this invention resolves the inhomogeneously-broadened spectrum, the characteristics of physical structures present at a portion, e.g., on a surface or an interface where a value of an internal electric field causing the inhomogeneous line-width largely changes can be detected separately from the characteristics of the physical structure present in a solid body.

In addition, when a magnetic or electric field is applied to a solid body, a position of a plate-like hole in absorption can be examined, which enables us to analyze a response of the three levels to the magnetic or electric field.

As described above, according to the present invention, an optical spectrum and the energy levels related to a physical structure such as an impurity or quantum structure included in a solid body can be detected at a single physical structure level.

In addition, when a brand-new recording/reproducing principle using a very high frequency resolving power of the EIT phenomenon is employed, recording/reproducing information using the states of atoms or molecules as recording units can be realized.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a graph showing absorption holes observed by an absorption spectrum for a frequency $\omega_p$ of probe laser with respect to N physical structures such that the sign of the absorption holes is inverted on a ($\omega_p$, $\omega_c$) plane;

FIG. 6 is a view showing the energy level of an Eu atom used in the first embodiment;

FIG. 7 is a graph showing absorption characteristics obtained according to an optical detection method of the first embodiment of the present invention when a sample temperature is 4K;

FIG. 10 is a graph showing the energy distribution of holes observed in an absorption spectrum;

FIG. 11 is a graph for proofing that absorption holes in FIGS. 7 to 9 are the holes of the absorption spectrum of a single Eu atom;

FIG. 12 is a graph showing absorption characteristics obtained according to an optical detection method of the first embodiment of the present invention when a sample temperature is 8K;

FIGS. 22A and 22B are graphs showing the distributions of $I_{ab}(\omega_p; \omega_c)$ and $\Delta I_{ab}(\omega_p; \omega_c)$ related to N physical structures for explaining a principle of reproducing information in the fourth embodiment;

FIG. 23 is a graph showing the energy distribution of a physical structure, which is turned into population-trapping, by first and second coherent light applied;

FIG. 24 is a view for explaining a recording method when $\Omega_p < \Omega_c$ in the fifth embodiment;

FIG. 25 is a graph showing the energy distribution of physical structure, in the physical structure, which is turned into population-trapping, by first and second coherent light applied, excited to the fourth level by third coherent light applied, and then ionized and changed;

FIG. 26 is a view for explaining a recording method when $\Omega_p > \Omega_c$ in the fifth embodiment;

FIG. 29 is a view showing the energy levels of Eu used in the sixth embodiment;

FIG. 31 is a graph obtained by enlarging a region which satisfies $465.9880\ cm^{-1} < \Delta\omega < 466.0020\ cm^{-1}$ with respect to $\Delta I_{ab}(\Delta\omega)$ measured before recording in the sixth embodiment;

FIG. 35 is a graph showing $\Delta I_{ab}(\Delta\omega)$ read after information recording operations (1), (2), (3) are performed in the sixth embodiment;

FIG. 36 is a graph showing $\Delta I_{ab}(\Delta\omega)$ before information is recorded in the seventh embodiment;

DETAILED DESCRIPTION OF THE PREFERRED EMBODIMENTS

Embodiments of the present invention will be described below with reference to the accompanying drawings.

(First Embodiment)

In this embodiment, a YAG crystal containing 0.1 mol % of Eu as an impurity is used as a sample (material to be detected).

FIG. 6 shows the energy levels of Eu. The ground state of Eu is $^7F_0$. The excited state $^5D_1$ is present on a 18,950 cm$^{-1}$ high-energy side from the state $^7F_0$, and strong optical transition is caused between the state $^7F_0$ and the state $^5D_1$. The excited state $^7F_1$ is present on a 460 cm$^{-1}$ high-energy side from the state $^7F_0$, and a strong optical transition is caused between the state $^7F_1$ and the state $^5D_1$.

This sample is inserted into a cryostat having a variable temperature and an optical window whose visible band is transparent, and the sample temperature is kept at 4K by cooling using liquid helium. In this state, two ring dye lasers exited by an argon ion laser are irradiated on the sample. As a laser dye material for driving the two ring dye lasers, coumarin having a tuning range of 17,240 to 19,230 cm$^{-1}$ is used.

In this case, the line-width of each ring dye laser is adjusted to 500 kHz=0.000017 cm$^{-1}$. One (L1) of the ring dye lasers is adjusted to perform sweeping near a frequency $\omega_p$ of 18,950 cm$^{-1}$, and the other is adjusted to perform sweeping near a frequency $\omega_c$ of 18,490 cm$^{-1}$. The light intensities of the lasers are set such that the Rabi frequencies of the lasers L1 and L2 are set to be 3 MHz and 17 MHz, respectively.

In this embodiment, in order to analyze the energy distribution of Eu, the following optical detection method is used.

The frequency $\omega_c$ of the laser L2 is fixed to 18485.0000 cm$^{-1}$, and the frequency $\omega_p$ of the laser L1 is continuously changed from 18945.0000 cm$^{-1}$ to 18955.0000 cm$^{-1}$. In this manner, the absorption spectrum with respect to the laser L1 is detected.

The frequency $\omega_c$ of the laser L2 is increased by 0.0002 cm$^{-1}$ to be fixed to 18485.0002 cm$^{-1}$, and the frequency $\omega_p$ of the laser L1 is continuously changed from 18945.0000 cm$^{-1}$ to 18955.0000 cm$^{-1}$. In this manner, the absorption spectrum with respect to the laser L1 is detected.

The above process in which the frequency $\omega_c$ of the laser L2 is sequentially increased by 0.0002 cm$^{-1}$ and the absorption spectrum of the laser L1 is detected each time by changing the frequency $\omega_c$ of the laser L2 continuously is continued until the frequency $\omega_c$ of the laser L2 becomes 18495.0000 cm$^{-1}$.

Figure 8:
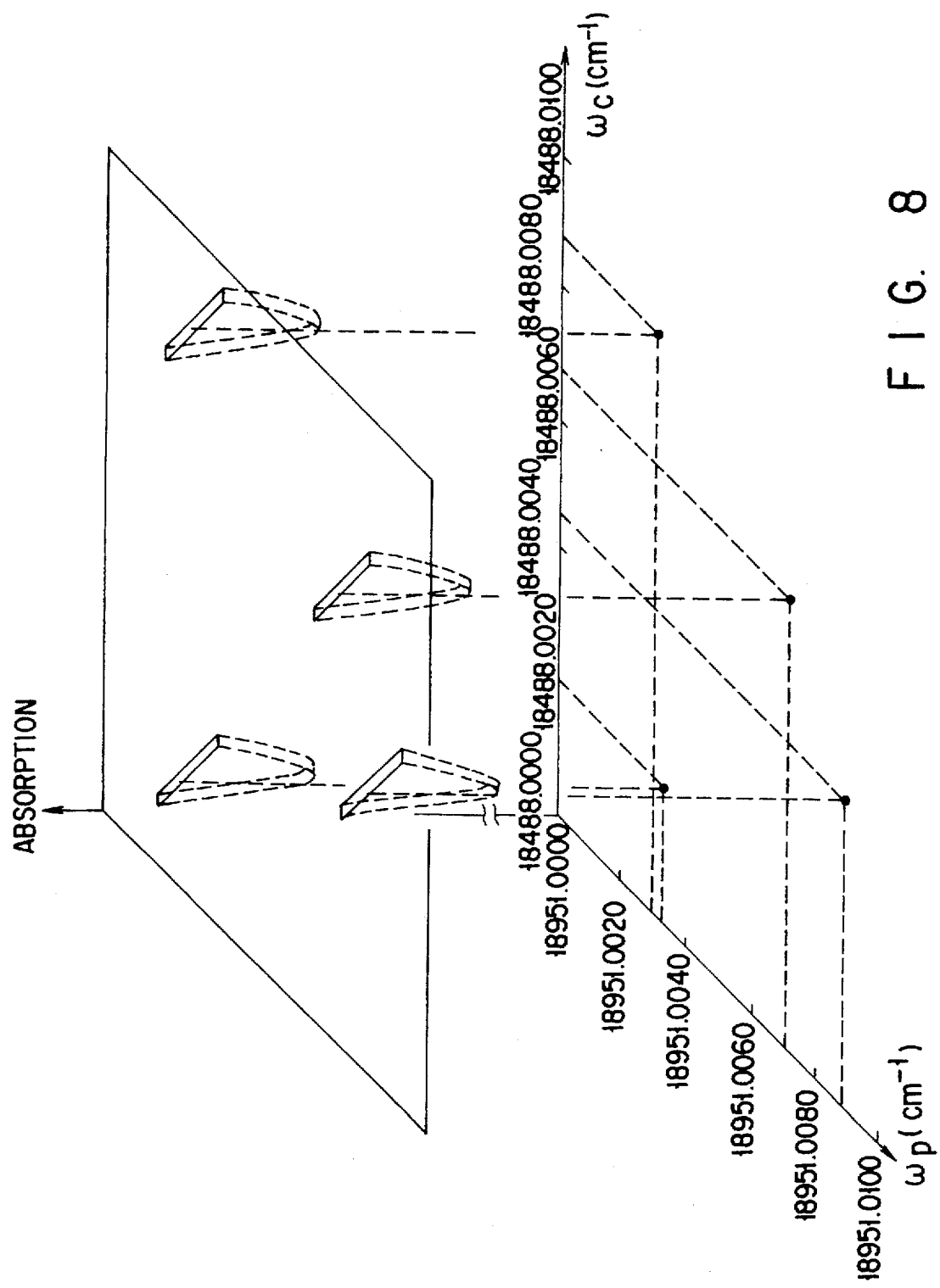
FIG. 8 is a graph obtained by partially enlarging the graph in FIG. 7.
Figure 9:
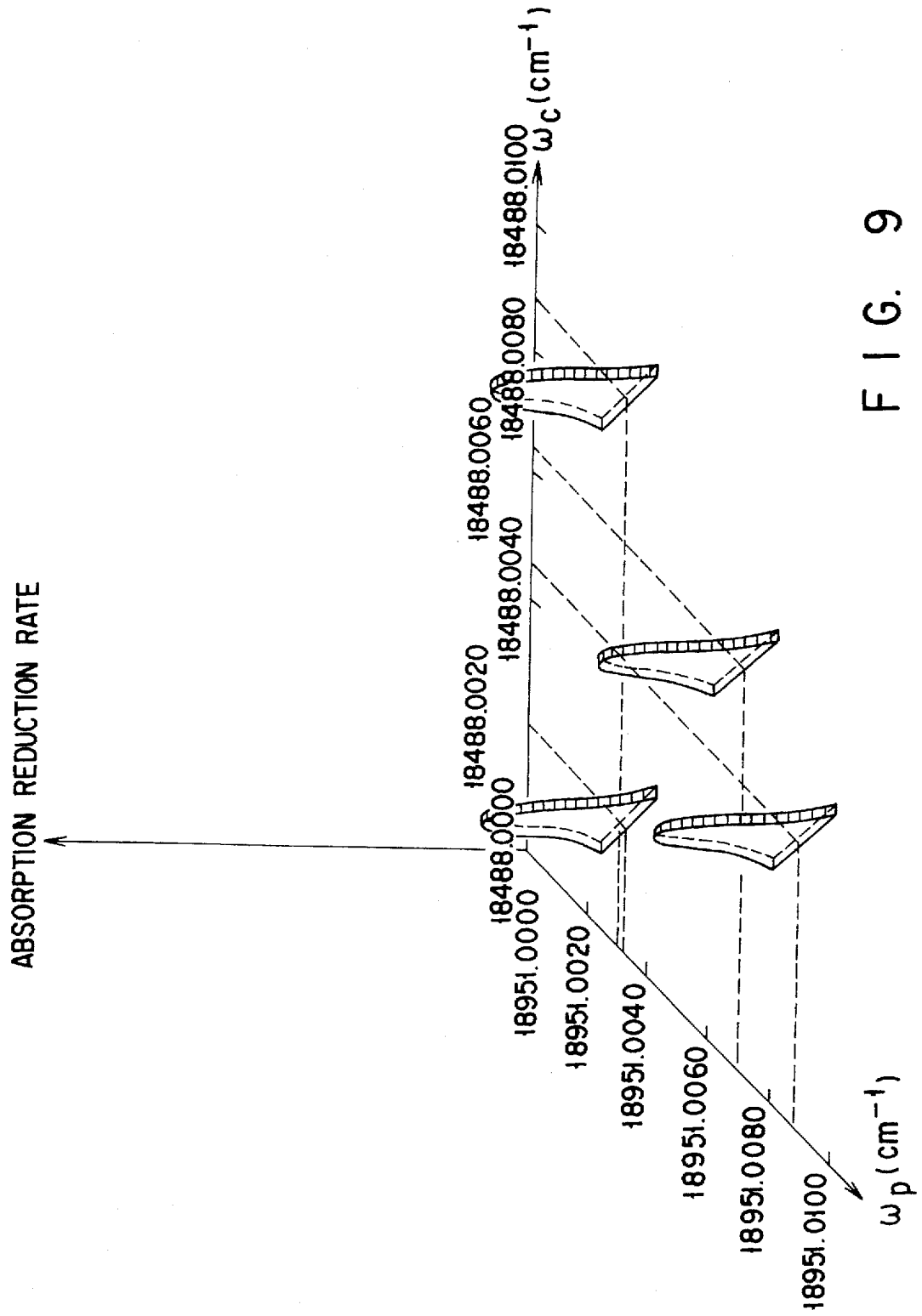
FIG. 9 is a graph showing a reduction in absorption which is extracted and whose sign is inverted in the graph in FIG. 8.

FIGS. 7 to 9 show the absorption spectra of the laser L1 which are obtained as described above on a $\omega_p$–$\omega_c$ plane having the frequency $\omega_p$ of the laser L1 and the frequency $\omega_c$ of the laser L2 as coordinate axes.

FIG. 7 shows the absorption spectrum of the laser L1 related to an entire scanning range having frequencies which satisfy 18945.0000-1 cm$^{-1} \leq \omega_p \leq$ 18955.0000 cm$^{-1}$ and 18485.0000 $\leq \omega_c \leq$ 18495.0000 cm$^{-1}$.

Referring to FIG. 7, a section obtained by cutting along a surface represented by $\omega_c$=const. has a peak of 18950.1020 cm$^{-1}$ regardless of the value of $\omega_c$, and the entire shape of the section almost coincides with an absorption spectrum corresponding to excitation from $^7F_0$ to $^5D_1$. However, small absorption holes formed at a high density by irradiation of the laser L2 (not shown).

FIG. 8 shows the spectrum of absorption holes such that the region represented by 18951.0000 cm$^{-1} \leq \omega_p \leq$ 18951.0100 cm$^{-1}$ and 18488.0000 cm$^{-1} \leq \omega_c \leq$ 18488.0100 cm$^{-1}$ is enlarged in the absorption spectrum.

As is apparent from FIG. 8, in the region shown in FIG. 8, four holes are formed, and each hole is a thin-long hole extending parallel to a straight line represented by $\omega_c$=$\omega_p$+const. on the $\omega_p$–$\omega_c$ plane.

The shape of each hole is thin and long as described below. That is, the hole is of a Lorentzian type in which a section obtained by cutting along a plane parallel to the straight line represented by $\omega_c$=$\omega_p$+const. has a full width at half maximum of 0.0016 cm$^{-1}$, and a section obtained by cutting along a plane perpendicular to the straight line represented by $\omega_c$=$\omega_p$+const. has a width of 0.0004 cm$^{-1}$.

The positions of the holes were represented by ($\omega_p$=18951.0030 cm$^{-1}$, $\omega_c$=18488.0088 cm$^{-1}$), ($\omega_p$=18951.0070 cm$^{-1}$, $\omega_c$=18488.0068 cm$^{-1}$), ($\omega_p$=18951.0088 cm$^{-1}$, $\omega_c$=18488.0046 cm$^{-1}$), and ($\omega_p$=18951.0032 cm$^{-1}$, $\omega_c$=18488.0020 cm$^{-1}$), respectively.

FIG. 9 is a graph in which only the portions of the above holes are extracted, and decreases in absorption are plotted on $\omega_p$–$\omega_c$ plane. As is apparent from FIG. 9, the respective holes have the same shapes and the same sizes.

FIG. 10 is a graph obtained such that the central positions of the holes are plotted in the region having an entire measurement frequency which satisfies 18945.0000$\leq \omega_p \leq$18955.0000 cm$^{-1}$ and 18485.0000 cm$^{-1}\leq \omega_c \leq$18495.0000 cm$^{-1}$.

As is apparent from FIG. 10, the holes formed in the absorption spectrum are distributed at the maximum density near 18950.1020 cm$^{-1}$ which is the peak frequency of the absorption spectrum of the laser L1, the density is low in a high- or low-frequency region corresponding to the tail of the absorption spectrum.

Consider a shape obtained by inverting the sign of each absorption hole, i.e., a shape obtained by projecting the reduction in absorption shown in FIG. 9 on a plane represented by $\omega_c$=const.

When all the observed holes were added to each other, as shown in FIG. 11, the resultant spectrum completely coincides with the absorption spectrum of the laser L1 shown in FIG. 7.

More specifically, it was found that the absorption holes observed in FIGS. 7 to 9 are holes of the absorption spectrum of a single Eu atom. Therefore, it is found that, in an ordinary absorption spectrum, a difference between energy levels of each atom observed as an inhomogeneous line-width is independently observed as the spectrum of each atom by the method according to the present invention.

The sample temperature was increased to 8K, the same measurement as described above was performed to the same irradiated portion.

FIG. 12 shows a decrease in observed absorption holes in an absorption spectrum related to a portion which is represented by 18951.0000 cm$^{-1}\leq \omega_p \leq$18951.0100 cm$^{-1}$ and 18488.0000 cm$^{-1}\leq \omega_c \leq$18488.0100 cm$^{-1}$ and which is the same as the frequency region in FIG. 8 such that the signs of the holes are changed.

Each of the four holes shown in FIG. 9 becomes shallow, and changes to have a shape extending in the straight line direction represented by $\omega_c$=$\omega_p$+const.

However, the central positions of the holes do not change. The width of a section obtained by cutting along a plane perpendicular to a straight line represented by $\omega_c$=$\omega_p$+const. is equal to the width in FIG. 9.

Therefore, as a result, the change from FIG. 9 to FIG. 12 occurs because the homogeneous line-width of a single atom spectrum related to each Eu atom increases.

FIG. 12 shows, in addition to the four holes, several tails of holes extending from adjacent frequency regions. These tails are caused by absorption holes whose central positions are located in adjacent frequency regions. It is easily found that the tails are not observed at a temperature of 4K because of the length of extension of the hole.

In this manner, according to the method of this embodiment, it is understood that a change in temperature of the spectrum of a single atom can be observed.

The same measurement as described above was performed while the positions of irradiation spots of the lasers L1 and L2 were changed.

Figure 13:
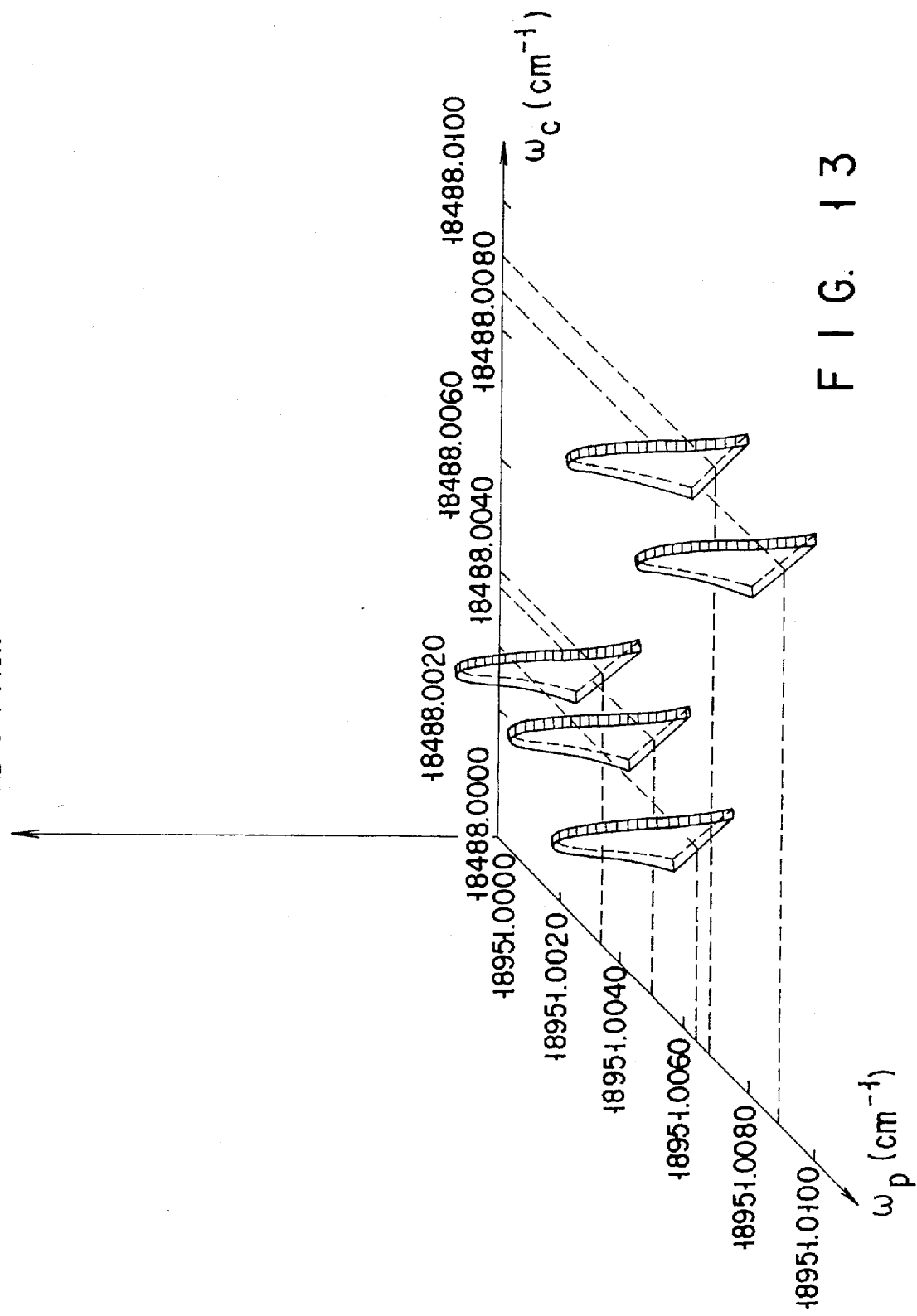
FIG. 13 is a graph showing absorption characteristics related to an irradiation portion different from that in FIG. 9.

FIG. 13 shows a spectrum in which absorption holes observed in a frequency region which is limited by $18951.0000 \text{ cm}^{-1} \leq \omega_p \leq 18951.0100 \text{ cm}^{-1}$ and $18488.0000 \text{ cm}^{-1} \leq \omega_c \leq 18488.0100 \text{ cm}^{-1}$ with respect to the absorption spectrum of the laser L1 obtained at a position where measurement is newly performed as in FIG. 9 such that the signs of the holes are changed.

In this region, five thin-long holes parallel to a straight line represented by $\omega_c = \omega_p + \text{const.}$ were observed. The central positions of the holes were represented by ($\omega_p = 18951.0068 \text{ cm}^{-1}$, $\omega_c = 18488.0092 \text{ cm}^{-1}$), ($\omega_p = 18951.0090 \text{ cm}^{-1}$, $\omega_c = 18488.0086 \text{ cm}^{-1}$), ($\omega_p = 18951.0034 \text{ cm}^{-1}$, $\omega_c = 18488.0042 \text{ cm}^{-1}$), ($\omega_p = 18951.0064 \text{ cm}^{-1}$, $\omega_c = 18488.0030 \text{ cm}^{-1}$), and ($\omega_p = 18951.0050 \text{ cm}^{-1}$, $\omega_c = 18488.0040 \text{ cm}^{-1}$), respectively.

This result shows that whether energy levels of Eu atoms included in the irradiated portions are different from each other depending on the irradiated portions can be determined at an atomic level by the method of this embodiment.

(Comparative Example 1)

As in the first embodiment, a YAG crystal containing 0.1 mol % of Eu as an impurity was used as a sample. This comparative example is different from the first embodiment that an ordinary dye laser is used as the laser L2 of the two ring dye lasers, and the dye laser is used such that the coherent properties of an beam are decreased by shifting adjustment of the resonator.

Under these conditions, the line-width of the laser L2 was measured, and the value of $1.46 \text{ cm}^{-1}$ could be obtained.

In measurement of an absorption spectrum in a frequency region represented by $18945.0000 \text{ cm}^{-1} \leq \omega_p \leq 18955.0000 \text{ cm}^{-1}$, as in the first embodiment, the peak frequency of the laser L2 was increased by $0.0002 \text{ cm}^{-1}$ from $\omega_c = 18488.0000 \text{ cm}^{-1}$ to $18489.0000 \text{ cm}^{-1}$, and the absorption spectrum of the laser L1 was measured each time the peak frequency is increased.

Figure 14:
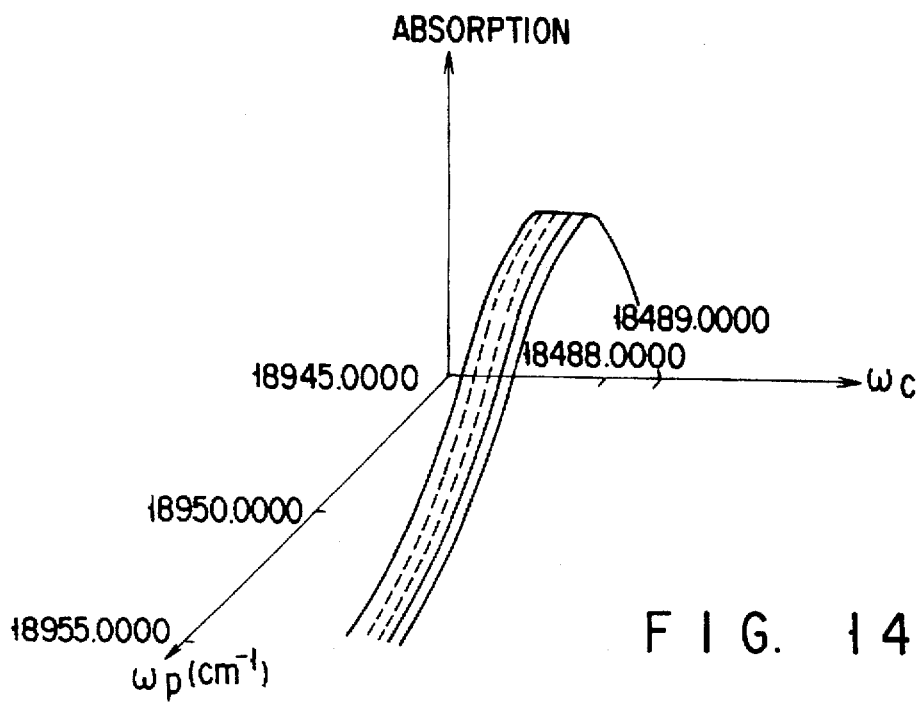
FIG. 14 is a graph showing absorption characteristics obtained according to Comparative Example 1.

FIG. 14 shows an absorption spectrum in the entire frequency scanning range. As is apparent from FIG. 14, as in FIG. 7, a section obtained by cutting along a plane represented by $\omega_c = \text{const.}$ coincides with a spectrum corresponding to excitation of an Eu atom from $^7F_0$ to $^5D_1$.

Figure 15:
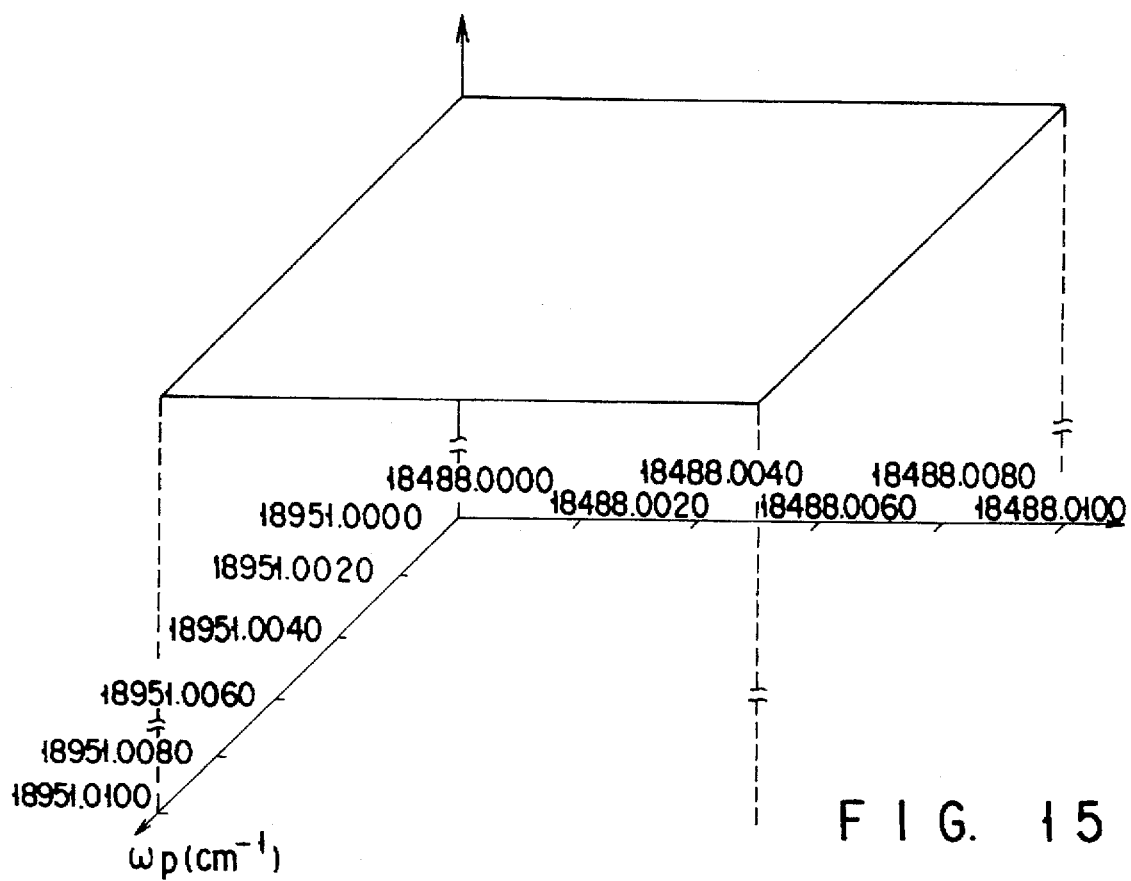
FIG. 15 is a graph obtained by enlarging a part of FIG. 14.

FIG. 15 shows an absorption spectrum obtained by enlarging the absorption spectrum observed in the region represented by $18951.0000 \text{ cm}^{-1} \leq \omega_p \leq 18951.0100 \text{ cm}^{-1}$ and $18488.0000 \text{ cm}^{-1} \leq \omega_c \leq 18488.0100 \text{ cm}^{-1}$ as in FIG. 8. Unlike in FIG. 8, in FIG. 15, no absorption holes were observed. In another frequency region, no absorption holes were observed. It was proved that no absorption holes caused by physical structures could be observed under the conditions in Comparative Example 1.

(Comparative Example 2)

As in the first embodiment, a YAG crystal containing 0.1 mol % of Eu as an impurity was used as a sample.

This comparative example is different from the first embodiment that the frequency of the laser L2 is not changed, and the absorption characteristics of $\omega_p$ is measured under only the condition $\omega_c = 18489.0220 \text{ cm}^{-1}$.

Figure 16A:
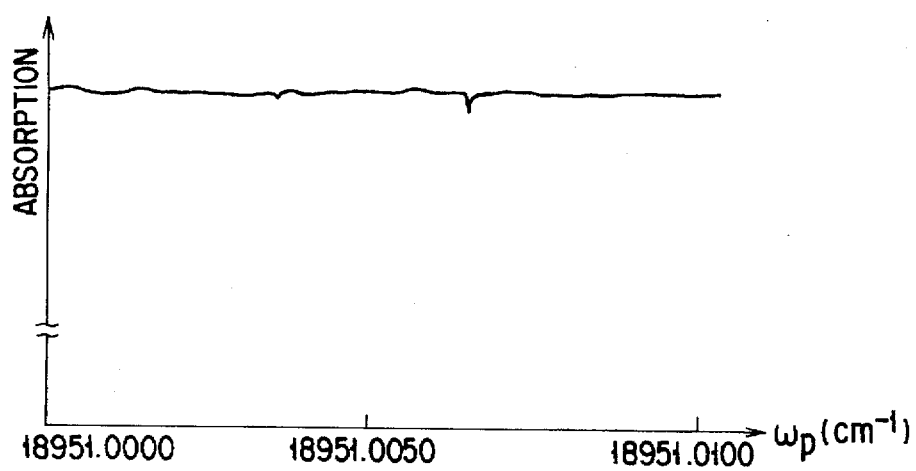
FIGS. 16A to 16C are graphs showing absorption characteristics obtained according to Comparative Example 2.
Figure 16B:
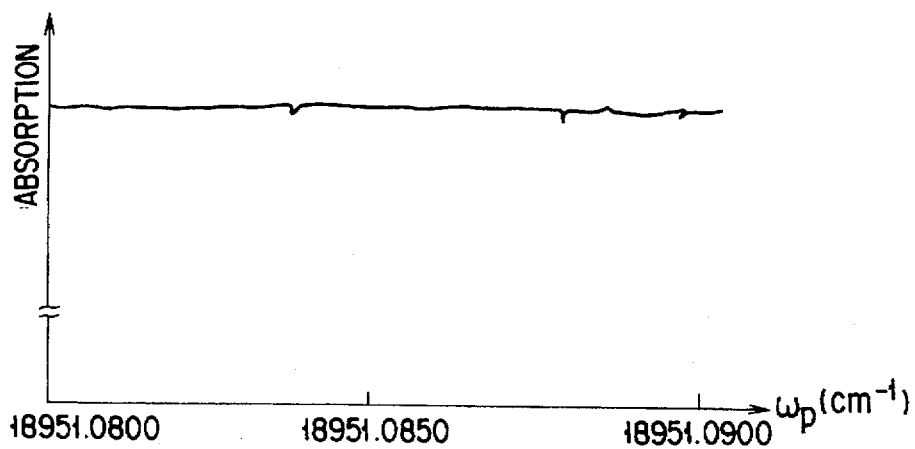
Figure 16C:
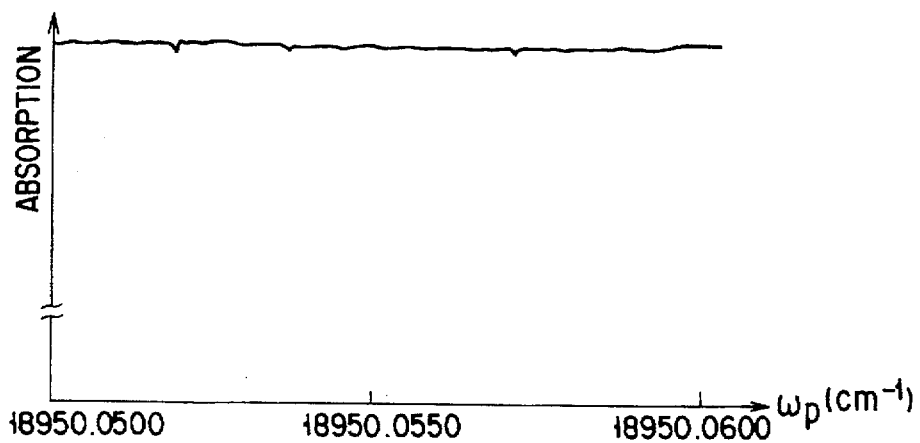

FIGS. 16A to 16C shows the absorption spectra of the laser L1 in several regions when the range of change in $\omega_p$ is $0.0100 \text{ cm}^{-1}$, as in FIG. 8. The scale of the ordinate in FIGS. 16A to 16C is set to be equal to that in FIG. 8.

As shown in FIGS. 16A to 16C, the spectra have something like holes. The holes cannot easily be determined as absorption holes because the depth of each hole is smaller than that of each hole shown in FIG. 8.

It is understood that the result obtained in this comparative example is the shape of a section obtained by cutting the absorption characteristics shown in FIG. 8 along a plane represented by $\omega_c = \text{const.}$ When the peak value of an absorption hole is preset on the plane represented by $\omega_c = \text{const.}$, a deep hole must be observed. However, the plane represented by $\omega_c = \text{const.}$ corresponding to the value of $\omega_c$ set in measurement rarely includes the peak value of an absorption hole.

For this reason, as described in the first embodiment, measurement of absorption of the laser L1 with respect to a plurality of $\omega_c$ is an inevitable factor for detecting absorption holes caused by a physical structure.

(Second Embodiment)

As in the first embodiment, a YAG crystal containing 0.1 mol % of Eu as an impurity was used as a sample. However, in the second embodiment, Au was deposited on two side surfaces of the YAG crystal to form electrodes. The electrodes were used to apply an electric field serving as an external field to the YAG crystal.

The frequencies of two lasers L1 and L2 were set as in the first embodiment, the lasers L1 and L2 are irradiated on the YAG crystal as in the first embodiment, and a change in observed absorption holes caused by a voltage applied through the electrodes was measured. A measurement temperature was set at 4K.

Figure 17A:
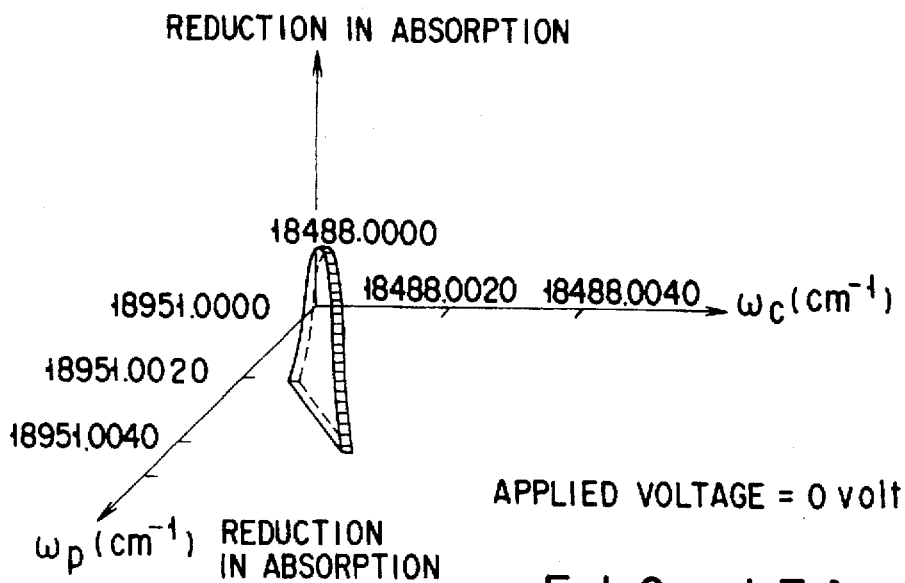
FIGS. 17A to 17C are graphs showing applied voltage dependence of absorption characteristics obtained according to the optical detection method of the second embodiment of the present invention.
Figure 17B:
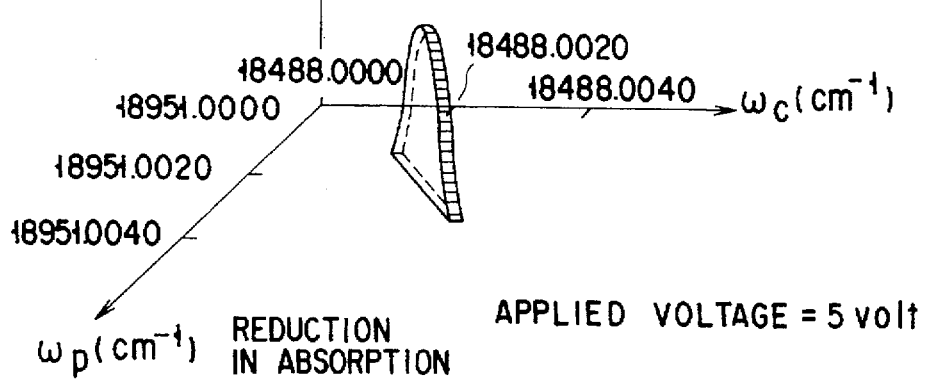
Figure 17C:
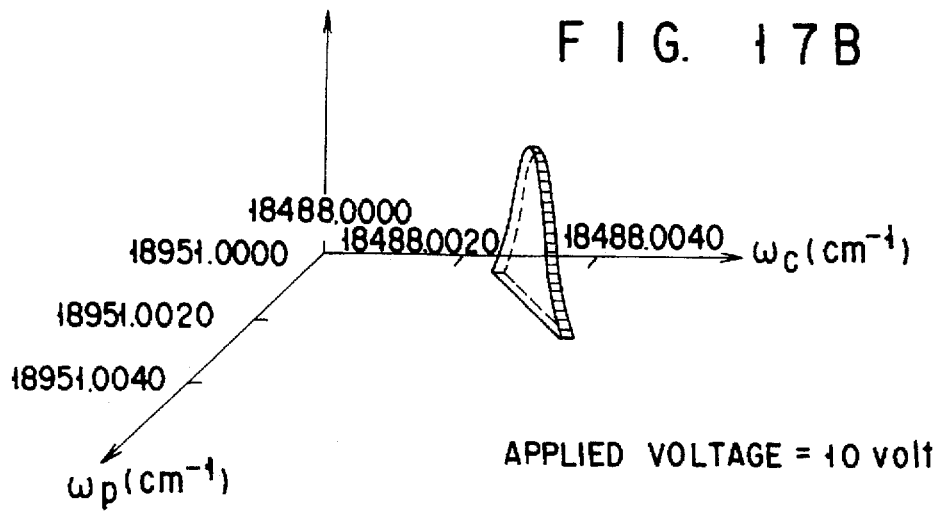

FIGS. 17A to 17C are graphs obtained by extracting a portion of absorption holes observed in a frequency region represented by $18951.0000 \text{ cm}^{-1} \leq \omega_p \leq 18951.0050 \text{ cm}^{-1}$ and $18488.0000 \text{ cm}^{-1} \leq \omega_c \leq 18488.0050 \text{ cm}^{-1}$.

As is apparent from FIGS. 17A to 17C, the central positions of the absorption holes are moved by changing a voltage applied to the YAG crystal. More specifically, according to this embodiment, response to an electric field (external field) of each physical structure can be detected at a single physical structure level. The movement of the central position occurs because the values of $\epsilon_{i31}$ and $\epsilon_{i32}$ are changed by the Stark effect of the applied voltage.

As described above, according to this embodiment, the manner of a change in optical spectrum or energy level related to physical structures included in a sample when an electric field serving as an external field is changed can be detected at a single physical structure level, a novel optical detection method which has not been developed can be realized.

(Third Embodiment)

This embodiment is related to a display device for displaying a result from the detection method obtained in the above embodiments.

The display device according to this embodiment is roughly constituted by a data collecting means for correcting absorption data obtained by irradiating two lasers L1 and L2 onto the sample according to the detection method of this embodiment, and a display means for displaying a set of minimum values of a data distribution curved surface formed by the absorption data collected by the data collecting means in a space using, the absorption data, the frequency $\omega_p$ of the laser L1, and the frequency $\omega_c$ of the laser L2 as coordinate axes on a plane having two $\omega_p$ and $\omega_c$ as coordinate axes.

In this embodiment, by using the display device arranged as described above, a graph showing an energy distribution shown in FIG. 10 can be easily formed.

The absorption (photoluminescence) is changed into the difference between absorption (photoluminescence) obtained when only the laser L1 is irradiated and absorption (photoluminescence) obtained when the lasers L1 and L2 are irradiated. The set of the peak values of the data distribution curved surface with respect to the absorption (photoluminescence) difference is displayed, thereby realizing an optical detection method having a high sensitivity and a display device having a new display scheme which is effective to evaluate the physical quality of a solid material.

At this time, when the absolute value of data related to absorption (photoluminescence) is displayed as a spectrum in place of the peak values of the data distribution curve surface, a graph showing absorption (photoluminescence) as shown in FIG. 9 can be easily formed.

In this case, the display device of this embodiment will be described below.

Figure 18:
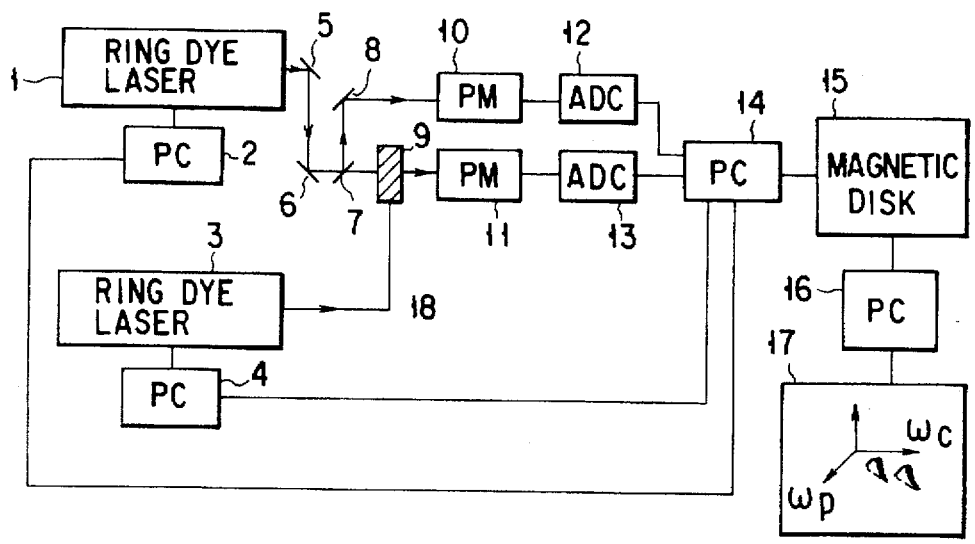
FIG. 18 is a view showing the arrangement of a display device.

FIG. 18 is a view showing the arrangement of a display device for collecting signals from physical structures as data to display data on a ($\omega_p$, $\omega_c$) plane. In the arrangement shown in FIG. 18, the elements except for a data display control personal computer 16 and a display 17 are constituent elements of the display device.

As shown in FIG. 18, in this display device, output light from two ring dye lasers 1 and 3 are irradiated on a sample 9.

More specifically, the output light from the ring dye laser 1 is irradiated on a sample 9 through a mirror 5, a mirror 6, and a beam splitter 7. The output light transmitted through the sample 9 is input to a photomultiplier 11. On the other hand, the output light from the ring dye laser 3 is irradiated onto the sample 9 through a mirror 18.

Since an output $I^S_{PM1}(\omega_p)$ from the output detection photomultiplier 11 is an analog signal, the signal is converted into a digital signal by an AD converter 13 and then input to a data collecting control personal computer 14.

In this case, monitoring of the input light intensity irradiated to the sample 9 is performed such that an output from the ring dye laser 1 is partially split by the beam splitter 7, and the split output light is input to a photomultiplier 10. An output $I^S_{PM2}(\omega_p)$ from the photomultiplier 10 is converted into a digital signal by an A/D converter 12, and the digital signal is input to the data collecting control personal computer 14.

In addition, to obtain the data of the absorption spectrum, outputs $I^O_{PM1}(\omega_p)$ and $I^O_{PM2}(\omega_p)$ from the photomultipliers 10 and 11 obtained in the absence of the sample 9 are detected in advance, and the outputs are input to the data collecting control personal computer 14.

In this case, absorption of an angular frequency $\omega_p$ is defined by the following equation:

$$I_{ab}(\omega_p) = \{I^O_{PM1}(\omega_p) - I^S_{PM1}(\omega_p) \times I^O_{PM2}(\omega_p)/I^S_{PM2}(\omega_p)\}/I^O_{PM1}(\omega_p)$$

The data collecting control personal computer 14 performs a calculation process corresponding to this equation to calculate $I_{ab}(\omega_p)$. Signals representing the values of $\omega_p$ and $\omega_c$ are input to the data collecting control personal computer 14 by a laser control personal computer 2 for the ring dye laser 1 and a laser control personal computer 4 for the ring dye laser 3.

In this manner, an absorption spectrum $I^O_{ab}(\omega_p)$ obtained when the ring dye laser 3 is not irradiated and an absorption spectrum $I_{ab}(\omega_p, \omega_c)$ obtained when the ring dye laser 3 is irradiated are calculated by the data collecting control personal computer 14 together with the values of $\omega_p$ and the values of pairs ($\omega_p$, $\omega_c$). These data signals are stored in the hard disk in the data collecting control personal computer 14. These data signals are further transferred to a magnetic disk 15 and recorded thereon.

In this data display, the data stored in the magnetic disk 15 is transferred to the data display control personal computer 16, and the data is transferred to the display 17 serving as a display means to be imaged. When $\Delta I_{ab}(\omega_p; \omega_c)$ is to be displayed, a calculation process for calculating the difference between $I^O_{ab}(\omega_p)$ and $I_{ab}(\omega_p; \omega_c)$ is performed in the data display control personal computer 16, and the result is transferred to the display 17 serving as the display means.

In the first to third embodiments, a temperature and an electric field are used as an external field. When a magnetic field, a pressure, and the like are used as an external field, a change in optical spectrum of each physical structure can be detected in the same manner as described above.

In the first to third embodiment, absorption is described. The present invention can be also applied to photoluminescence generated through absorption.

Figure 19:
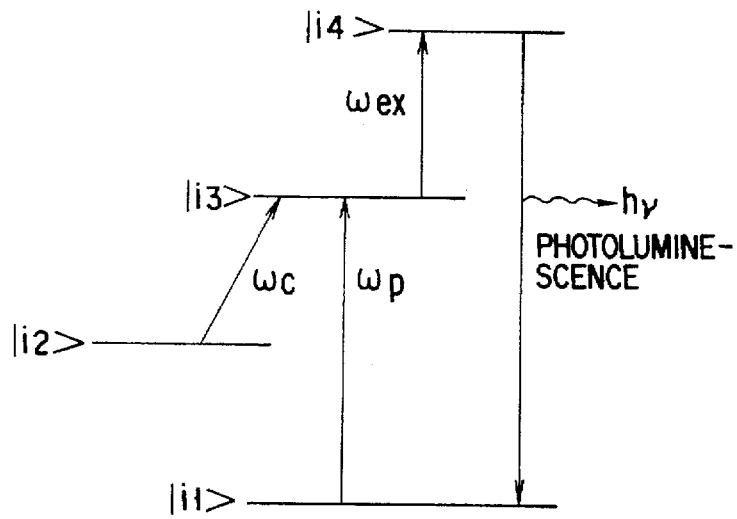
FIG. 19 is a view showing a principle of measuring photoluminescence of a solid body generated through absorption to detect EIT characteristics.

FIG. 19 shows a principle for measuring photoluminescence generated through absorption of coherent light L1 to detect the EIT characteristics of each physical structure.

In this case, a $\Lambda$ type is exemplified.

A level |i4> which is excited by light from a level |i3> and which generates photoluminescence to fall to a lower level is considered. Under irradiation of coherent light L1 and L2, when coherent light L3 having an angular frequency $\omega_{ex}$ is irradiated, excitation from the level |i3> to the level |i4> occurs. Under these conditions, a photoluminescence intensity from the level |i4>, i.e., |i4($\omega_p$; $\omega_c$) is detected by a photomultiplier or the like.

When a physical structure i is turned into population trapping, the physical structure is not excited to the level |i3>. For this reason, photoluminescence is not generated. On the other hand, the physical structure i is not turned into population trapping, the physical structure is excited to the level |i3> and absorbs light of $\omega_{ex}$ to be excited to the level |i4>. For this reason, the physical structure generates photoluminescence.

Therefore, the following finding can be obtained. That is, when $I_{lu}(\omega_p; \omega_c)$ is observed with respect to each ($\omega_p$, $\omega_c$) and displayed on a ($\omega_p$, $\omega_c$) plane, signals equivalent to absorption holes of the physical structures can be obtained in a photoluminescence excitation spectrum as in FIGS. 8 to 10.

In this case, photoluminescence is generated from the level |i4>, a state wherein electrons fall as a final state may be a level |i1> or a level |i5>.

A recording/reproducing method (device) to which the above detection method is applied will be described below.

(Fourth Embodiment)

On a ($\omega_p$, $\omega_c$) plane, not only detection of respective absorption holes related to $\omega_p$ but also detection of integrated intensity of absorption are an important means as a means for reproducing information recording on a recording medium in the present invention. At this time, under the condition under which ($\omega_p - \omega_c$) = $\Delta\omega$ is constant, the following integration is considered:

$$I_{ab}(\Delta\omega) = \int I_{ab}(\omega_p; \omega_p - \Delta\omega) d\omega_p$$

Characteristics obtained when one physical structure is used will be described below. The $I_{ab}(\Delta\omega)$ is obtained by integrating $I_{ab}(\omega_p; \omega_c)$ in a direction crossing a $\omega_p$ axis at 45-degree on the $(\omega_p, \omega_c)$ plane.

Figure 1A:
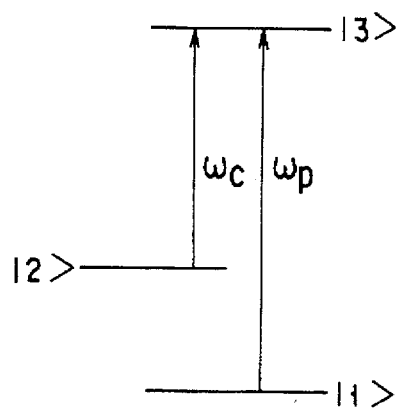
FIGS. 1A to 1D are graphs showing three-level system models.
Figure 1B:
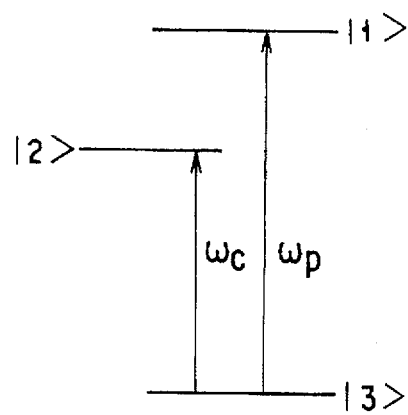
Figure 1C:
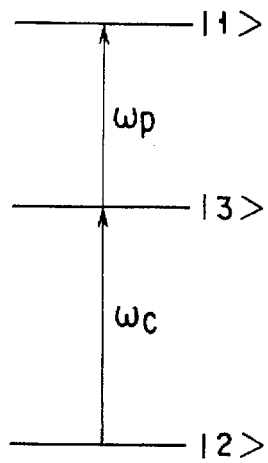
Figure 1D:
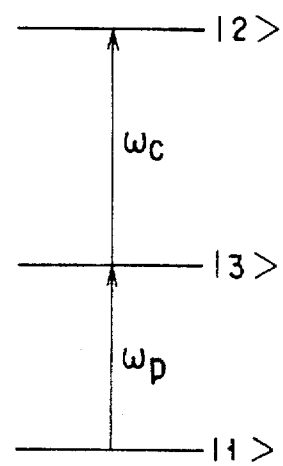
Figure 2A:
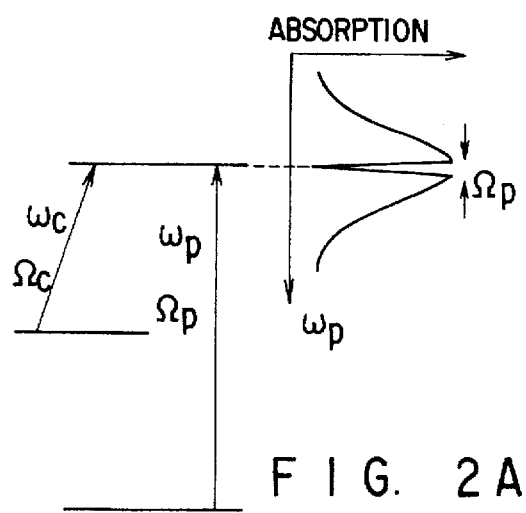
FIGS. 2A and 2B are graphs showing absorption spectra for a frequency $\omega_p$ of probe laser representing the EIT characteristics of one physical structure.
Figure 2B:
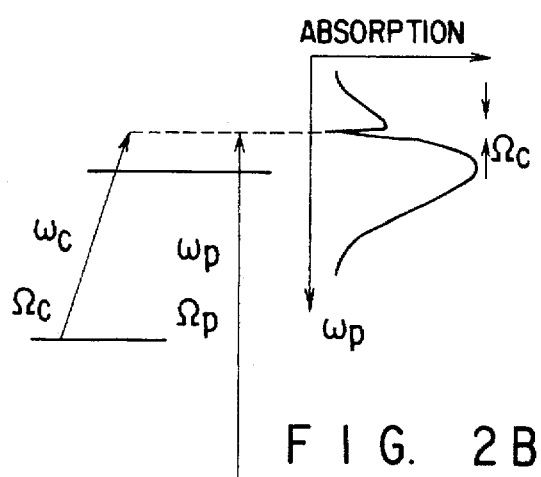
Figure 3:
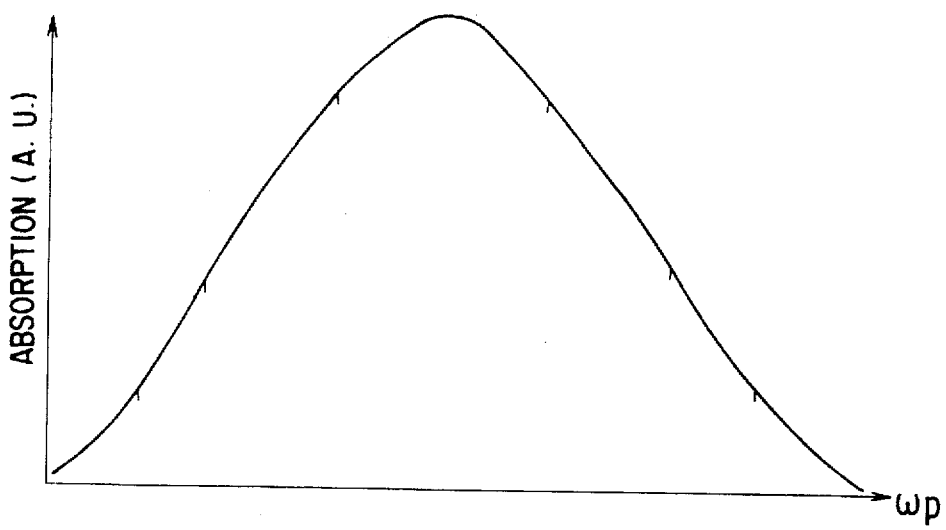
FIG. 3 is a graph showing an absorption spectrum for a frequency $\omega_p$ of probe laser representing the EIT characteristics of N physical structures.
Figure 4A:
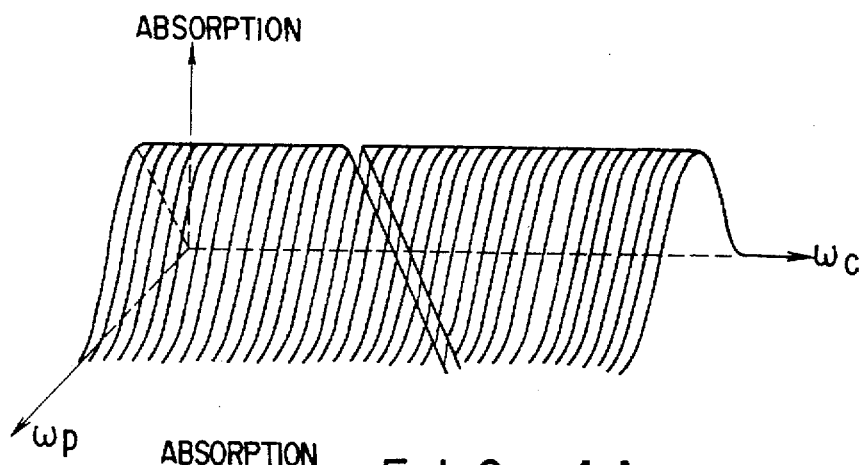
FIGS. 4A to 4C are graphs showing absorption spectra for a frequency $\omega_p$ of probe laser with respect to one physical structure on a ($\omega_p$, $\omega_c$) plane.
Figure 4B:
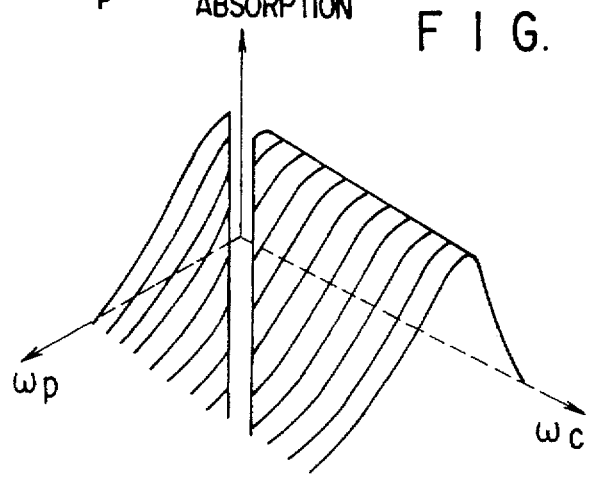
Figure 4C:
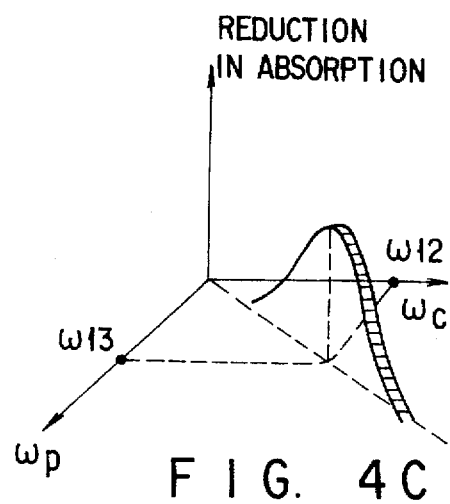
Figure 20:
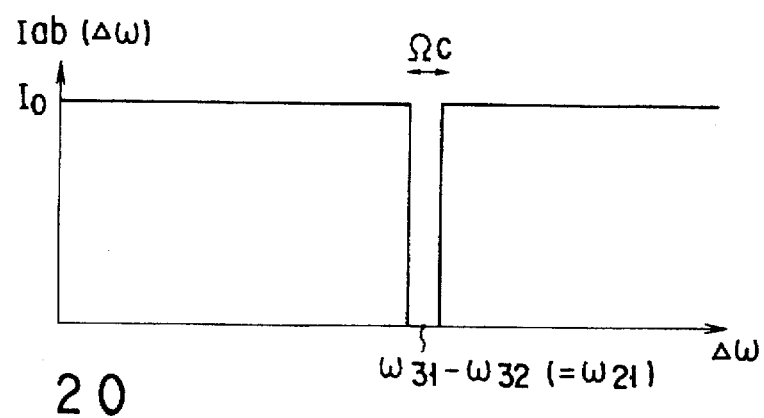
FIG. 20 is a graph showing $I_{ab}(\Delta\omega)$ related to one physical structure for explaining a principle of recording information in the fourth embodiment.

FIG. 20 shows the distribution of $I_{ab}(\Delta\omega)$. As is apparent from FIG. 20, a narrow hole having a width of $\Omega_c$ corresponding to a hole depth of in FIG. 4 is formed near $\Delta\omega = \omega_{31} - \omega_{32} = \omega_{21}$, and the hole has a predetermined value in the other regions. This predetermined value coincides with a physical amount inherent in a physical structure (called an integrated intensity of absorption of a physical structure), i.e., $I_0 = \int I^0{}_{ab}(\omega p) d\omega_p$.

Figure 21A:
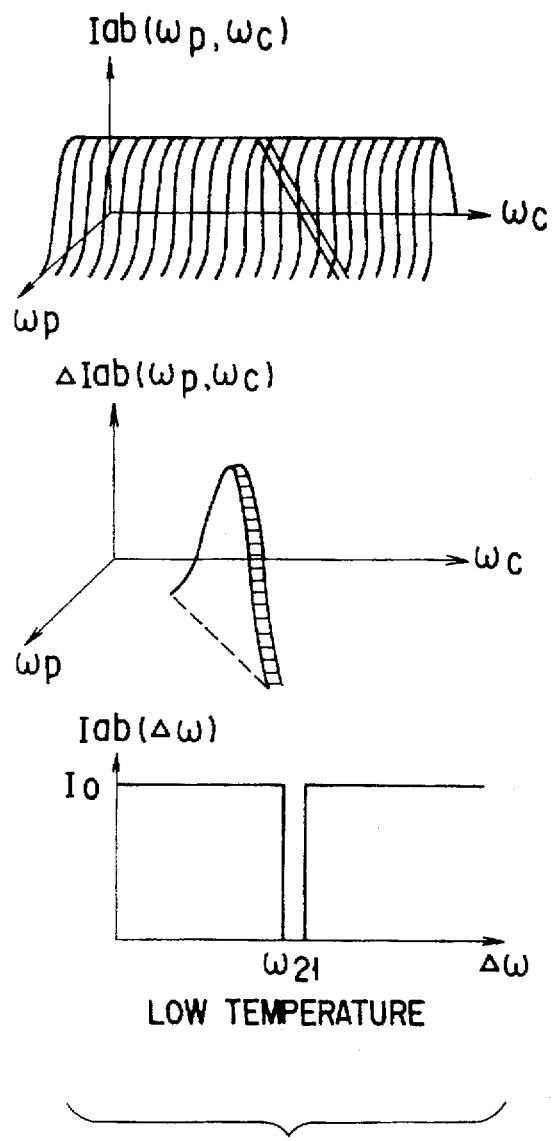
FIGS. 21A and 21B are graphs showing the distributions of $I_{ab}(\omega_p; \omega_c)$ and $\Delta I_{ab}(\omega_p; \omega_c)$ related to one physical structure for explaining a principle of reproducing information in the fourth embodiment.
Figure 21B:
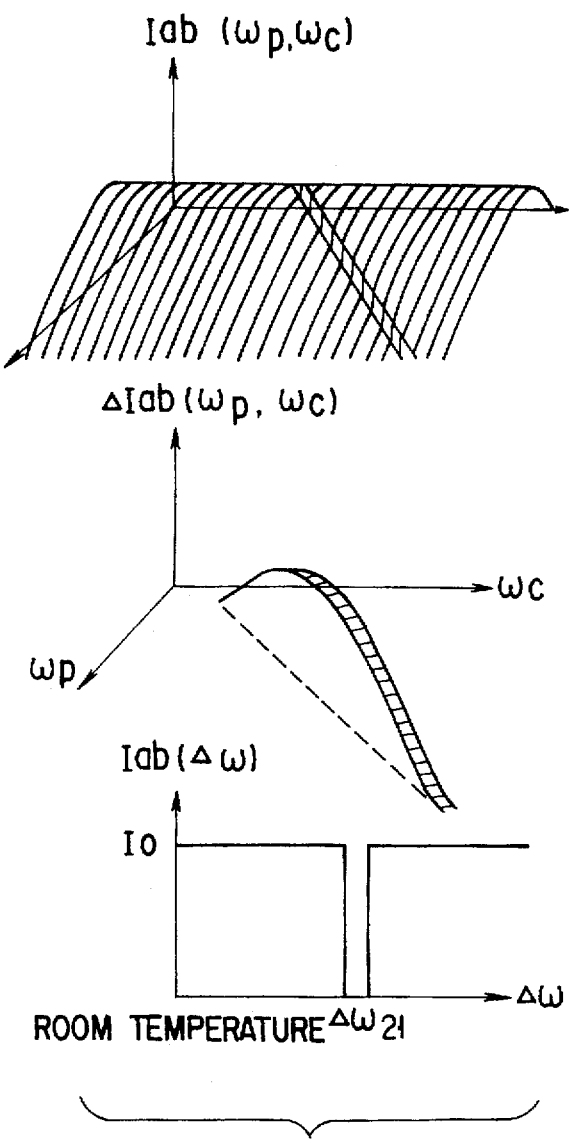

The manners of changes in $I_{ab}(\Delta\omega)$ and $I_{ab}(\omega_p; \omega_c)$ when a temperature is changed are shown in FIGS. 21A and 21B. As is apparent from FIGS. 21A and 21B, $I_{ab}(\omega_p; \omega_c)$ entirely increases in a direction of 45-degree with an increase in temperature, but $I_{ab}(\Delta\omega)$ does not change.

FIGS. 22A and 22B show the distributions of $I_{ab}(\Delta\omega)$ and $\Delta I_{ab}(\Delta\omega)$ when a plurality of physical structures. In $I_{ab}(\Delta\omega)$, a hole having a depth integer times $I_0$ and a width of $\Omega_c$ is formed using $NI_0$ as a base line. The distribution of $\Delta I_{ab}(\Delta\omega)$ shown in FIG. 22B corresponds to a distribution obtained by inverting a sign of only an extracted hole portion.

An integer value obtained by dividing the depth of the hole by $I_0$ means the number of physical structures which is set such that the value of $\omega_{21}$ is equal to $\Delta\omega$ on a $\Delta\omega$ axis. In this case, $I_{ab}(\Delta\omega)$ and $\Delta I_{ab}(\Delta\omega)$ are independent of temperature as a matter of course.

In this manner, when $I_{ab}(\Delta\omega)$ or $\Delta I_{ab}(\Delta\omega)$ is measured, and these values are used to reproduce information recorded on a recording medium, the information can be very stably reproduced independently of temperature.

When $I_{ab}(\omega_p; \omega_c)$ or $\Delta I_{ab}(\omega_p; \omega_c)$ is used to reproduce information, the distribution of $(\omega_{i31}, \omega_{i32})$ can be reproduced at a single physical structure level. However, when $I_{ab}(\Delta\omega)$ or $\Delta I_{ab}(\Delta\omega)$ is used to reproduce information, the distribution of $\omega_{i21}$ can be reproduced at a single physical structure level.

With respect to not only absorption, but also photoluminescence, $$I_{lu}(\Delta\omega) = \int I_{lu}(\omega_p; \omega_p - \Delta\omega) d\omega_p$$

or $$\Delta I_{lu}(\Delta\omega) = \int \{I^0{}_{lu}(\omega_p) - I_{lu}(\omega_p; \omega_p - \Delta\omega)\} d\omega_p$$

is measured to reproduce information. In this case, the same operation effect as described above can be obtained.

(Fifth Embodiment)

A recording method of information will be described below.

In the present invention, information is recorded on a recording medium by changing the energy level distribution of a physical structure on a $(\omega_p, \omega_c)$ plane.

In order to change the energy level distribution, for example, light or an electron beam is irradiated on the recording medium, an electric field or a magnetic field is applied to the recording medium, or a pressure acts on the recording medium. In this manner, a physical structure group is partially excited to change the energy level of the physical structure group.

In particular, in order to record information at a single physical structure level (molecular/atomic level), according to the present invention, the population trapping described above is used, the distribution of $(\omega_{i31}, \omega_{i32})$ or the distribution of $\omega_{i21}$ is converted at a single physical structure level.

More specifically, as in a case of reproducing, the first and second coherent light having angular frequencies $\omega_p$ and $\omega_c$ and Rabi frequencies $\Omega_p$ and $\Omega_c$ are irradiated on the recording medium at once by lasers to cause a certain physical structure to be turned into population trapping. In this state, third coherent light, having an angular frequency $\omega_{ex}$, for causing excitation to a level |i4> at which a change in structure occurs when electrons are excited or from which electrons are ionized is irradiated by, e.g., a laser.

The manner of a change in state of a physical structure by the above method will be described below with reference to the drawings. On a $(\omega_p, \omega_c)$ plane, population trapping by irradiation of the first and second coherent light is by a physical structure having $(\omega_{i31}, \omega_{i32})$ on a 45-degree line with a point $(\omega_p, \omega_c)$ in the center, as shown in FIG. 23.

In this case, when $\Omega_p < \Omega_c$, the physical structure is turned into trapping in a state |i1>. Therefore, when the third coherent light having an angular frequency $\omega_{ex}$ which causes transition between the level |i1> and the level |i4> is irradiated, a physical structure which satisfies the following equation:

$$\omega_{ex} = \omega_{i41}$$

is selectively excited to the level |i4>, and then ionized or changed. When a plurality of third coherent light having different angular frequencies $\omega_{ex}$ are irradiated, as shown in FIG. 25, holes having the distribution of $(\omega_{i31}, \omega_{i32})$ can be formed.

When $\Omega_p > \Omega_c$, the physical structure is turned into trapping in a state |i2>. Therefore, when the third coherent light having an angular frequency $\omega_{ex}$ which causes transition between the level |i2> and the level |i4> as shown in FIG. 26 is irradiated, a physical structure which satisfies the following equation:

$$\omega_{ex} = \omega_{i24}$$

is selectively excited to the level |i4>, and then ionized or changed. When a plurality of third coherent light having different angular frequencies $\omega_{ex}$ are irradiated, as in FIG. 25, holes having the distribution of $(\omega_{i31}, \omega_{i32})$ can be formed.

The state of a physical structure which is not turned into population trapping can be selectively changed.

Figure 27:
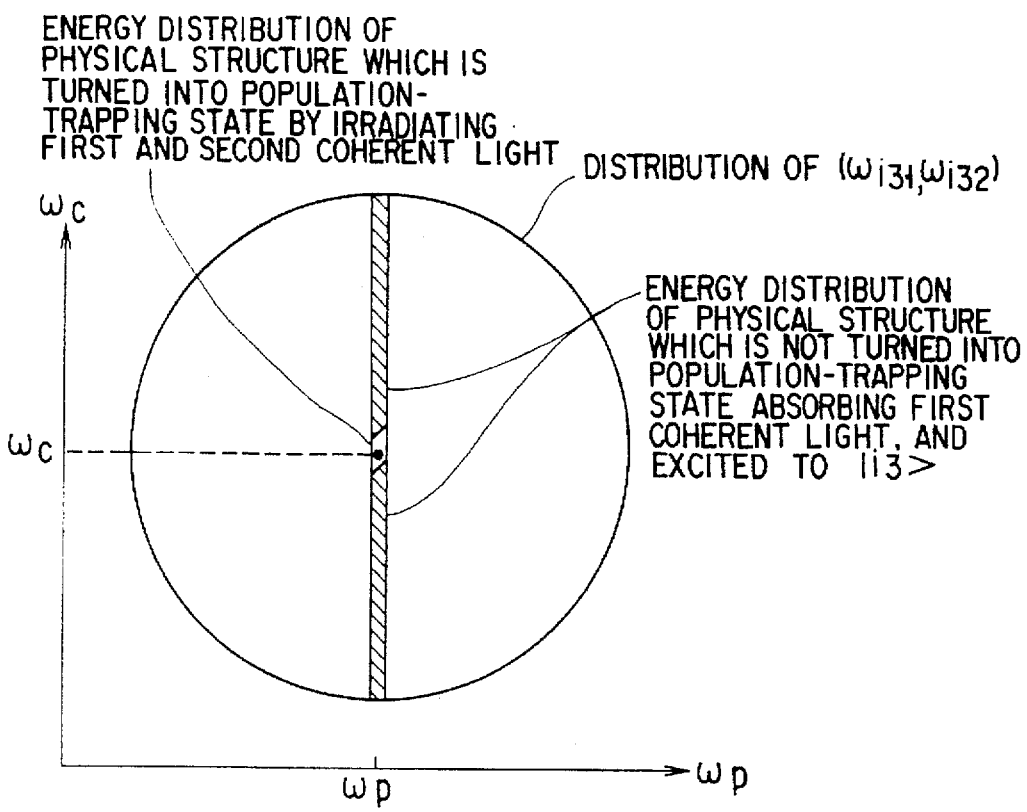
FIG. 27 is a graph showing energy distribution in physical structure, which is not turned into population-trapping, by the first and second coherent light applied, absorbing the first coherent light and excited to third level.
Figure 28:
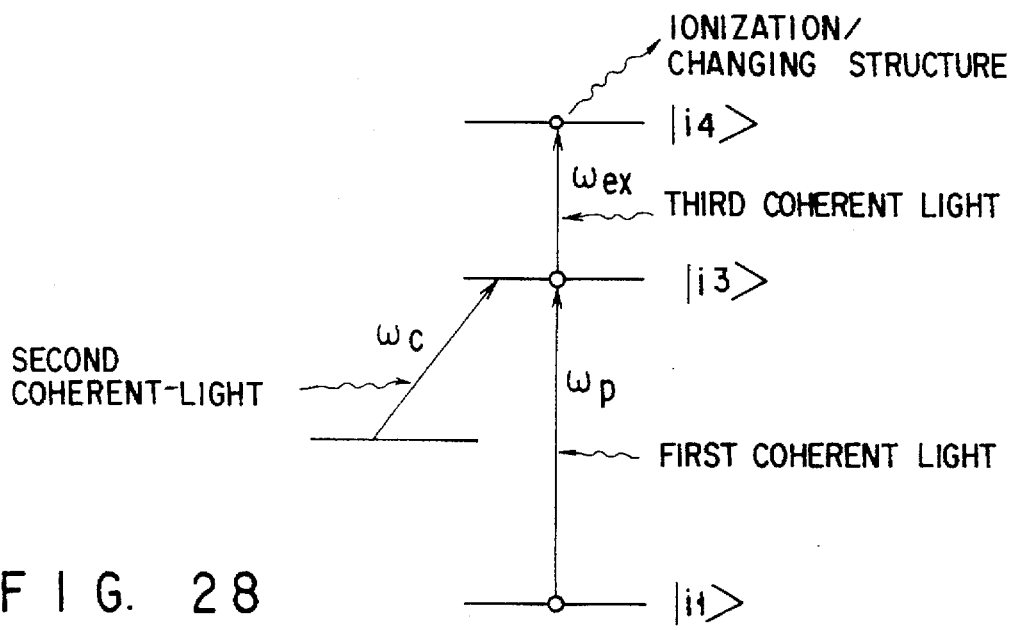
FIG. 28 is a view for explaining a recording method for a physical structure which is not turned into population-trapping.

FIG. 27 shows the distribution of physical structures which is not turned into population trapping, absorbs the first coherent light, and excited to the level |i3> when the first and second coherent light are irradiated.

Therefore, when the third coherent light having an angular frequency $\omega_{ex}$ which causes transition between the level |i3> and the level |i4> is irradiated, a physical structure which satisfies the following equation:

$$\omega_{ex} = \omega_{i34}$$

is selectively excited to the level |i4>, and then ionized or changed. In this case, when a plurality of third coherent light having different angular frequencies $\omega_{ex}$ are irradiated, as in FIG. 25, holes having the distribution of $(\omega_{i31}, \omega_{i32})$ can be formed.

When information recording is performed while the distribution of $(\omega_{i31}, \omega_{i32})$ is changed in a wide range, the same operation as described above is preferably performed to the values of a plurality of $(\omega_p, \omega_c)$.

When irradiation of the first, second, and third coherent light and applying of an electric or magnetic field are performed at once, the energy levels of the physical structures change, and the values of $\omega_{i31}$, $\omega_{i32}$, $\omega_{i41}$ and the like change.

Therefore, the distribution of ($\omega_{i31}$, $\omega_{i32}$) can be changed without changing the value of ($\omega_p$, $\omega_c$), thereby efficiently recording information.

(Sixth Embodiment)

In this embodiment, a YAG crystal containing 0.1 mol % of Eu as an impurity is used as a recording medium.

FIG. 29 shows the energy levels of Eu. The ground state of Eu is $^7F_0$. The excited state $^5D_1$ is present on a 18,950 cm$^{-1}$ high-energy side from the state $^7F_0$, and strong optical transition is caused between the state $^7F_0$ and the state $^5D_1$.

The excited state $^7F_1$ is present on a 460 cm$^{-1}$ high-energy side from the state $^7F_0$, and a strong optical transition is caused between the state $^7F_1$ and the state $^5D_1$. In addition, charge-transferred states are continuously present near a 36,000 cm$^{-1}$ to 42,000 cm$^{-1}$ high-energy side from the state $^7F_0$, and the valency of each Eu atom having excited electrons changes from plus bivalent to plus trivalent.

This recording medium is inserted into a cryostat having a variable temperature and an optical window whose visible band is transparent, and the recording medium temperature is kept at 4K by cooling using liquid helium. In this state, two ring dye lasers exited by an argon ion laser are irradiated on the recording medium. As a laser dye material for driving the two ring dye lasers, coumarin having a tuning range of 17,240 to 19,230 cm$^{-1}$ is used.

In this case, the line-width of each ring dye laser is adjusted to 500 kHz=0.000017 cm$^{-1}$. One (L1) of the ring dye lasers is adjusted to perform sweeping near a frequency $\omega_p$ of 18,950 cm$^{-1}$, and the other is adjusted to perform sweeping near a frequency $\omega_c$ of 18,490 cm$^{-1}$. The light intensities of the lasers are set such that the Rabi frequencies of the lasers L1 and L2 are set to be 3 MHz and 17 MHz, respectively.

The energy distribution of Eu before information is recorded on the recording medium is detected by the following method. More specifically, information recorded on the recording medium before new information is recorded on the recording medium is reproduced by the following method.

The laser L2 is not irradiated, and the frequency $\omega_p$ of the laser L1 is continuously changed from 18945.0000 cm$^{-1}$ to 18955.0000 cm$^{-1}$. In this manner, the absorption spectrum $I^0{}_{ab}(\omega_p)$ of the laser L1 is detected.

The frequency $\omega_c$ of the laser L2 is fixed to 18485.0000 cm$^{-1}$, and the frequency of the laser L1 is continuously changed from 18945.0000 cm$^{-1}$ to 18955.0000 cm$^{-1}$. In this manner, the absorption spectrum $I_{ab}(\omega_p; \omega_c)$ of the laser L1 is detected to calculate the difference between $I_{ab}(\omega_p; \omega_c)$ and $I^0{}_{ab}(\omega_p)$, i.e., $\Delta I_{ab}(\omega_p; \omega_c)=I^0{}_{ab}(\omega_p)-I_{ab}(\omega_p; \omega_c)$.

The frequency of the laser L2 is increased by 0.0002 cm$^{-1}$ to be fixed to 18485.0002 cm$^{-1}$, and the frequency of the laser L1 is continuously changed from 18945.0000 cm$^{-1}$ to 18955.0000 cm$^{-1}$ to detect the absorption spectrum $I_{ab}(\omega_p; \omega_c)$ of the laser L1, thereby calculating $\Delta I_{ab}(\omega_p; \omega_c)$.

The above process in which the frequency $\omega_c$ of the laser L2 is sequentially increased by 0.0002 cm$^{-1}$ and the absorption spectrum of the laser L1 is detected each time by changing the frequency $\omega_c$ of the laser L2 is continued until the frequency $\omega_c$ of the laser L2 becomes 18495.0000 cm$^{-1}$.

Figure 30:
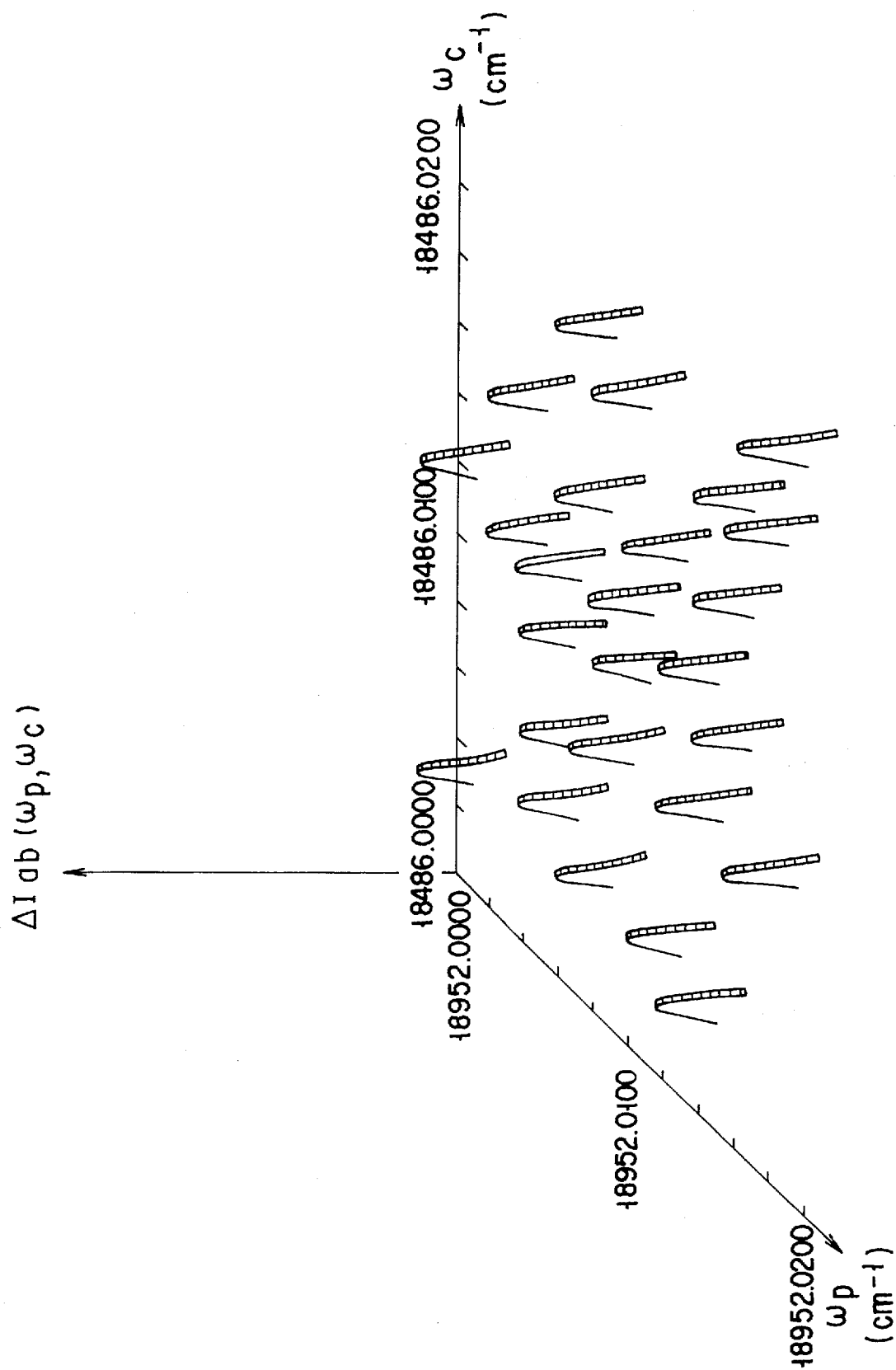
FIG. 30 is a graph obtained by enlarging a region which satisfies $18952.0000\ cm^{-1} < \omega_p < 18952.0200\ cm^{-1}$ and $18486.0000\ cm^{-1} < \omega_c < 18486.0200\ cm^{-1}$ with respect to $\Delta I_{ab}(\omega_p; \omega_c)$ measured before recording in the sixth embodiment.

FIG. 30 shows a part of $\Delta I_{ab}(\omega_p; \omega_c)$ obtained as described above on a ($\omega_p$, $\omega_c$) plane having the frequency $\omega_p$ of the laser L1 and the frequency $\omega_c$ of the laser L2 as coordinate axes. As is apparent from FIG. 30, absorption holes according to EIT of pseudo atoms (physical structures) are observed.

Referring to FIG. 31, the value of $\Delta\omega=\omega_p-\omega_c$ is set every 12 MHz=0.0004 cm$^{-1}$, integrated intensity represented by:

$$\Delta I_{ab}(\Delta\omega)=\int\{I^0{}_{ab}(\omega_p) - I_{ab}(\omega_p; \omega_p-\Delta\omega)\}d\omega_p$$

is calculated with respect to each $\Delta\omega$. It was observed that the value of $\Delta I_{ab}(\Delta\omega)$ was integer times a value having a predetermined value as a unit.

A case wherein new information is recorded on the recording medium will be described below.

In order to record information, the lasers L1 and L2 whose Rabi frequencies are set to be 17 MHz and 3 MHz are irradiated on the recording medium, and another ring dye laser L3 (oscillation frequency $\omega_{ex}$) is prepared. A second harmonic wave obtained by irradiating output light generated by exciting a coumarin dye material on a BBO crystal is irradiated on the recording medium.

The information recording is sequentially performed under the following conditions:

(1) $\omega_p$=18952.0020 cm$^{-1}$, $\omega_c$=18486.0000 cm$^{-1}$, and $\omega_{ex}$=38000 to 40000 cm$^{-1}$ (2) $\omega_p$=18952.0000 cm$^{-1}$, $\omega_c$=18486.0020 cm$^{-1}$, and $\omega_{ex}$=40000 to 42000 cm$^{-1}$ (3) $\omega_p$=18952.0000 cm$^{-1}$, $\omega_c$=18486.0120 cm$^{-1}$, and $\omega_{ex}$=38000 to 40000 cm$^{-1}$.

Figure 32:
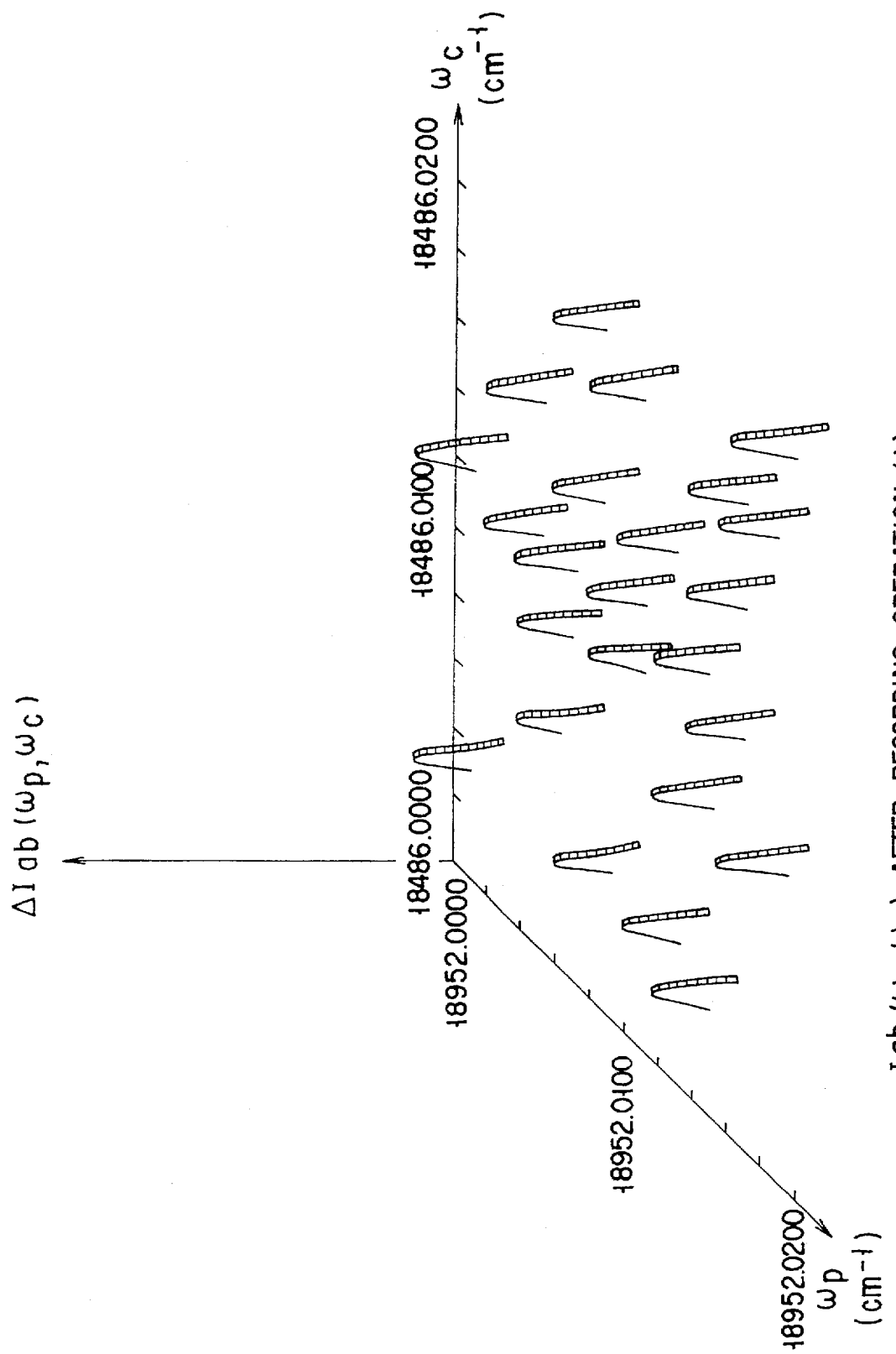
FIG. 32 is a graph showing $\Delta I_{ab}(\omega_p; \omega_c)$ read after an information recording operation (1) is performed in the sixth embodiment.
Figure 33:
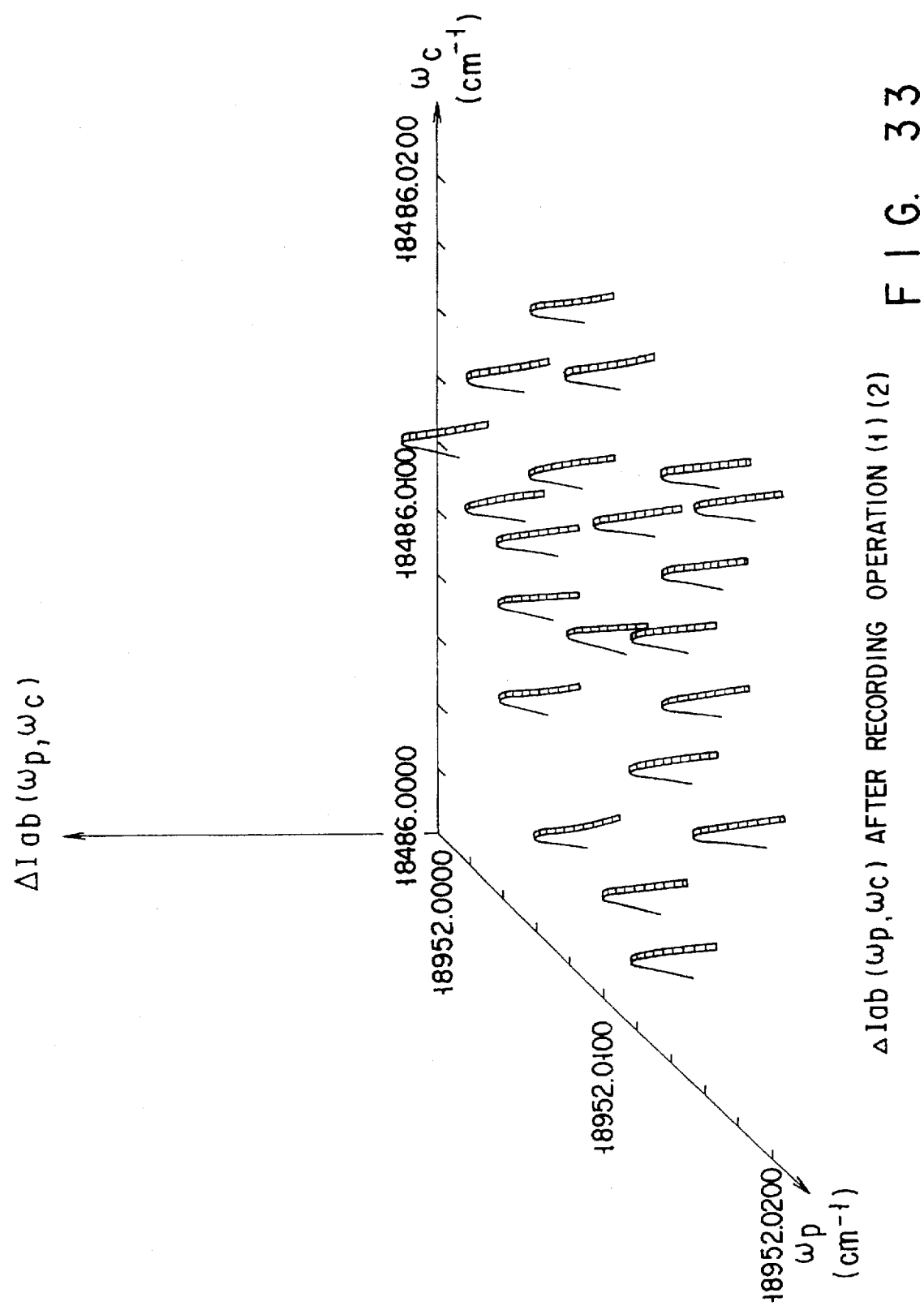
FIG. 33 is a graph showing $\Delta I_{ab}(\omega_p; \omega_c)$ read after information recording operations (1) and (2) are performed in the sixth embodiment.
Figure 34:
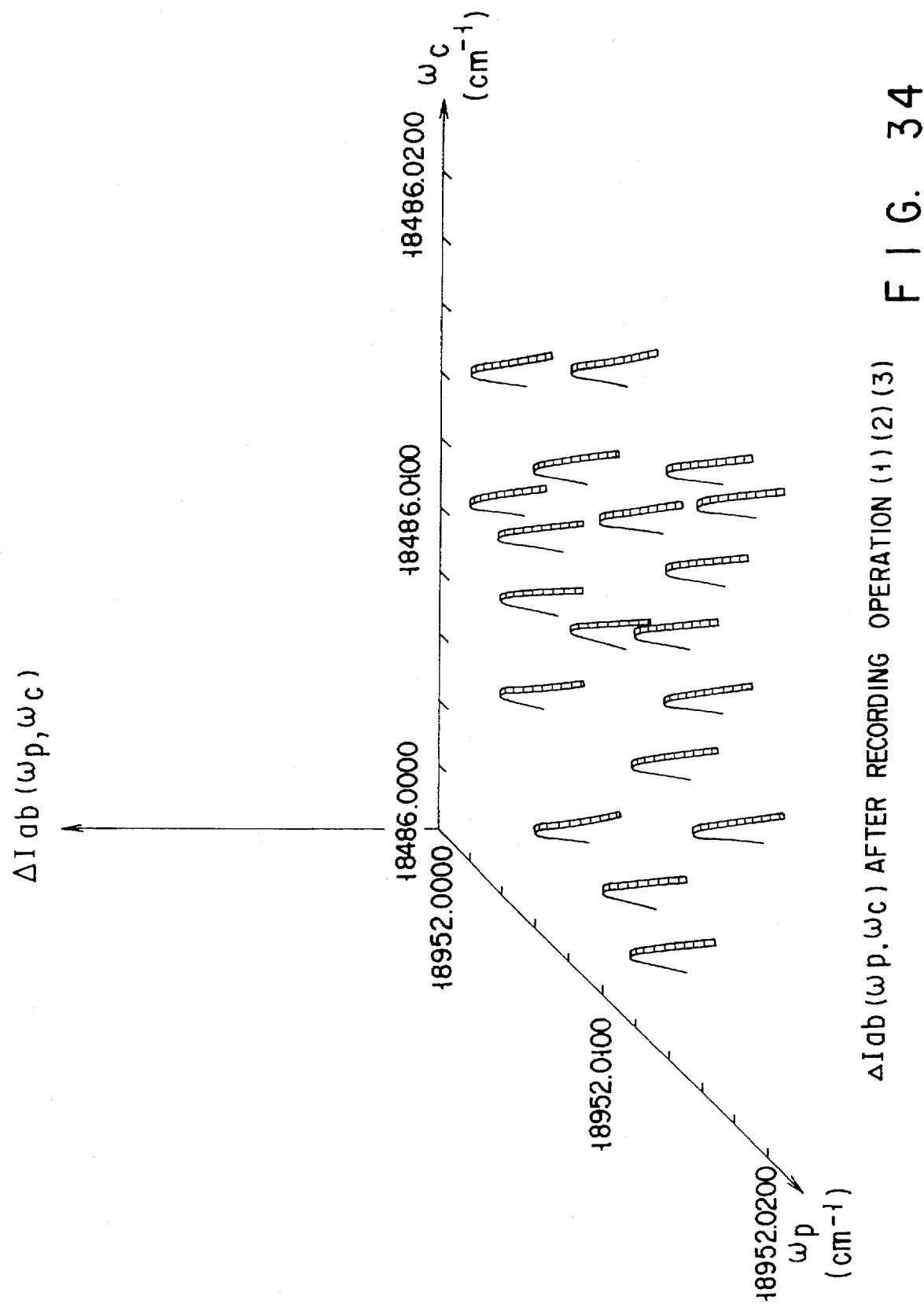
FIG. 34 is a graph showing $\Delta I_{ab}(\omega_p; \omega_c)$ read after information recording operations (1), (2), (3) are performed in the sixth embodiment.

FIGS. 32, 33, 34 show results obtained in the following method. That is, after the procedures (1) to (3), irradiation of the laser L3 is stopped, the lasers L1 and L2 whose Rabi frequencies are respectively set to 3 MHz and 17 MHz again are irradiated, and $\Delta I_{ab}(\omega_p; \omega_c)$ is measured.

As is apparent from comparison between FIG. 32 to 34 and FIG. 30, of absorption holes of the physical structures, several holes located in a direction crossing the values of $\omega_p$ and $\omega_c$ used in recording at 45-degree are eliminated. It is understood that, even if new recording is performed, information which has been recorded does not change.

FIG. 35 shows a result obtained by measuring $\Delta I_{ab}(\omega_p; \omega_c)$ after the procedure (3).

As is apparent from FIG. 35, the value of $\Delta I_{ab}(\Delta\omega)$ when $\Delta\omega$=465.9880 cm$^{-1}$ changes from 5 to 2, the value of $\Delta I_{ab}(\Delta\omega)$ when $\Delta\omega$=465.9980 cm$^{-1}$ changes from 5 to 1, and the value of $\Delta I_{ab}(\Delta\omega)$ when $\Delta\omega$=466.0020 cm$^{-1}$ changes from 4 to 1.

When $\Delta I_{ab}(\Delta\omega)$ was measured again after the sample temperature was increased to room temperature, the same measurement result as in FIG. 35 was obtained. The stability of the recording method of this embodiment using $\Delta I_{ab}(\Delta\omega)$ as recording data with respect to temperature was confirmed.

(Seventh Embodiment)

As in the sixth embodiment, a YAG crystal containing 0.1 mol % of Eu as an impurity was used as a recording medium. However, in the seventh embodiment, Au was deposited on two side surfaces of the YAG crystal to form electrodes. The electrodes were used to apply an electric field serving as an external field to the YAG crystal.

In this embodiment, information is recorded on the recording medium in the following manner.

More specifically, a laser L1 whose angular frequency $\omega_p$ is fixed to 18952.0020 cm$^{-1}$ and a laser L2 whose angular frequency $\omega_c$ is fixed to 18486.0000 cm$^{-1}$ are irradiated on the recording medium. In this state, a laser 3L whose angular frequency $\omega_{ex}$ is swept from 38000 to 40000 cm$^{-1}$ within one minute is irradiated on the recording medium. A voltage which is swept by a triangular wave at 1 Hz from 0 V to 5 V is applied across the electrodes.

Figure 37:
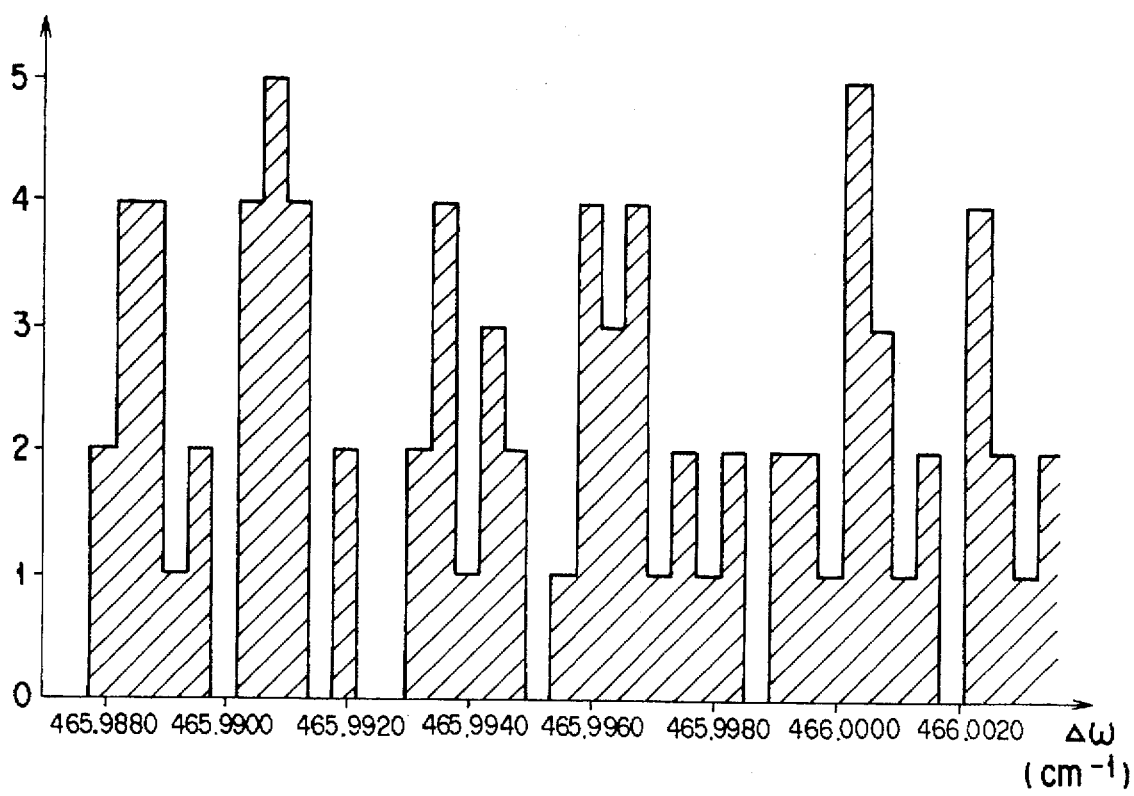
FIG. 37 is a graph showing $\Delta I_{ab}(\Delta\omega)$ after information is recorded in the seventh embodiment.

FIGS. 36 and 37 show changes in $\Delta I_{ab}(\Delta\omega)$ before and after recording, respectively.

As described above, when the value of $\Delta\omega$ is equal to the difference between the angular frequency $\omega_p$ and the angular frequency $\omega_c$, the value of $\Delta I_{ab}(\Delta\omega)$ changes to perform recording. In this embodiment, the $\Delta I_{ab}(\Delta\omega)$ changes not only near a portion represented by $\Delta\omega=465.9980$ cm$^{-1}$, but also in a larger region.

Even if the values of the angular frequencies $\omega_p$ and $\omega_c$ are fixed, the energy levels of the physical structures change depending on electric fields, and the physical structures which satisfy conditions for population trapping change depending on the electric fields. As a result, the number of physical structures excited to |i4> increases. It was confirmed that information can be efficiently recorded on the recording medium by using the electric fields.

In this embodiment, an electric field are used as an external field. When a magnetic field, a pressure, and the like are used as an external field, a change in optical spectrum of each physical structure can be detected in the same manner as described above.

(Eighth Embodiment)

As in the sixth and seventh embodiments, a YAG crystal containing 0.1 mol % of Eu as an impurity was used as a recording medium. As a characteristic feature of the eighth embodiment, recorded information is reproduced by measuring of photoluminescence but absorption.

Figure 38:
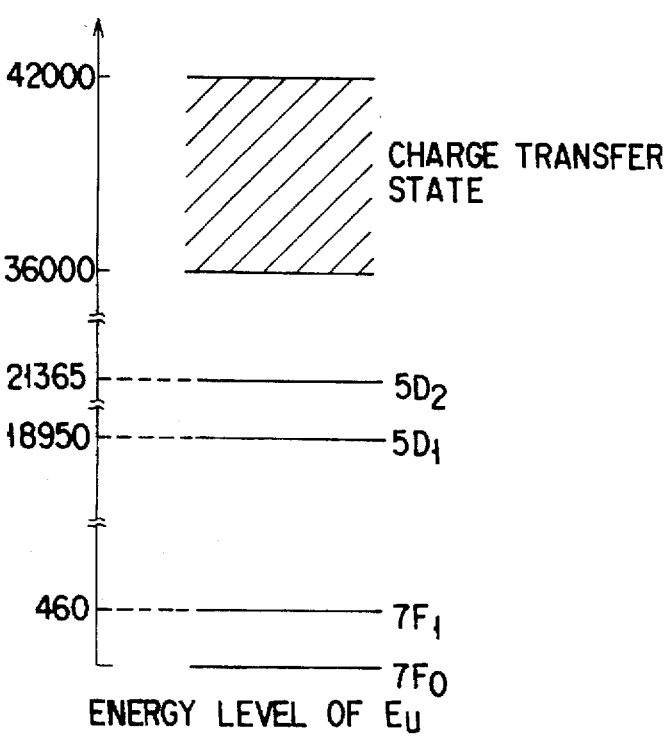
FIG. 38 is a view showing the energy levels of YAG crystal containing 0.1 mol % of Eu and serving as a recording medium in the eighth embodiment.

In the recording medium of this embodiment, as shown in FIG. 38, the excited state $^5D_2$ is present on a 2,415-cm$^{-1}$ high-energy side from the state $^5F_1$, and strong photoluminescence having a wave number of about 21,360 cm$^{-1}$ is generated in transition of electrons from the excited state to the state $^7F_0$.

Therefore, when Eu atoms which is not turned into population trapping and is excited to $^5D_1$ are selectively excited to $^5D_2$ using a semiconductor laser of Pb$_{1-x}$Cd$_x$ or PbS$_{1-x}$Se$_x$ which generates infrared waves of about 2,300 to 2,500 cm$^{-1}$ as the third coherent light, photoluminescence from $^5D_2$ to $^7F_0$ can be detected.

In this case, the first and second coherent light which were the same as those in the sixth embodiment were used, and a semiconductor laser L3 of PbS$_{1-x}$Se$_x$ having a peak frequency of 2,411 cm$^{-1}$ and a Rabi frequency of 0.2 MHz was used, thereby detecting the energy distribution of Eu before information was recorded on the recording medium in the following manner. More specifically, information recorded before new information was recorded on the recording medium was reproduced in the following manner.

The laser L2 is not irradiated, the laser L3 is irradiated, and the frequency $\omega_p$ of the laser L1 is continuously changed from 18485.0000 cm$^{-1}$ to 18955.0000 cm$^{-1}$. A photoluminescence intensity $I^0_{lu}(\omega_p)$ having a wave number of 21,000 cm$^{-1}$ or more and observed in the above state is detected by a filter and a photo-counter.

The frequency $\omega_c$ of the laser L2 is fixed to 18485.0000 cm$^{-1}$, the laser L3 is irradiated, and the frequency of the laser L1 is continuously changed from 18945.0000 cm$^{-1}$ to 18955.0000 cm$^{-1}$. A photoluminescence intensity $I_{lu}(\omega_p; \omega_c)$ having a wave number of 21,000 cm$^{-1}$ or more and observed in the above state is detected to calculate the difference between the photoluminescence intensity $I_{lu}(\omega_p; \omega_c)$ and the photoluminescence intensity $I^0_{lu}(\omega_p)$, i.e., $\Delta I_{lu}(\omega_p; \omega_c)=I^0_{lu}(\omega_p)-I_{lu}(\omega_p; \omega_c)$ The frequency of the laser L2 is increased by 0.0002 cm$^{-1}$ to be fixed to 18485.0002 cm$^{-1}$, the laser L3 is irradiated, and the frequency of the laser L1 is continuously changed from 18945.0000 cm$^{-1}$ to 18955.0000 cm$^{-1}$. A photoluminescence intensity $I_{lu}(\omega_p; \omega_c)$ having a wave number of 21,000 cm$^{-1}$ or more is detected to calculate $\Delta I_{lu}(\omega_p; \omega_c)$.

In this manner, the above process in which the frequency of the laser L2 is sequentially increased by 0.0002 cm$^{-1}$ and the photoluminescence intensity $I_{lu}(\omega_p; \omega_c)$ is detected each time by changing the frequency of the laser L2 is continued until the frequency $\omega_c$ of the laser L2 becomes 18495.0000 cm$^{-1}$.

Figure 39:
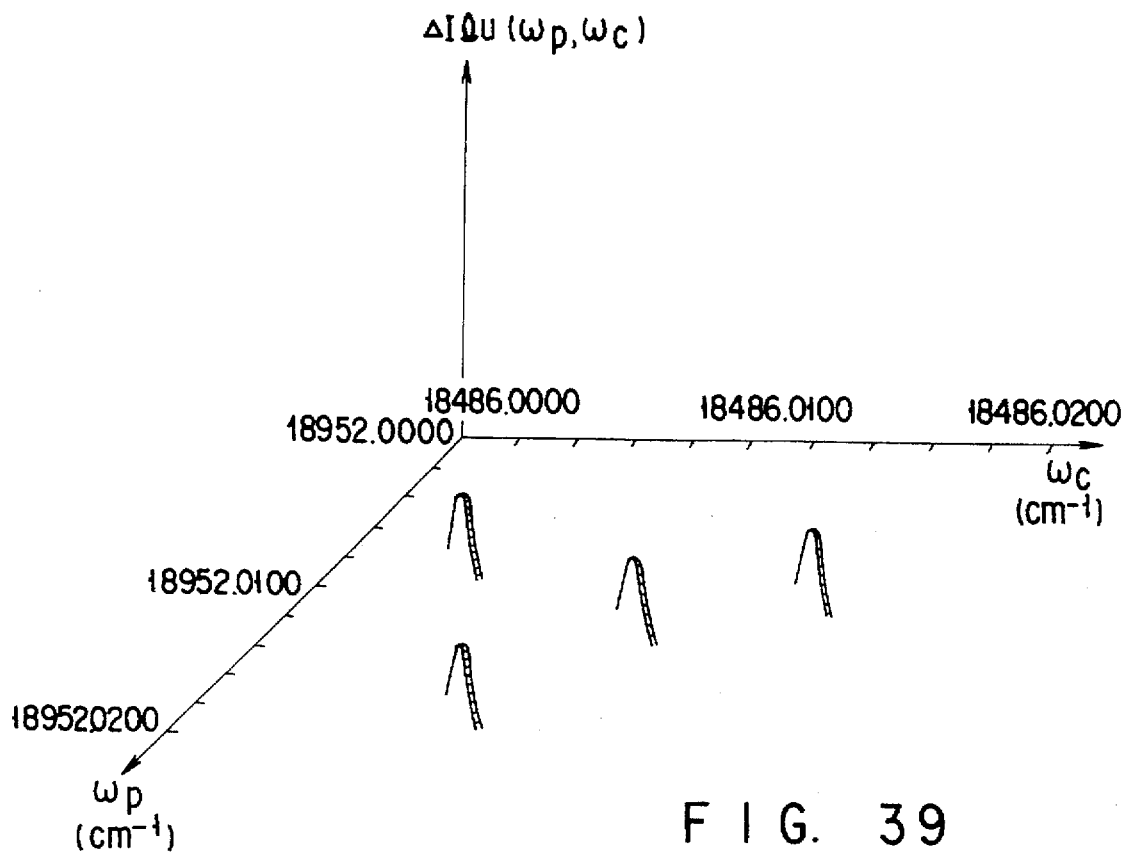
FIG. 39 is a graph showing a ($\omega_p$, $\omega_c$) plane representing a result obtained by reading information recorded on a recording medium in the eighth embodiment.

FIG. 39 shows a part of $\Delta I_{lu}(\omega_p; \omega_c)$ obtained as described above on a ($\omega_p$, $\omega_c$) plane having the frequency $\omega_p$ of the laser L1 and the frequency $\omega_c$ of the laser L2 as coordinate axes. As in FIG. 30, it is found that photoluminescence holes according to EIT of pseudo atoms (physical structures) are observed.

Referring to FIG. 39, unlike in FIG. 30, the number of holes is small. This is because the line-width of the laser L3 is smaller than an inhomogeneous line-width of transition from $^5D_1$ to $^5D_2$, and all Eu atoms excited to $^5D_1$ are not excited to $^5D_2$.

A drive current flowing to the PbS$_{1-x}$Se$_x$ semiconductor laser L3 is increased to change the frequency to 2.413 cm$^{-1}$, and $\Delta I_{lu}(\omega_p; \omega_c)$ is obtained in the same method as described above. The obtained result is shown in FIG. 40.

Figure 40:
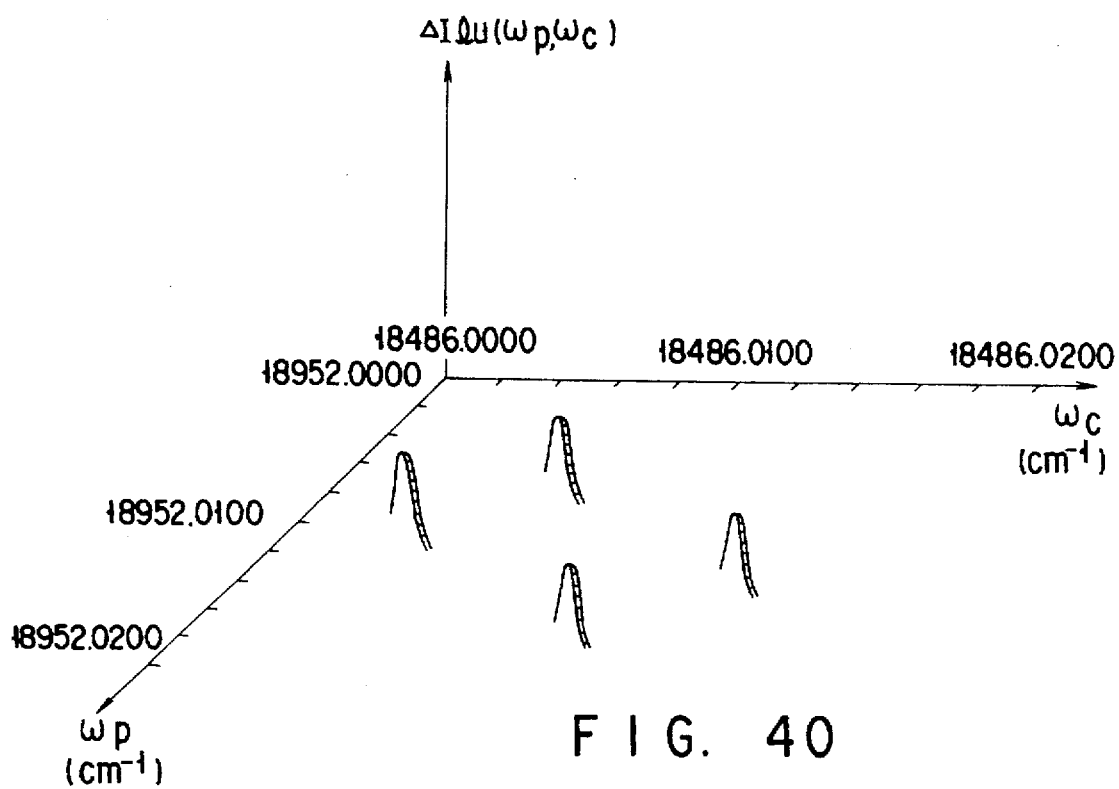
FIG. 40 is a graph showing another ($\omega_p$, $\omega_c$) plane representing a result obtained by reading information recorded on a recording medium in the eighth embodiment.

As is apparent from FIG. 40, although the same effect as in FIG. 39 is obtained with respect to the region on the ($\omega_p$, $\omega_c$) plane, photoluminescence holes according to EIT of pseudo atoms (physical structures) different from those in FIG. 39 are observed.

When a frequency is changed by changing a drive current flowing in the laser L3 to scan the entire range of the inhomogeneous line-width of transition from $^5D_1$ to $^5D_2$ an EIT signal (information) related to all the Eu atoms can be observed (reproduced) by photoluminescence.

(Ninth Embodiment)

A method of reproducing information recorded on a recording medium by using a recording/reproducing device of the present invention, and a method of recording new information will be described below.

Figure 41:
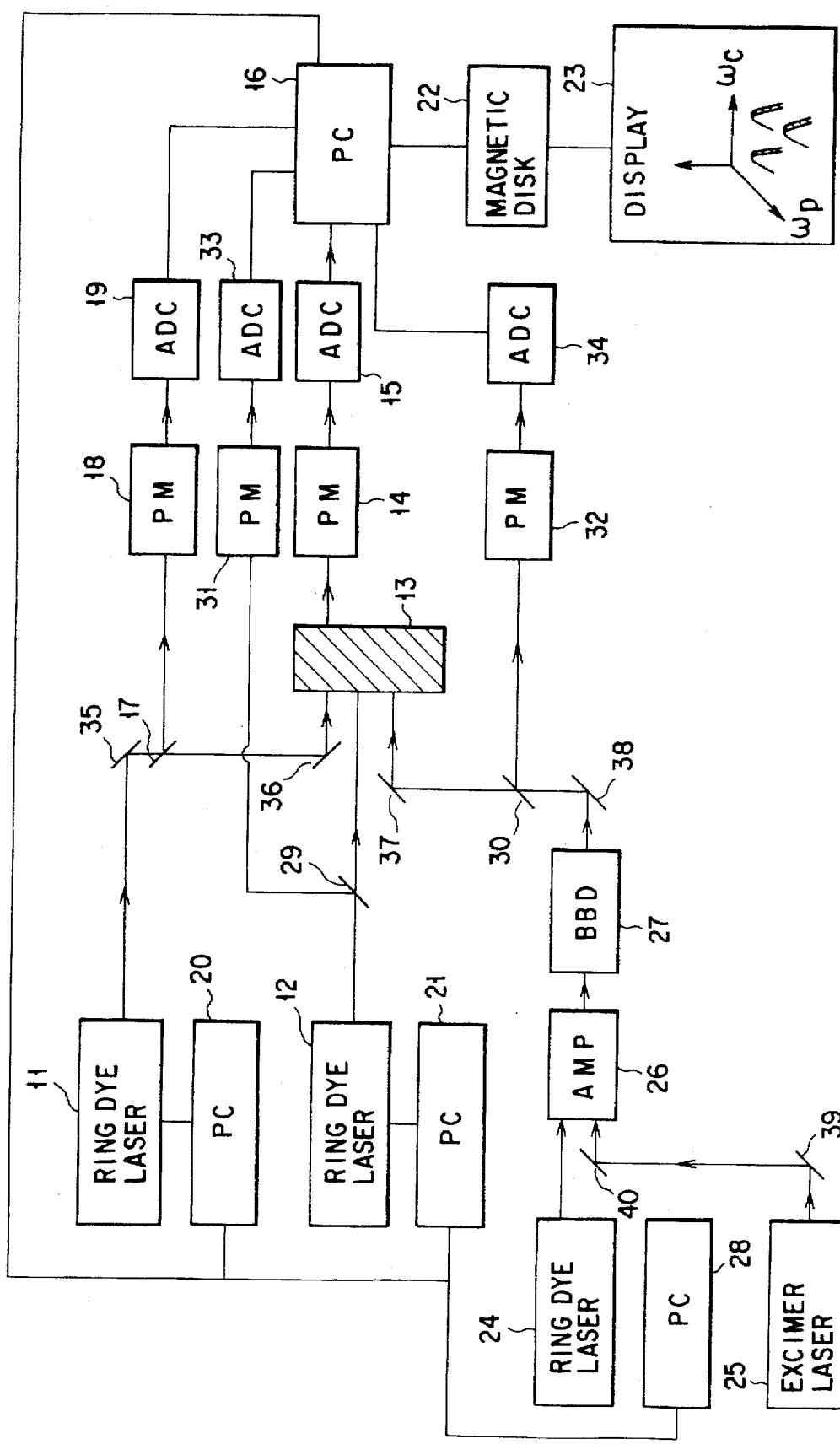
FIG. 41 is a view showing a recording/reproducing device according to the ninth embodiment.

FIG. 41 is a view showing a recording/reproducing device in this embodiment. In information reproducing, output light from two ring dye lasers 11 and 12 are irradiated on a recording medium 13.

Output light from the laser 11 passes through the recording medium 13 to be input to an output detection photomultiplier 14. Since an output $I^r_{PM1}(\omega_p)$ from the photomultiplier 14 is an analog signal, the signal is converted into a digital signal by an A/D converter 15, and the digital signal is input to a data display control personal computer 16.

In this case, in order to convert an incident light intensity to the recording medium 13, output light from the laser 11 is split by a beam splitter 17 and then input to a photomultiplier 18 to calculate an output $I^r_{PM2}(\omega_p)$ from the photomultiplier 18. An output $I^r_{PM2}(\omega_p)$ is converted into a digital signal by an A/D converter 19, and the digital signal is input to the data control personal computer 16.

In order to obtain absorption spectrum data, outputs $I^0_{PM1}(\omega_p)$ and $I^0_{PM2}(\omega_p)$ from the photomultipliers 14 and 18 are predicted, and these predicted data are input to the data control personal computer 16.

An absorption $I_{ab}(\omega_p)$ of an angular frequency $\omega_p$ is defined by the following equation regardless of the presence/absence of irradiation of output light from the laser 12:

$$I_{ab}(\omega_p) = (1/I^0_{PM1}(\omega_p)) \times (I^0_{PM1}(\omega_p) - I'_{PM1}(\omega_p) \times I^0_{PM2}(\omega_p)/I'_{PM2}(\omega_p))$$

The data control personal computer 16 performs a calculation process corresponding to this equation to calculate the absorption $I_{ab}(\omega_p)$. The values of angular frequencies $\omega_p$ and $\omega_c$ are input as signals from the ring dye laser control personal computers 21 and 28 to the data control personal computer 16.

Absorption spectrum data $I_{ab}(\omega_p; \omega_c)$ obtained when the laser 12 is irradiated and an absorption spectrum $I^0_{ab}(\omega_p)$ obtained when no laser 12 is irradiated are calculated with respect to the value of pairs ($\omega_p$, $\omega_c$) and the value of $\omega_p$. Reproduced data are stored in the hard disk of the data control personal computer 16.

The amount of data is large, the data are transferred from the hard disk of the data control personal computer 16 to an external memory unit 22 such as a magnetic disk having a large capacity to be stored therein. In addition, when the reproduced data are checked on a screen, the data may be transferred to a display 23.

When new information is to be recorded on the recording medium 13, the following procedures are used.

More specifically, in addition to the output light from the laser 11 and 12, output light from a ring dye laser 24 and an excimer laser 25 are incident on a dye amplifier 26 for amplifying an output. A laser beam output from the dye amplifier 26 is incident on a BBO crystal 27 serving as a nonlinear optical crystal, and second harmonic waves obtained are irradiated on the recording medium 13, thereby recording information in the method described in the sixth embodiment.

At this time, the value of the frequency of the laser 24 is input as a signal from the personal computer 28 to the data control personal computer 16.

As described above, it is important that the light intensities of the lasers 11, 12, and 24 are monitored in recording/reproducing information. For this reason, not only the output light from the laser 11, but also the output light from the lasers 12 and 24 are partially split by beam splitters 29 and 30, respectively. Thereafter, the split light are input to photomultipliers 31 and 32, respectively, and outputs from the photomultipliers 31 and 32 are converted into digital signals by A/D converters 33 and 34, respectively. The digital signals are input to the data control personal computer 16, and the intensities of the output light from the lasers 12 and 24 are measured. Referring to FIG. 41, reference numerals 35 to 40 denote mirrors, respectively.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical detection method comprising the steps of:
   preparing a solid body having an energy level structure including at least three energy levels;
   irradiating first and second coherent light beams on said solid body; and
   optically detecting the physical structure of said solid body, wherein the optical detecting step satisfies the following conditions:
   $\min(\epsilon_{i31}) < h\omega_p/2\pi < \max(\epsilon_{i31})$,
   $\min(\epsilon_{i32}) < h\omega_c/2\pi < \max(\epsilon_{i32})$, and
   $h\Omega_c/2\pi < \max(\epsilon_{i31}) - \min(\epsilon_{i31})$
   where h is Plank's constant and the number of physical structures included in said solid body is N, N being a positive integer; the at least three energy levels are first, second and third energy levels, and energies of the first, second and third levels are $\epsilon_{i1}$, $\epsilon_{i2}$ and $\epsilon_{i3}$, respectively and where for the N physical structures, the maximum value of $|\epsilon_{i3} - \epsilon_{i1}|$ is $\max(\epsilon_{i31})$ and the minimum value of $|\epsilon_{i3} - \epsilon_{i1}|$ is $\min(\epsilon_{i31})$ and the maximum value of $|\epsilon_{i3} - \epsilon_{i2}|$ is $\max(\epsilon_{i32})$ and the minimum value of $|\epsilon_{i3} - \epsilon_{i2}|$ is $\min(\epsilon_{i32})$ and further where the first coherent light beam has a first angular frequency of $\omega_p$ and a first Rabi frequency of $\Omega_p$ and the second coherent light beam has a second angular frequency of $\omega_c$ and a second Rabi frequency of $\Omega_c$,
   and further wherein the optical detecting step includes a step of measuring at least one of absorption of the first coherent light beam in said solid body or photoluminescence of said solid body generated through the absorption of the first coherent light beam with respect to a plurality of pairs of the first and second angular frequencies.

2. The optical detection method according to claim 1, wherein, in the measuring step, when the line-width of the first coherent light beam is represented by $\delta\omega_p$, and a homogeneous line-width related to transition between the first level and the third level is represented by $\omega_{homo31}$, a condition $\delta\omega_p \leq \omega_{homo31}$ is satisfied.

3. The optical detection method according to claim 1, wherein, in the measuring step, when the line-width of the second coherent light beam is represented by $\delta\omega_c$, and a homogeneous line-width related to transition between the first level and the third level is represented by $\omega_{homo31}$, a condition $\delta\omega_c \leq \omega_{homo31}$ is satisfied.

4. The optical detection method according to claim 1, wherein the plurality of pairs of the first and second angular frequencies include two pairs of the first and second angular frequencies in which an absolute value of a difference between second angular frequencies $\omega_c$ is not larger than a homogeneous line-width related to transition between the first level and the third level.

5. The optical detection method according to claim 1, wherein the detecting step includes the step of irradiating the first and second coherent light beam on said solid body under the condition under which the value of $\omega_p - \omega_c$ or the value of $\omega_p + \omega_c$ are constant while sweeping the frequencies of the first and second coherent light beam.

6. An optical detection method comprising the steps of:
   preparing a solid body having an energy level structure including at least three energy levels;
   irradiating first and second coherent light beams on said solid body; and
   optically detecting the physical structure of said solid body, wherein the optical detecting step satisfies the following conditions:
   $\min(\epsilon_{i31}) < h\omega_p/2\pi < \max(\epsilon_{i31})$,
   $\min(\epsilon_{i32}) < h\omega_c/2\pi < \max(\epsilon_{i32})$, and
   $h\Omega_c/2\pi < \max(\epsilon_{i31}) - \min(\epsilon_{i31})$
   where h is Plank's constant and the number of physical structures included in said solid body is N, N being a positive integer; the at least three energy levels are first, second and third energy levels, and energies of the first, second and third levels are $\epsilon_{i1}$, $\epsilon_{i2}$ and $\epsilon_{i3}$, respectively and where for the N physical structures, the maximum value of $|\epsilon_{i3}-\epsilon_{i1}|$ is max($\epsilon_{i31}$) and the minimum value of $|\epsilon_{i3}-\epsilon_{i1}|$ is min($\epsilon_{i31}$) and the maximum value of $|\epsilon_{i3}-\epsilon_{i2}|$ is max($\epsilon_{i32}$) and the minimum value of $|\epsilon_{i3}-\epsilon_{i2}|$ is min($\epsilon_{i32}$) and further where the first coherent light beam has a first angular frequency of $\omega_p$ and a first Rabi frequency of $\Omega_p$ and the second coherent light beam has a second angular frequency of $\omega_c$ and a second Rabi frequency of $\Omega_c$, and further wherein the optical detecting step includes a step of measuring at least one of an absorption difference between absorption of the first coherent light beam obtained when only the first coherent light beam is irradiated on said solid body and absorption of the first coherent light beam obtained when the first and second coherent light beams are irradiated on said solid body or a photoluminescence difference between photoluminescence of said solid body generated through absorption of the first coherent light beam when only the first coherent light beam is irradiated on said solid body and photoluminescence of said solid body generated through absorption of the first coherent light beam when the first and second coherent light beams are irradiated on said solid body with respect to a plurality of pairs of the first and second angular frequencies.

7. The optical detection method according to claim 6, wherein, in the measuring step, when the line-width of the first coherent light beam is represented by $\delta\omega_p$, and a homogeneous line-width related to transition between the first level and the third level is represented by $\omega_{homo31}$, a condition $\delta\omega_p \leq \omega_{homo31}$ is satisfied.

8. The optical detection method according to claim 6, wherein, in the measuring step, when the line-width of the second coherent light beam is represented by $\Delta\omega_c$, and a homogeneous line-width related to transition between the first level and the third level is represented by $\omega_{homo31}$, a condition $\delta\omega_c \leq \omega_{homo31}$ is satisfied.

9. The optical detection method according to claim 6, wherein the plurality of pairs of the first and second angular frequencies include two pairs of the first and second angular frequencies in which an absolute value of a difference between second angular frequencies $\omega_c$ is not larger than a homogeneous line-width related to transition between the first level and the third level.

10. The optical detection method according to claim 6, wherein the detecting step includes the step of irradiating the first and second coherent light beam on said solid body under the condition under which the value of $\omega_p-\omega_c$ or the value of $\omega_p+\omega_c$ are constant while sweeping the frequencies of the first and second coherent light beam.

11. A display device comprising:

a solid body having an energy level structure formed of at least three energy levels, a source of first and second coherent light beams and a means for irradiating said first and second coherent light beams onto said solid body:

a means for optically detecting the physical structure of said solid body, wherein the detection satisfies the following conditions:

min($\epsilon_{i31}$)<$h\omega_p/2\pi$<max($\epsilon_{i31}$),
min($\epsilon_{i32}$)<$h\omega_c/2\pi$<max($\epsilon_{i32}$), and
$h\Omega_c/2\pi$<max($\epsilon_{i31}$)−min($\epsilon_{i31}$)

where h is Plank's constant and the number of physical structures included in said solid body is N: N being a positive integer; the at least three energy levels are first, second and third energy levels, and energies of the first, second and third levels are $\epsilon_{i1}$, $\epsilon_{i2}$ and $\epsilon_{i3}$, respectively and where for the N physical structures, the maximum value of $|\epsilon_{ie}-\epsilon_{i1}|$ is max($\epsilon_{31}$), and the minimum value of $|\epsilon_{ie}-\epsilon_{i1}|$ is min($\epsilon_{i31}$), and the maximum value of $|\epsilon_{i3}-\epsilon_{i2}|$ is max($\epsilon_{i32}$), and the minimum value of $|\epsilon_{i3}-\epsilon_{i2}|$ is min ($\epsilon_{i32}$); and further where the first coherent light beam has a first angular frequency of $\omega_c$ and a first Rabi frequency of $\Omega_p$; and the second coherent light beam has a second angular frequency of $\omega_c$ and a second Rabi frequency of $\Omega_c$, and further wherein the optical detecting means includes a means for measuring at least one of absorption of the first coherent light beam in said solid body or photoluminescence of said solid body generated through the absorption of the first coherent light beam with respect to a plurality of pairs of the first and second angular frequencies, data collecting means for collecting data related to at least one of the absorption or photoluminescence; and display means for displaying the data and a set of minimum values of a data distribution curved surface formed by the data collected by said data collecting means in a space having an angular frequency of the first coherent light beam and an angular frequency of the second coherent light beam as coordinate axes on a plane having the two angular frequencies as coordinate axes.

12. A display device comprising:

a solid body having an energy level structure formed of at least three energy levels:

a source of first and second coherent light beams and a means for irradiating said first and second coherent light beams onto said solid body:

a means for optically detecting the physical structure of said solid body, wherein the detection satisfies the following conditions:

min($\epsilon_{i31}$)<$h\omega_p/2\pi$<max($\epsilon_{i31}$),
min($\epsilon_{i32}$)<$h\omega_c/2\pi$<max($\epsilon_{i32}$), and
$h\Omega_c/2\pi$<max($\epsilon_{i31}$)−min($\epsilon_{i31}$)

where h is Plank's constant and the number of physical structures included in said solid body is N: N being a positive integer: the at least three energy levels are first, second and third energy levels, and energies of the first, second and third levels are $\epsilon_{i1}$, $\epsilon_{i2}$ and $\epsilon_{i3}$, respectively: and where for the N physical structures the maximum value of $|\epsilon_{ie}-\epsilon_{i1}|$ is max($\epsilon_{31}$), and the minimum value of $|\epsilon_{ie}-\epsilon_{i1}|$ is min($\epsilon_{i31}$); and the maximum value of $|\epsilon_{i3}-\epsilon_{i2}|$ is max($\epsilon_{i32}$) and the minimum value of $|\epsilon_{i3}-\epsilon_{i2}|$ is min($\epsilon_{i32}$); and further where the first coherent light beam has a first angular frequency of $\omega_c$ and a first Rabi frequency of $\Omega_p$; and the second coherent light beam has a second angular frequency of $\omega_c$ and a second Rabi frequency of $\Omega_c$, and further wherein the optical detecting means includes a means for measuring at least one of an absorption difference between absorption of the first coherent light beam obtained when only the first coherent light beam is irradiated on said solid body and absorption of the first coherent light beam obtained when the first and second coherent light beams are irradiated on said solid body or a photoluminescence difference between photoluminescence of said solid body generated through absorption of the first coherent light beam when only the first coherent light beam is irradiated on said solid body and photoluminescence of said solid body generated through absorption of the first coherent light beam when the first and second coherent light beams are irradiated on said solid body with respect to a plurality of pairs of the first and second angular frequencies:

data collecting means for collecting data related to at least one of the absorption or photoluminescence; and display means for displaying the data and a set of minimum values of a data distribution curved surface formed by the data collected by said data collecting means in a space having an angular frequency of the first coherent light beam and an angular frequency of the second coherent light beam as coordinate axes on a plane having the two angular frequencies as coordinate axes.

13. A display device comprising:

a solid body having an energy level structure formed of at least three energy levels:

a source of first and second coherent light beams and a means for irradiating said first and second coherent light beams onto said solid body:

a means for optically detecting the physical structure of said solid body, wherein the detection satisfies the following conditions:

$\min(\epsilon_{i31}) < h\omega_p/2\pi < \max(\epsilon_{i31})$,
$\min(\epsilon_{i32}) < h\omega_c/2\pi < \max(\epsilon_{i32})$, and
$h\Omega_c/2\pi < \max(\epsilon_{i31}) - \min(\epsilon_{i31})$ where h is Plank's constant and the number of physical structures included in said solid body is N: N being a positive integer: the at least three energy levels are first, second and third energy levels, and energies of the first, second and third levels are $\epsilon_{i1}$, $\epsilon_{i2}$ and $\epsilon_{i3}$, respectively: and where for the N physical structures the maximum value of $|\epsilon_{ie}-\epsilon_{i1}|$ is $\max(\epsilon_{31})$, and the minimum value of $|\epsilon_{ie}-\epsilon_{i1}|$ is $\min(\epsilon_{31})$; and the maximum value of $|\epsilon_{i3}-\epsilon_{i2}|$ is $\max(\epsilon_{i32})$ and the minimum value of $|\epsilon_{i3}-\epsilon_{i2}|$ is $\min(\epsilon_{i32})$; and further where the first coherent light beam has a first angular frequency of $\omega_c$ and a first Rabi frequency of $\Omega_p$; and the second coherent light beam has a second angular frequency of $\omega_c$ and a second Rabi frequency of $\Omega_c$, and further wherein the optical detecting means includes a means for measuring at least one of an absorption difference between absorption of the first coherent light beam obtained when only the first coherent light beam is irradiated on said solid body and absorption of the first coherent light beam obtained when the first and second coherent light beams are irradiated on said solid body or a photoluminescence difference between photoluminescence of said solid body generated through absorption of the first coherent light beam when only the first coherent light beam is irradiated on said solid body and photoluminescence of said solid body generated through absorption of the first coherent light beam when the first and second coherent light beams are irradiated on said solid body with respect to a plurality of pairs of the first and second angular frequencies:

data collecting means for collecting data related to at least one of the absorption or photoluminescence; and display means for displaying the data and a set of minimum values of a data distribution curved surface formed by the data collected by said data collecting means on a plane having an angular frequency of the first coherent light beam and an angular frequency of the second coherent light beam as coordinate axes.

14. A display device comprising:

display means for displaying, when a solid body including a physical structure having an energy level structure constituted by at least three energy levels, the number of physical structures included in said solid body is N, the predetermined three levels of ith physical structure are called first, second, and third levels, and energies of the first, second, and third levels are $\epsilon_{i1}$, $\epsilon_{i2}$, and $\epsilon_{i3}$, respectively, the distribution of ($|\epsilon_{i3}-\epsilon_{i1}|$, $|\epsilon_{i3}-\epsilon_{i2}|$) in the N physical structures on a plane having a first angular frequency corresponding to transition between the first level and the third level and a second angular frequency corresponding to transition between the second level and the third level as coordinate axes.

15. A recording/reproducing method comprising the steps of:

preparing, as a recording medium, a solid body having an energy level structure constituted by at least three energy levels; and changing the distribution of ($\omega_{i31}$, $\omega_{i32}$) in the N physical structures to record information on said recording medium, here the number of physical structures included in said solid body is N; the predetermined three levels of ith physical structure are called first, second, and third levels; h is a Plank's constant, the energy of the first level is $h\omega_{i1}/2\pi$, the energy of the second level is $h\omega_{i2}/2\pi$, and the energy of the third level is $h\omega_{i3}/2\pi$; and $|\omega_{i3}-\omega_{i1}|$ is $\omega_{i31}$, $|\omega_{i3}-\omega_{i2}|$ is $\omega_{i32}$, and $|\omega_{i2}-\omega_{i1}|$ is $\omega_{i21}$.

16. The recording/reproducing method according to claim 15, wherein said solid body has a fourth level at which the structure changes when electrons are excited at the level, if $|\omega_{i4}-\omega_{i1}|$ is $\omega_{i41}$, $|\omega_{i4}-\omega_{i2}|$ is $\omega_{i42}$, and $|\omega_{i4}-\omega_{i3}|$ is $\omega_{i43}$; of the N physical structures, the maximum value of $\omega_{i41}$ is $\max(\omega_{i41})$, and the minimum value is $\min(\omega_{i41})$; of the N physical structures, the maximum value of $\omega_{i42}$ is $\max(\omega_{i42})$, and the minimum value is $\min(\omega_{i42})$; of the N physical structures, the maximum value of $\omega_{i43}$ is $\max(\omega_{i43})$, and the minimum value is $\min(\omega_{i43})$; and a Rabi frequency of the first coherent light is $\Omega_p$, and a Rabi frequency of the second coherent light is $\Omega_c$, when $\Omega_p < \Omega_c$, the first and second coherent light and third coherent light having an angular frequency larger than $\min(\omega_{i41})$ and smaller than $\max(\omega_{i41})$ or an angular frequency larger than $\min(\omega_{i43})$ and smaller than max ($\omega_{i43}$) are irradiated on said recording medium, and when $\Omega_p > \Omega_c$, the first and second coherent light and third coherent light having an angular frequency larger than $\min(\omega_{i42})$ and smaller than $\max(\omega_{i42})$ or an angular frequency larger than $\min(\omega_{i43})$ and smaller than max ($\omega_{i43}$) are irradiated on said recording medium, thereby recording information on said recording medium.

17. The recording/reproducing method according to claim 15, further comprising the step of detecting a distribution of the ($\omega_{i31}$, $\omega_{i32}$) or a distribution of the $\omega_{i21}$ to reproduce the information recorded on said recording medium.

18. A recording/reproducing method comprising the steps of:

preparing, as a recording medium, a solid body having an energy level structure constituted by at least three energy levels; and detecting a distribution of the ($\omega_{i31}$, $\omega_{i32}$) or a distribution of the $\omega_{i21}$ in N physical structures to reproduce information recorded on said recording medium, where the number of physical structures included in said solid body is N; the predetermined three levels of ith physical structure are called first, second, and third levels; h is a Plank's constant, the energy of the first level is $h\omega_{i1}/2\pi$, the energy of the second level is $h\omega_{i2}/2\pi$, and the energy of the third level is $h\omega_{i3}/2\pi$; and $|\omega_{i3}-\omega_{i1}|$ is $\omega_{i31}$, $|\omega_{i3}-\omega_{i2}|$ is $\omega_{i32}$, and $|\omega_{i2}-\omega_{i1}|$ will is $\omega_{i21}$.

19. The recording/reproducing method according to claim 18, wherein when, of the N physical structures, the maximum value of $\omega_{i31}$ is $\max(\omega_{i31})$, and the minimum value is $\min(\omega_{i31})$; of the N physical structures, the maximum value of $\omega_{i32}$ is $\max(\omega_{i32})$, and the minimum value is $\min(\omega_{i32})$; and an angular frequency of the first coherent light is $\omega_p$, and an angular frequency of the second coherent light is $\omega_c$, the first and second coherent light which satisfy conditions $\min(\omega_{i31})<\omega_p<\max(\omega_{i31})$ and $\min(\omega_{i32})<\omega_c<\max(\omega_{i32})$ are irradiated on said recording medium, at least one of absorption of the first coherent light in said recording medium and photoluminescence of said recording medium generated through the absorption of the first coherent light with respect to a plurality of pairs $(\omega_p, \omega_c)$, thereby reproducing information recorded on said recording medium.

20. The recording/reproducing method according to claim 18, wherein when, of the N physical structures, the maximum value of $\omega_{i31}$ is $\max(\omega_{i31})$, and the minimum value is $\min(\omega_{i31})$; of the N physical structures, the maximum value of $\omega_{i32}$ is $\max(\omega_{i32})$, and the minimum value is $\min(\omega_{i32})$; an angular frequency of the first coherent light is $\omega_p$, an angular frequency of the second coherent light is $\omega_c$, and $\omega_p-\omega_c$ is $\Delta\omega$; and absorption of the first coherent light in said recording medium when the first and second coherent light which satisfy conditions $\Delta\omega$ is constant, $\min(\omega_{i31})<\omega_p<\max(\omega_{i31})$, and $\min(\omega_{i32})<\omega_c<\max(\omega_{i32})$ are irradiated on said recording medium is $I_{ab}(\omega_p; \omega_c)$, and photoluminescence of said recording medium generated through the absorption of the first coherent light is $I_{lu}(\omega_p; \omega_c)$, at least one of $$I_{ab}(\Delta\omega)=\int I_{ab}(\omega_p; \omega_p-\Delta\omega)d\omega_p$$

and $$I_{lu}(\Delta\omega)=\int I_{lu}(\omega_p; \omega_p-\Delta\omega)d\omega_p$$

is calculated with respect to a plurality of different $\Delta\omega$, thereby reproducing information recorded on said recording medium.

21. A recording/reproducing device comprising:

a solid body serving as a recording medium and having an energy level structure constituted by at least three energy levels; and an optical system for irradiating the first and second coherent light on said recording medium, wherein said optical system includes means for changing angular frequencies of the first and second coherent light within a range which satisfies conditions $\min(\omega_{i31})<\omega_p<\max(\omega_{i31})$ and $\min(\omega_{i32})<\omega_c<\max(\omega_{i32})$, where the number of physical structures included in said solid body is N; the predetermined three levels of ith physical structure are called first, second, and third levels; h is a Plank's constant, the energy of the first level is $h\omega_{i1}/2\pi$, the energy of the second level is $h\omega_{i2}/2\pi$, and the energy of the third level is $h\omega_{i3}/2\pi$; $|\omega_{i3}-\omega_{i1}|$ is $\omega_{i31}$, and $|\omega_{i3}-\omega_{i2}|$ is $\omega_{i32}$; of the N physical structures, the maximum value of $\omega_{i31}$ is $\max(\omega_{i31})$; of the N physical structures, the minimum value of $\omega_{i32}$ is $\min(\omega_{i32})$; an angular frequency of the first coherent light is $\omega_p$, an angular frequency of the first coherent light is $\omega_c$, and $\omega_p-\omega_c$ is $\Delta\omega$.

22. The recording/reproducing device according to claim 21, wherein said optical system has means for measuring at least one of absorption of the first coherent light in said recording medium and photoluminescence of said recording medium generated through the absorption of the first coherent light.

23. The recording/reproducing device according to claim 21, further comprising means for changing a distribution of $(\omega_{i31}, \omega_{i32})$ in the N physical to record information on said recording medium, and for detecting a distribution of the $(\omega_{i31}, \omega_{i32})$ or a distribution of the $\omega_{i21}$ to reproduce the information, wherein $|\omega_{i2}-\omega_{i1}|$ is $\omega_{i21}$.

24. The recording/reproducing device according to claim 21, wherein said optical system has means for changing the angular frequencies of the first and second coherent light under the condition under which $\Delta\omega$ is constant when $\omega_p-\omega_c=\Delta\omega$.

25. The recording/reproducing device according to claim 24, wherein said optical system has means for measuring at least one of absorption of the first coherent light in said recording medium and photoluminescence of said recording medium generated through the absorption of the first coherent light.

26. The recording/reproducing device according to claim 24, further comprising means for changing a distribution of $(\omega_{i31}, \omega_{i32})$ in the N physical to record information on said recording medium, and for detecting a distribution of the $(\omega_{i31}, \omega_{i32})$ or a distribution of the $\omega_{i21}$ to reproduce the information, wherein $|\omega_{i2}-\omega_{i1}|$ is $\omega_{i21}$.

27. The recording/reproducing device according to claim 21, wherein said solid body has a fourth level at which the structure changes when electrons are excited at the level, and said optical system, when the energy of the fourth level is $h\omega_{i4}/2\pi$, $|\omega_{i4}-\omega_{i1}|$ is $\omega_{i41}$, $|\omega_{i4}-\omega_{i2}|$ is $\omega_{i42}$, and $|\omega_{i4}-\omega_{i3}|$ is $\omega_{i43}$; of the N physical structures, the maximum value of $\omega_{i41}$ is $\max(\omega_{i41})$, and the minimum value is $\min(\omega_{i41})$; of the N physical structures, the maximum value of $\omega_{i42}$ is $\max(\omega_{i42})$, and the minimum value is $\min(\omega_{i42})$; of the N physical structures, the maximum value of $\omega_{i43}$ is $\max(\omega_{i43})$, and the minimum value is $\min(\omega_{i43})$; and a Rabi frequency of the first coherent light is $\Omega_p$, and a Rabi frequency of the second coherent light is $\Omega_c$, when $\Omega_p<\Omega_c$, the first and second coherent light and third coherent light having an angular frequency not smaller than $\min(\omega_{i41})$ and not larger than $\max(\omega_{i41})$ or an angular frequency not smaller than $\min(\omega_{i43})$ and not larger than $\max(\omega_{i43})$ are irradiated on said recording medium, and when $\Omega_p>\Omega_c$, the first and second coherent light and third coherent light having an angular frequency not smaller than $\min(\omega_{i42})$ and not larger than $\max(\omega_{i42})$ or an angular frequency not smaller than $\min(\omega_{i43})$ and not larger than $\max(\omega_{i43})$ are irradiated on said recording medium, thereby recording information on said recording medium.

28. The recording/reproducing device according to claim 27, wherein said optical system has means for measuring at least one of absorption of the first coherent light in said recording medium and photoluminescence of said recording medium generated through the absorption of the first coherent light.

29. The recording/reproducing device according to claim 27, further comprising means for changing a distribution of $(\omega_{i31}, \omega_{i32})$ in the N physical to record information on said recording medium, and for detecting a distribution of the $(\omega_{i31}, \omega_{i32})$ or a distribution of the $\omega_{i21}$ to reproduce the information, wherein $|\omega_{i2}-\omega_{i1}|$ is $\omega_{i21}$.

* * * * *